(12) United States Patent
Mashitani et al.

(10) Patent No.: US 8,131,064 B2
(45) Date of Patent: Mar. 6, 2012

(54) METHOD AND APPARATUS FOR PROCESSING THREE-DIMENSIONAL IMAGES

(75) Inventors: Ken Mashitani, Neyagawa (JP); Goro Hamagishi, Toyonaka (JP); Satoshi Takemoto, Takatsuki (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 12/976,262

(22) Filed: Dec. 22, 2010

(65) Prior Publication Data

US 2011/0090217 A1    Apr. 21, 2011

Related U.S. Application Data

(63) Continuation of application No. 10/949,528, filed on Sep. 27, 2004, which is a continuation of application No. PCT/JP03/03791, filed on Mar. 27, 2003.

(30) Foreign Application Priority Data

| Mar. 27, 2002 | (JP) | 2002-087493 |
| Mar. 27, 2002 | (JP) | 2002-087494 |
| Mar. 27, 2002 | (JP) | 2002-087495 |
| Mar. 27, 2002 | (JP) | 2002-087496 |
| Mar. 27, 2002 | (JP) | 2002-087497 |
| Jan. 9, 2003 | (JP) | 2003-003761 |
| Jan. 9, 2003 | (JP) | 2003-003763 |

(51) Int. Cl.
*G06K 9/00* (2006.01)
(52) U.S. Cl. ................................... 382/154
(58) Field of Classification Search ............ 382/103, 382/154
See application file for complete search history.

(56) References Cited

U.S. PATENT DOCUMENTS

| 4,573,191 A | 2/1986 | Kidode et al. |
| 4,903,202 A | 2/1990 | Crawford |
| 5,020,878 A | 6/1991 | Brokenshire et al. |
| 5,726,704 A | 3/1998 | Uomori |
| 5,801,760 A | 9/1998 | Uomori |
| 5,826,212 A | 10/1998 | Nagai |
| 5,917,940 A | 6/1999 | Okajima et al. |
| 6,087,617 A | 7/2000 | Troitski et al. |
| 6,163,337 A * | 12/2000 | Azuma et al. ............ 348/43 |
| 6,381,346 B1 | 4/2002 | Eraslan |

(Continued)

FOREIGN PATENT DOCUMENTS

EP    1 021 049 A2    7/2000

(Continued)

OTHER PUBLICATIONS

United States Office Action issued in U.S. Appl. No. 10/949,528, mailed, Jan. 14, 2011.

(Continued)

*Primary Examiner* — Alex Liew
(74) *Attorney, Agent, or Firm* — McDermott Will & Emery LLP

(57) ABSTRACT

A three-dimensional sense adjusting unit displays three-dimensional images to a user. If a displayed reaches a limit of parallax, the user responds to the three-dimensional sense adjusting unit. According to acquired appropriate parallax information, a parallax control unit generates parallax images to realize the appropriate parallax in the subsequent stereo display. The control of parallaxes is realized by optimally setting camera parameters by going back to three-dimensional data. Functions to realize the appropriate parallax are made into and presented by a library.

11 Claims, 63 Drawing Sheets

U.S. PATENT DOCUMENTS

| | | | |
|---|---|---|---|
| 6,385,334 | B1 | 5/2002 | Saneyoshi et al. |
| 6,549,650 | B1 * | 4/2003 | Ishikawa et al. ............... 382/154 |
| 6,816,158 | B1 | 11/2004 | Lemelson et al. |
| 2001/0005425 | A1 | 6/2001 | Watanabe |
| 2001/0045979 | A1 | 11/2001 | Matsumoto et al. |
| 2002/0118874 | A1 | 8/2002 | Chung et al. |
| 2002/0122585 | A1 | 9/2002 | Swift et al. |
| 2002/0141635 | A1 * | 10/2002 | Swift et al. .................... 382/154 |
| 2003/0026474 | A1 * | 2/2003 | Yano ............................. 382/154 |

FOREIGN PATENT DOCUMENTS

| | | |
|---|---|---|
| EP | 1 185 112 A2 | 3/2002 |
| JP | 5-068268 | 3/1993 |
| JP | 7-167633 | 7/1995 |
| JP | 8-009421 | 1/1996 |
| JP | 08-212378 | 8/1996 |
| JP | 8-322004 | 12/1996 |
| JP | 09-074573 | 3/1997 |
| JP | 9-121370 | 5/1997 |
| JP | 9-271043 | 10/1997 |
| JP | 9-322197 | 12/1997 |
| JP | 10-032840 | 2/1998 |
| JP | 10-150608 | 6/1998 |
| JP | 11-039507 | 2/1999 |
| JP | 11-113028 | 4/1999 |
| JP | 11-146423 | 5/1999 |
| JP | 11-155155 | 6/1999 |
| JP | 11-164329 | 6/1999 |
| JP | 2002-84554 | 3/2002 |
| WO | WO 97/47141 | 12/1997 |
| WO | WO 01/39512 A1 | 5/2001 |

OTHER PUBLICATIONS

Japanese Office Action for corresponding Japanese Patent Application JP 2003-003761.

Japanese Office Action for corresponding Japanese Patent Application JP 2003-003763.

Korean Office Action for corresponding Korean Patent Application No. 10-2004-7015105 with English translation.

Korean Office Action issued in Corresponding Korean Patent Application No. KR 10-2004-7015105, dated Oct. 16, 2006.

Korean Office Action issued in Corresponding Korean Patent Application No. KR 10-2004-7015105, dated Apr. 12, 2007.

European Search Report issued in corresponding European Patent Application No. EP 03715473.9-2202, filed on Nov. 9, 2006.

European Search Report issued in corresponding European Patent Application No. EP 03715473.9-1241, filed Jun. 27, 2007.

Chinese Office Action, with English translation thereof, issued in Patent Application No. CN 03807159.2 dated on Jul. 4, 2008.

European Office Action issued in European Patent Application No. EP 03715473.9 dated Mar. 27, 2009.

European Search Report issued in European Patent Application No. 03 715 473.9-2202, mailed Mar. 22, 2010.

US Office Action issued in U.S. Appl. No. 12/986,453, dated Jun. 28, 2011.

US Office Action issued in U.S. Appl. No. 12/986,471, dated Jul. 22, 2011.

Extended European Search Report issued in European Patent Application No. EP 11161269.3 dated Jul. 18, 2011.

United States Office Action issued in U.S. Appl. No. 10/949,528 dated Sep. 14, 2011.

United States Office Action issued in U.S. Appl. No. 12/986,491 dated Aug. 19, 2011.

U.S. Office Action issued in U.S. Appl. No. 13/088,752, dated Nov. 14, 2011.

U.S. Office Action issued in U.S. Appl. No. 12/986,530, dated Oct. 13, 2011.

U.S. Office Action issued in U.S. Appl. No. 12/986,509, dated Sep. 20, 2011.

U.S. Office Action issued in U.S. Appl. No. 12/986,453, dated Dec. 13, 2011.

* cited by examiner

FIG.49

| 0 | 0 | 0 | 0 | 0 | 0 | 0 | 0 | 0 | 0 |
|---|---|---|---|---|---|---|---|---|---|
| 0 | 0 | 0 | 0 | 4 | 4 | 0 | 0 | 0 | 0 |
| 0 | 0 | 0 | 0 | 0 | 0 | 0 | 0 | 0 | 0 |
| 0 | 0 | 0 | 0 | 2 | 2 | 0 | 0 | 0 | 0 |
| 0 | 0 | 0 | 0 | 0 | 0 | 0 | 0 | 0 | 0 |
| 0 | 0 | 0 | 0 | −4 | −4 | 0 | 0 | 0 | 0 |
| 0 | 0 | 0 | 0 | −4 | −4 | 0 | 0 | 0 | 0 |
| 0 | 0 | 0 | 0 | 0 | 0 | 0 | 0 | 0 | 0 |

FIG.51

| 0 | 0 | 0 | 0 | 0 | 0 | 0 | 0 | 0 | 0 |
|---|---|---|---|---|---|---|---|---|---|
| 0 | 0 | 0 | 0 | 2 | 2 | 0 | 0 | 0 | 0 |
| 0 | 0 | 0 | 0 | 0 | 0 | 0 | 0 | 0 | 0 |
| 0 | 0 | 0 | 0 | 1 | 1 | 0 | 0 | 0 | 0 |
| 0 | 0 | 0 | 0 | 0 | 0 | 0 | 0 | 0 | 0 |
| 0 | 0 | 0 | 0 | -3 | -3 | 0 | 0 | 0 | 0 |
| 0 | 0 | 0 | 0 | -3 | -3 | 0 | 0 | 0 | 0 |
| 0 | 0 | 0 | 0 | 0 | 0 | 0 | 0 | 0 | 0 |

METHOD AND APPARATUS FOR PROCESSING THREE-DIMENSIONAL IMAGES

RELATED APPLICATIONS

This application is a Continuation of U.S. patent application Ser. No. 10/949,528, filed on Sep. 27, 2004, which is a continuation of International Application PCT/JP03/03791, filed on Mar. 27, 2003, claiming priority of Japanese Patent Application Nos. 2002-087493, 2002-087494, 2002-087495, 2002-087496, 2002-087497, all filed on Mar. 27, 2002, and Japanese Patent Application Nos. 2003-003761 and 2003-003763, all filed on Jan. 9, 2003, the entire contents of each of which are hereby incorporated by reference.

BACKGROUND OF THE INVENTION

1. Field of the Invention

The present invention relates to a stereo image processing technology, and it particularly relates to method and apparatus for producing or displaying stereo images based on parallax images.

2. Description of the Related Art

In recent years, inadequacy of network infrastructure has often been an issue, but in this time of transition toward broadband, it is rather the inadequacy in the kind and number of contents utilizing broadband that is drawing more of our attention. Images have always been the most important means of expression, but most of the attempts so far have been at improving the quality of display or data compression ratio. In contrast, technical attempts at expanding the possibilities of expression itself seem to be falling behind.

Under such circumstances, three-dimensional image display (hereinafter referred to simply as "3D display") has been studied in various manners and has found practical applications in somewhat limited markets, which include uses in the theater or ones with the help of special display devices. From now on, it is expected that the research and development in this area may further accelerate toward the offering of contents full of realism and presence and the times may come when individual users enjoy 3D display at home.

Also, 3D display is something expected to gain its popularity in the years ahead, and for that reason too, forms of display that could not be imagined from the current display devices are being proposed. For example, a technology has been disclosed whereby a selected partial image of a two-dimensional image is displayed three-dimensionally (See, for example, Reference (1) in the following Related Art List).

RELATED ART LIST (1) Japanese Patent Application Laid-Open No. Hei11-39507.

In such a trend, a number of problems to be solved of 3D display have long since been pointed out. For example, it is difficult to use an optimal parallax, which is the cause creating stereoscopic effects. In 3D display, the images are, by their nature, not real projections of three-dimensional projects but are images dislocated by a certain number of pixels for the right and left eyes, so that it is not easy to give a sense of naturalness to the artificially created stereoscopic effect.

Also, too much parallax can cause problems; in fact, certain viewers of 3D images (hereinafter referred to also as "user") may sometimes complain of a slight uncomfortable feeling. This, of course, is caused by a variety of factors, which may include not only the 3D display itself but also a disagreement between the scene being displayed and the user's surrounding circumstances or sense of reality. However, according to our rule of thumb, such a problem tends to occur due to a too large parallax, that is, when the stereoscopic effect is too strong.

Although what has been described above is matters of human physiology, there are other technical factors that can obstruct the popularization of contents or applications of stereo images. Stereoscopic vision is realized by parallax, and suppose that the parallax is represented by the amount of pixel dislocation between the right and the left image, then there are cases where the same 3D image can be properly viewed stereoscopically or not, due to the differences that exist in hardware which are display apparatuses themselves. If the parallax representing distant views surpasses the distance between the eyes, it is theoretically impossible to realize stereoscopic vision. Today display apparatuses, such as PCs (personal computers), television receivers and portable equipment, come in diverse resolutions and screen sizes. And it is difficult, or without methodology to be more accurate, to prepare optimum contents for 3D display in consideration of such a variety of hardware.

And even if the methodology is given, it would be difficult to expect that ordinary programmers will understand it and use it for the preparation of contents and applications.

The technology disclosed by the above-mentioned literature proposes a technique that may solve the problems as described above. However, in order to popularize 3D display in the future, it is necessary to propose additional techniques, accumulate new technologies and combine them for use in products.

SUMMARY OF THE INVENTION

The present invention has been made in view of the foregoing circumstances and an object thereof is to propose a new expression for 3D display. Another object thereof is to produce or display proper stereo images for the user even when there is a change in an image to be displayed or a display device. A still another object thereof is to adjust the stereoscopic effect of an on-going 3D display by simple operation. Still another object thereof is to lighten the burden on the programmer in creating contents or application capable of proper 3D display. Yet another object thereof is to provide a technology for realizing proper 3D display as a business model.

The knowledge of inventors that forms a basis for the present invention is that the appropriate parallax is once separated from hardware of a display apparatus or factors such as a distance between a user and the display apparatus (hereinafter, these will be expressed in a unified manner as "hardware"). In other words, the expression of appropriate parallax is generalized by camera interval and optical axis intersecting position described later, so that it is once described in a general-purpose form that is not dependent of hardware. "Not dependent of hardware" means that readout of information inherent in display apparatus will not be necessary in principle, and if this general-purpose description is done, it means that a desired 3D display is realized if parallax images are generated or adjusted based on the appropriate parallax.

By providing a control, in a form of library, that realizes appropriate parallax when acquiring the appropriate parallax and displaying images three-dimensionally, the general programmers can realize, by calling this library, the appropriate 3D display without being conscious of complicated principles of stereovision or programming.

Among various embodiments of the present invention, the first group is based on a technique in which appropriate parallax is acquired based on user's response. This technique is utilized for "initial setting" of parallax by a user, and if appropriate parallax is once acquired in an apparatus, then the appropriate parallax will be also realized at the time of displaying other images, thereafter. However, this technique is not limited to the initial setting but also utilized for "manual adjustment" by which the user adjusts, as appropriate, parallax of images during display. The following relates to the first group.

The present invention relates to a three-dimensional image processing apparatus, and it includes: an instruction acquiring unit which acquires a response of a user to a three-dimensional image displayed on the basis of a plurality of viewpoint images corresponding to different parallaxes; and a parallax specifying unit which specifies an appropriate parallax on the user based on the acquired response.

The instruction acquiring unit is provided, for instance, as GUI (graphical user interface, similarly hereinafter) and displays while varying parallax among the viewpoint images. When the stereoscopic effect that suits the user's liking is realized, that the preferable 3D sense was attained accordingly is inputted through operation by a button or the like.

The "three-dimensional images" are images displayed with the stereoscopic effect, and their entities are "parallax images" in which parallax is given to a plurality of images. The parallax images are generally a set of a plurality of two-dimensional images. Each of images that constitute the parallax images is a "viewpoint image" having viewpoints corresponding respectively thereto. That is, a parallax image is constituted by a plurality of viewpoint images, and displaying them results in a three-dimensional image displayed. Display of a three-dimensional image is also referred to simply as three-dimensional display.

The "parallax" is a parameter to produce a stereoscopic effect and various definitions therefor are possible. As an example, it can be represented by a shift amount of pixels that represent the same position among the viewpoint images. Hereinafter, the present specification follows this definition unless otherwise stated.

The appropriate parallax may be such that a range is specified. In that case, the both ends of the range are called "limit parallax". "Specifying the appropriate parallax" may be done with a maximum value that can be permitted as parallax of a nearer-positioned object described later.

A three-dimensional image processing apparatus according to the present invention may further include a parallax control unit which performs a processing so that the specified appropriate parallax is also realized in displaying other images. When the other images are three-dimensional images generated from three-dimensional data, the parallax control unit may determine a plurality of viewpoints from which the three-dimensional image is generated according to the appropriate parallax. More specifically, it may determine distances among the plurality of viewpoints and intersecting positions of optical axes formed by an object from the viewpoints. An example of these processings is done by a camera placement determining unit described later. If these processings are done in real time, the constantly optimal 3D display will be realized.

The parallax control unit may perform control so that the appropriate parallax is realized on a predetermined basic three-dimensional space to be displayed. An example of this processing is done by a projection processing unit described later.

The parallax control unit may perform control so that the appropriate parallax is realized on coordinates of an object positioned closest in a three-dimensional space and coordinates of an object positioned farthest therein. An example of this processing is done by the projection unit described later. An object may be static.

Being "nearer-positioned" means a state where there is given a parallax in a manner such that stereovision is done in front of a surface (hereinafter referred to as "optical axis intersecting surface" also) at camera's line of sight placed at the respective plurality of viewpoints, namely, intersecting positions of an optical axis (hereinafter referred to as "optical axis intersecting positions" also). Conversely, being "farther-positioned" means a state where there is given a parallax in a manner such that stereovision is done behind the optical axis intersecting surface. The larger the parallax of a nearer-positioned object, it is perceived closer to a user whereas the larger the parallax of a farther-positioned object, it is seen farther from the user. That is, the parallax is such that a plus and a minus do not invert around by between nearer position and farther position and both the positions are defined as nonnegative values and the nearer-positioned parallax and the farther-positioned parallax are both zeroes at the optical axis intersecting surface.

As for a portion having no parallax in an object or space displayed, the optical axis intersecting surface coincides with a screen surface. This is because, for pixels having no parallax given, lines of sight formed from both left and right eyes reach just the same position within the screen surface, that is, they intersect there.

In a case when the other images are a plurality of two-dimensional images to which parallax has already been given, the parallax control unit may determine shift amounts of the plurality of two-dimensional images in a horizontal direction according to the appropriate parallax. In this embodiment, the input for 3D display is not produced, with a high degree of freedom, from three-dimensional data but is the parallax image to which parallax has already been given, so that the parallax is fixed. In this case, redrawing or rephotographing processing by changing a camera position and going back to the original three-dimensional space or actually-shot real space cannot be done. Thus, the parallax is adjusted by horizontally shifting viewpoints that constitute a parallax image or pixels contained in them.

If the other images are plane images to which depth information is given (hereinafter this will be referred to as "image with depth information" also), the parallax control unit may adjust its depth according to the appropriate parallax. An example of this processing will be done by a two-dimensional image generating unit in the third three-dimensional image processing apparatus described later.

This three-dimensional image processing apparatus may further include a parallax storage unit which records the appropriate parallax, and the parallax control unit may load the appropriate parallax at a predetermined timing, for instance, when this apparatus is started or when a three-dimensional processing function or part thereof possessed by this apparatus is started, and with the thus loaded value as an initial value the processing may be performed. That is, the "start" may be done in terms of hardware or software. According to this embodiment, once the user decides on the appropriate parallax, an automatic processing for adjusting the stereoscopic effect will thereafter be realized. This is a function which would be so-called an "initial setting of appropriate parallax".

Another embodiment of the present invention relates to a method for processing three-dimensional images and it includes the steps of: displaying to a user a plurality of three-dimensional images due to different parallaxes; and specifying an appropriate parallax for the user based on a user's response to the displayed three-dimensional images.

Still another embodiment of the present invention relates also to a method for processing three-dimensional images and it includes the steps of: acquiring an appropriate parallax that depends on a user; and adding a processing to images prior to displaying the images to realize the acquired appropriate parallax. Here, the "acquiring" may be a positively specifying processing or a processing of loading from the parallax storage unit or the like.

If each of these steps is implemented as a library function for three-dimensional display and configuration is such that the library function can be called up as a function from a plurality of programs, it will not be necessary for a program to describe the program each time in consideration of hardware of a three-dimensional display apparatus, thus being effective.

The second group of the present invention is based on a technique in which the parallax is adjusted based on a user's instruction. This technique can be utilized for "manual adjustment" of parallax by a user and the user can change, as appropriate, the stereoscopic effect of an image during display. However, this technique is not limited to the manual adjustment but also can be utilized even when a certain image is displayed and then the above-described appropriate parallax is read in and the parallax of the image is automatically adjusted. What differs from the automatic adjustment in the first group is that the automatic adjustment in the second group operates on two-dimensional parallax images or images with depth information, and in a case where the parallax is changed going back to the three-dimensional data, the technique of the first group will be used. The following relates to the second group.

An embodiment of the present invention relates to a three-dimensional image processing apparatus and it includes: an instruction acquiring unit which acquires a user's instruction for a three-dimensional image displayed from a plurality of viewpoint images; and a parallax control unit which varies, according to the acquired instruction, a parallax amount among the plurality of viewpoint images. An example of this processing is shown in FIG. 45 which will be described later, and is a typical example of "manual adjustment". Convenience will increase if the user's instruction is provided by a simple GUI such as, for example, a button operation or the like.

Another embodiment of the present invention relates also to a three-dimensional image processing apparatus, and it includes: a parallax amount detecting unit which detects a first parallax amount caused when displaying a three-dimensional image from a plurality of viewpoint images; and a parallax control unit which varies parallax amounts of the plurality of viewpoint images so that the first parallax amount falls within a range of a second parallax amount which is a user's permissible parallax amount. This is a typical example of "automatic adjustment", and the above-described appropriate parallax can be used as the second parallax amount. An example of this processing is shown in FIG. 46 which will be described later.

The parallax amount detecting unit may detect a maximum value of the first parallax amount and the parallax control unit may vary the parallax amounts of the plurality of viewpoint images in a manner such that the maximum value does not exceed a maximum value of the second parallax amount. Accordingly, it is intended that the maximum value of the parallax amount, namely, limit parallax, shall be preserved in order to prevent excessive stereoscopic effect due to too much parallax given. The maximum value mentioned here may be considered as the maximum value in a nearer-position side.

The parallax amount detecting unit may detect the first parallax amount by computing matching of corresponding points among the plurality of viewpoint images or may detect the first parallax amount recorded beforehand in any header of the plurality of viewpoint images. An example for these processings is shown in FIG. 47 which will be described later.

The parallax control unit may vary parallax amounts among the plurality of viewpoint images by shifting synthesis positions of the plurality of viewpoint images. These are common to FIG. 45 to FIG. 47. The shifting of synthesis positions is the shifting in the horizontal or vertical direction in units of pixels or the whole image. If the input is images with depth information, the parallax control unit may vary the parallax amount by adjusting the depth information.

Another embodiment of the present invention relates to a method for processing three-dimensional images, and it includes the steps of: acquiring a user's instruction for a three-dimensional image displayed based on a plurality of viewpoint images; and varying, according to the instruction, a parallax amount among the plurality of viewpoint images.

Still another embodiment of the present invention relates also to a method for processing three-dimensional images, and it includes the steps of: detecting a first parallax amount caused when displaying a three-dimensional image from a plurality of viewpoint images; and varying parallax amounts of the plurality of viewpoint images so that the first parallax amount falls within a range of a second parallax amount which is a user's permissible parallax amount.

The each step may be implemented as a library function for three-dimensional display and configuration may be such that the library function can be called up as a function from a plurality of programs.

The third group is based on a technique in which parallax is corrected based on the position in an image. This "automatic correction" operates to alleviate user's sense of discomfort or rejection against 3D display and can be used in combination with the first group and the second group technique. Generally, pointed out are the technical or physiological problems such as those in which, at the time of three-dimensional display, as it is closer to edge of an image, a plurality of viewpoint images are likely to be observed as being dislocated or a sense of discomfort is likely to be caused. The third group tries to alleviate this problem by a processing with which parallax is reduced at part near the edge of an image or the parallax is adjusted so that an object moves from nearer-position side to farther-position side. The following relates to the third group.

An embodiment of the present invention relates to a three-dimensional image processing apparatus, and it includes: a parallax control unit which corrects parallaxes among a plurality of viewpoint images by which to display three-dimensional images; and a map storage unit which stores a correction map to be referred to by the parallax control unit at the time of a correction processing, wherein the correction map is described in a manner such that the parallaxes are corrected based on position within the viewpoint images. As the correction map, there are parallax correction map, distance-sense correction map and so forth.

The parallax control unit diminishes a parallax at the periphery of, for example, the plurality of viewpoint images or changes the parallax so that an object is perceived farther from a user. The parallax control unit may vary the parallax by selectively performing a processing on any of the plurality of viewpoints images.

If the plurality of viewpoint images are ones generated from three-dimensional data, namely, if the viewpoint images can be generated by going back to the three-dimensional space, the parallax control unit may vary the parallax by controlling camera parameters when generating the plurality of viewpoint images. The camera parameters include a distance between the right and left cameras, an angle formed between an object and the cameras, an optical axis intersecting position or the like. Similarly, if a plurality of viewpoint images are generated from three-dimensional data, the parallax control unit may vary the parallax by distorting three-dimensional space itself in, for example, world coordinates when generating the plurality of viewpoint images. 31. If, on the other hand, the plurality of viewpoint images are generated from images with depth information, the parallax control unit may vary the parallax by manipulating the depth information.

Another embodiment of the present invention relates to a method for processing three-dimensional images, and it includes the steps of: acquiring a plurality of viewpoint images to display three-dimensional images; and varying parallax among the acquired plurality of viewpoint images, based on positions in the viewpoint images. The each step may be implemented as a library function for three-dimensional display and configuration may be such that the library function can be called up as a function from a plurality of programs.

The fourth group of the present invention provides, as a software library, the first to third groups and their related functions, and it relates to a technology with which to lighten the programmer's burden and to promote the popularization of 3D display application. The following relates to the fourth group.

An embodiment of the present invention relates to a method for processing three-dimensional images; information related to three-dimensional display is retained on a memory and the thus retained information is put to common use among a plurality of different programs, and when any of those programs displays a three-dimensional image, a state of an image which is to be outputted is determined by referring to the retained information. An example of the state of an image is how much parallax is given to a parallax image or something of this sort.

The "retained information" may include any among the format of an image to be inputted to a 3D image display apparatus, the display order of viewpoint images and parallax amounts among the viewpoint images. In addition to the sharing of the retained information, a processing inherent in 3D image display may be shared by a plurality of programs. An example of the "a processing inherent in 3D image display" is a processing in which to determine the retained information. Another example thereof is a processing, relating to graphical user interface, for determining appropriate parallax, a display processing of a parallax adjusting screen to support the realization of an appropriate parallax state, a processing in which the position of head of a user is detected and tracked, a processing in which images are displayed to adjust the 3D display apparatus, and so forth.

Another embodiment of the present invention relates to a three-dimensional image processing apparatus, and it includes: a three-dimensional sense adjusting unit which provides a user with graphical user interface by which to adjust a stereoscopic effect of a three-dimensional display image; and a parallax control unit which produces parallax images in such a form as to follow a limit parallax turned out as a result of adjustment of stereoscopic effect by the user.

This apparatus may further include an information detecting unit which acquires information to be referred to in order to achieve the appropriateness of 3D display; and a conversion unit which converts, according to the acquired information, the format of the parallax images produced at the parallax control unit.

The parallax control unit may generate the parallax images while obeying the limit parallax by controlling the camera parameters based on the three-dimensional data, may generate the parallax images by controlling the depth of images having depth information attached thereto, or may generate the parallax images after the shift amount of a plurality of two-dimensional images having parallax in the horizontal direction has been decided.

The fifth group of the present invention relates to an application or business model using the above-described three-dimensional processing technologies or their related technologies. A software library for the fourth group can be utilized. The following relates to the fifth group.

An embodiment of the present invention relates to a method for processing three-dimensional images, and the method is such that an appropriate parallax to display a parallax image three-dimensionally is once converted to a form of representation which does not depend on hardware of a display apparatus, and the appropriate parallax by this form of representation is distributed among different display apparatuses.

Another embodiment of the present invention relates also to a method for processing three-dimensional images, and it includes the steps of: reading a user's appropriate parallax acquired by a first display apparatus into a second display apparatus; adjusting parallax of parallax images by the second display apparatus according to the appropriate parallax; and outputting from the second display apparatus the parallax images after adjustment. For example, the first display apparatus is an apparatus that the user normally utilizes whereas the second display apparatus is an apparatus that is provided at a different place. It may further include: reading information on the first display apparatus into the second display apparatus; and correcting, by the second display apparatus according to the appropriate parallax, parallax of the parallax images whose parallax has been adjusted by the step of adjusting parallax of parallax images, based on the read-in information on hardware of the first display apparatus and information on hardware of the second display apparatus.

The information on hardware may include at least any of the size of a display screen, an optimum observation distance of a display apparatus and image separability of the display apparatus.

Another embodiment of the present invention relates to a three-dimensional image processing apparatus, and it includes a first display apparatus, a second display apparatus and a server connected via a network, wherein the first display apparatus sends user's appropriate parallax information acquired by said three-dimensional image processing apparatus to the server, the server receives the appropriate parallax information and records this in association with a user, and when the user requests output of image data at the second display apparatus, said three-dimensional image processing apparatus reads out appropriate parallax information for the user from the sever, adjusts parallax and then outputs a parallax image.

The sixth group of the present invention is based on a new technique through which a new expression method using three-dimensional images is proposed.

An embodiment of the present invention relates to a three-dimensional image processing apparatus. This three-dimensional image processing apparatus is a three-dimensional image processing apparatus which displays three-dimensional images based on a plurality of viewpoint images corresponding to different parallaxes, and it includes: a recommended parallax acquiring unit which acquires a parallax range recommended in the event that the three-dimensional image is displayed by utilizing the three-dimensional image displaying apparatus; and a parallax control unit which sets parallax so that the three-dimensional image is displayed within the acquired recommended parallax range.

It may further include: an object specifying unit which receives, from a user, specification of a predetermined object contained in the three-dimensional image; and an optical axis intersecting position setting unit which associates intersecting positions of optical axes associated with the respective plurality of viewpoint images with specified object positions and which sets the intersecting positions of optical axes so that the specified object is expressed in the vicinity of a position of a display screen on which the three-dimensional image is displayed.

It may further include a specified information adding unit which associates, with the object, optical axis corresponding information indicating that for the specified object the object is associated with the intersecting position of the optical axis and the object is expressed in the vicinity of the position of the display screen.

The optical axis intersecting position setting unit may acquire the optical axis corresponding information, associate the intersecting position of the optical axis with the object described in the acquired optical corresponding information and the object associated with the intersecting position of axis may be expressed in the vicinity of the position of the display screen on which the three-dimensional image is displayed.

It may further include an identification information acquiring unit which acquires identification information, associated with image data used in generating the three dimensional images, containing information on whether or not to express within a basic representation space containing an object to be three-dimensionally displayed, wherein the parallax control unit may causes the acquired identification information to be reflected when the object is expressed in a three-dimensional image.

The identification information may contain information on timing at which the object is expressed in the basic representation space and when the object is expressed in a three-dimensional image, the identification information acquiring unit may reflect the acquired timing.

Another embodiment of the present invention relates to a method for processing three-dimensional images. This method for processing three-dimensional images is such that a predetermined object contained in a three-dimensional image which is displayed based on a plurality of viewpoint images corresponding to different parallaxes is selectable, and if an object is selected, an optical axis intersection position associated with the respective plurality of viewpoint images is associated to a position of the selected object and the optical axis intersecting position is made to approximately coincide with a position of a display screen on which the three-dimensional image is to be displayed. According to this method for processing three-dimensional images, the display screen is set to a boundary between a farther-position space and a nearer-position space, so that an expression in which an object is in a position toward a viewer beyond the display screen is possible.

The specified object may have a predetermined boundary face and the optical axis intersecting position setting unit may associate the intersecting position of optical axis on the boundary face. The three-dimensional image may be generated from three-dimensional data. If the three-dimensional image is generated from the three-dimensional data, it is easy to add various effects to the three-dimensional image. For example, when expressing an object in such a manner as to go over a boundary face, namely, a display screen, such an effect as to deform the display screen can be added.

Still another embodiment of the present invention relates also to a method for processing three-dimensional images. The method for processing three-dimensional images is such that in the vicinity of a display screen where an three-dimensional image generated based on a plurality of viewpoint images corresponding to different parallaxes a boundary face that separates one space from another is set as part of the three-dimensional image and the three-dimensional image is expressed with the boundary face being as boundary of nearer-position space and farther-position space. The boundary face may be a boundary surface between one material and another material and may be a think plate. As the thin plate, there are glass plate and paper and so forth.

Still another embodiment of the present invention relates to a method for processing three-dimensional images. This method for processing three-dimensional images includes the step of changing moving velocity of an object which is contained in a three-dimensional image generated based on a plurality of viewpoint images corresponding to different parallaxes and which is to be expressed in a basic representation space that contains an object to be three-dimensionally displayed, in nearer-position or farther-position direction.

Still another embodiment of the present invention relates also to a method for processing three-dimensional images. This method for processing three-dimensional images is such that when a three-dimensional image is generated based on a plurality of viewpoint images corresponding to different parallaxes, an object to be expressed within a basic representation space that contains an object to be three-dimensionally displayed is expressed so as to fall within a predetermined parallax range and, simultaneously, at least one of forefront surface and rearmost surface of the basic representation space is set to a position where no object exists.

Still another embodiment of the present invention relates also to a method for processing three-dimensional images. This method for processing three-dimensional images may be such that when parallax of an object to be expressed within a basic representation space that contains an object to be three-dimensionally displayed is calculated in the event that a three-dimensional image is generated based on a plurality of viewpoint images corresponding to different parallaxes, the parallax of an object is calculated as size that contains an extended area in front of the object in place of actual size of the object. Moreover, if the object moves further forward in such a form as to contain the extended area in front thereof after the object is positioned in forefront surface of the basic representation space, the object may be expressed in such a manner as to move the extended area in front thereof.

Still another embodiment of the present invention relates also to a method for processing three-dimensional images. This method for processing three-dimensional images is such that when parallax of an object to be expressed within a basic representation space that contains an object to be three-dimensionally displayed is calculated in the event that a three-dimensional image is generated based on a plurality of viewpoint images corresponding to different parallaxes, the parallax of an object is calculated as size that contains an extended area to the rear of the object in place of actual size of the object. Moreover, if the object is positioned in rearmost surface of the basic representation space after the object moves further backward in such a form as to contain the extended area in front thereof, the object may be expressed in such a manner as to move the extended area in back thereof.

The seventh group of the present invention is based on a new technique by which to adjust parallax to be set, according to the state of an image.

An embodiment of the present invention relates to a three-dimensional image processing apparatus. This three-dimensional image processing apparatus includes a parallax control unit which controls a ratio of the width to the depth of an object expressed within a three-dimensional image when the three-dimensional image is generated from three-dimensional data so that a parallax formed thereby does not exceed a parallax range properly perceived by human eyes.

Another embodiment of the present invention relates also to a three-dimensional image processing apparatus. This three-dimensional image processing apparatus includes a parallax control unit which controls a ratio of the width to the depth of an object expressed within a three-dimensional image when the three-dimensional image is generated from a two-dimensional image to which depth information is given so that a parallax formed thereby does not exceed a parallax properly perceived by human eyes.

Still another embodiment of the present invention relates also to a three-dimensional image processing apparatus. This three-dimensional image processing apparatus includes: an image determining unit which performs frequency analysis on a three-dimensional image to be displayed based on a plurality of viewpoint images corresponding to different parallaxes; and a parallax control unit which adjusts a parallax amount according to an amount of high frequency component determined by the frequency analysis. If the amount of high frequency component is large, the parallax control unit may adjust the parallax amount by making it larger.

Still another embodiment of the present invention relates also to a three-dimensional image processing apparatus. This three-dimensional image processing apparatus includes: an image determining unit which detects movement of a three-dimensional image displayed based on a plurality of viewpoint images corresponding to different parallaxes; and a parallax control unit which adjusts a parallax amount according to an amount of the movement of the three-dimensional image. If the amount of movement of a three-dimensional image is small, the parallax control unit may adjust the parallax amount by making it smaller.

Still another embodiment of the present invention relates also to a three-dimensional image processing apparatus. This three-dimensional image processing apparatus is such that if a parameter on camera placement set for generating viewpoint images is to be changed in the event of generating three-dimensional images from three-dimensional data, the camera parameter falls within threshold values which are provided beforehand for a variation of the parameter. According to this, a sense of discomfort felt by a viewer of a three-dimensional image due to a rapid change in parallax can be reduced.

Still another embodiment of the present invention relates also to a three-dimensional image processing apparatus. This three-dimensional image processing apparatus is such that in a case when moving images of three-dimensional images are generated from two-dimensional moving images to which depth information are given, control is performed so that a variation, caused by progression of the two-dimensional moving images, in a maximum value or minimum value of depth contained in the depth information falls within threshold values provided beforehand. According to this apparatus, a sense of discomfort felt by a viewer of a three-dimensional image due to a rapid change in parallax can be reduced.

Still another embodiment of the present invention relates to a method for processing three-dimensional images. This method for processing three-dimensional images is such that appropriate parallax of a three-dimensional image displayed based on a plurality of viewpoint images corresponding to different parallaxes is set for each scene.

Still another embodiment of the present invention relates to a method for processing three-dimensional images. This method for processing three-dimensional images is such that appropriate parallax of a three-dimensional image displayed based on a plurality of viewpoint images corresponding to different parallaxes is set at predetermined time intervals.

Another embodiment of the present invention relates to a three-dimensional image processing apparatus. This three-dimensional image processing apparatus includes: a camera placement setting unit which sets a plurality of virtual camera dispositions to generate a plurality of viewpoint images when original data from which a three-dimensional image is generated are inputted; an object area determining unit which determines whether an area in which information on an object to be displayed does not exist is caused or not in viewpoint images generated corresponding to virtual cameras; and a camera parameter adjusting unit which adjusts, in a case when an area in which information on an object to be displayed does not exist is caused, at least one of an angle of view of the virtual camera, a camera interval and an intersecting position of an optical axis so that there is no longer any area in which information on an object to be displayed does not exist.

It is to be noted that any arbitrary combination of the above-described structural components and expressions changed between a method, an apparatus, a system, a recording medium, a computer program and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

The above described objectives, other objectives, features and advantages are further made clear by the following preferred embodiments and drawings accompanied thereby.

FIG. 49 shows a depth map.

FIG. 51 shows a depth map corrected by a two-dimensional image generating unit of a second three-dimensional image processing apparatus.

DETAILED DESCRIPTION OF THE INVENTION

The invention will now be described based on preferred embodiments which do not intend to limit the scope of the present invention but exemplify the invention. All of the features and the combinations thereof described in the embodiments are not necessarily essential to the invention.

Figure 1:
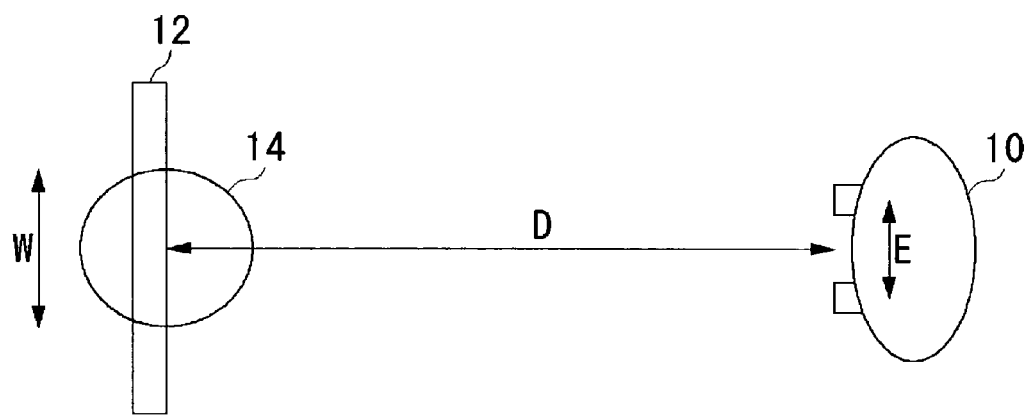
FIG. 1 shows a positional relationship among a user, a screen and a reproduced object to be displayed three-dimensionally.

FIG. 1 shows a positional relationship among a user 10, a screen 12 and a reproduced object 14 to be stereoscopically displayed. The eye-to-eye distance of the user 10 is E, the distance between the user 10 and the screen 12 is D, and the width of the reproduced object 14 when displayed is W. The reproduced object 14, which is 3D-displayed, has pixels that look nearer than the screen 12, namely nearer-positioned pixels, and those that look farther than the screen 12, namely farther-positioned pixels. The pixels with no parallax given appear to be on the screen 12 because they appear to be in the same positions on the screen 12 from both eyes.

Figure 2:
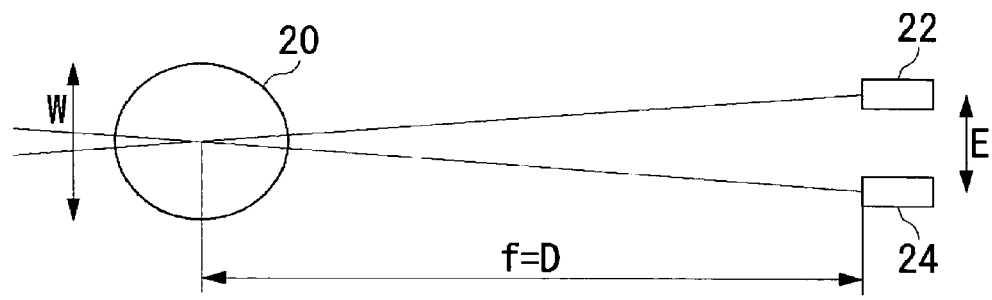
FIG. 2 shows an example of a shooting system to realize a state of FIG. 1.

FIG. 2 shows a shooting system for generating an ideal display of FIG. 1. The interval between the two cameras 22 and 24 is E, and the distance from them to the optical axis intersecting position when a real object 20 is viewed from them (called an optical axis intersecting distance) is D. And if an object 20 whose width is actually W is shot at an angle of view formed by lines of sight so as to realize the same width as the screen 12, a parallax image can be obtained from the two cameras. By displaying this on the screen 12 of FIG. 1, the ideal state of FIG. 1 can be realized.

Figure 3:
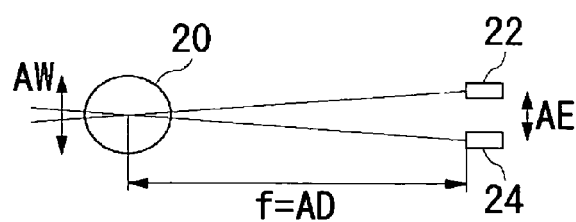
FIG. 3 shows another example of a shooting system to realize a state of FIG. 1.
Figure 4:
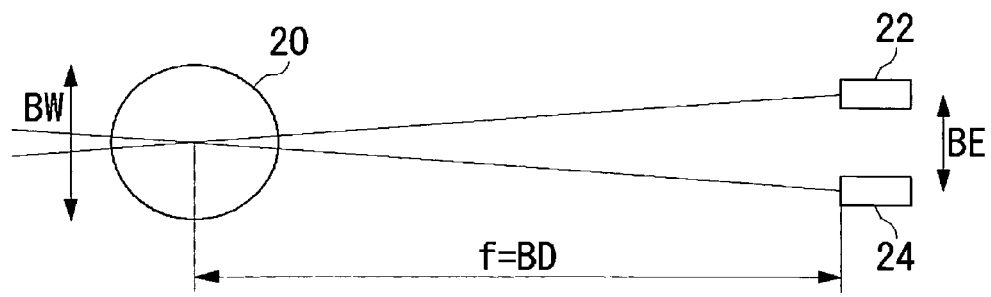
FIG. 4 shows still another example of a shooting system to realize a state of FIG. 1.

FIGS. 3 and 4 show, respectively, the states of A times (A<1) and B times (B>1) the positional relationship of FIG. 2. The parallax images obtained in these positional relationships can also realize the ideal state of FIG. 1. That is, the basics of ideal 3D display begins with ensuring a constant ratio of W:D:E. This relationship serves also as a basis for producing parallax.

FIGS. 5 to 10 show an outline of processing for 3D display based on three-dimensional data on objects 20 according to an embodiment of the present invention.

Figure 5:
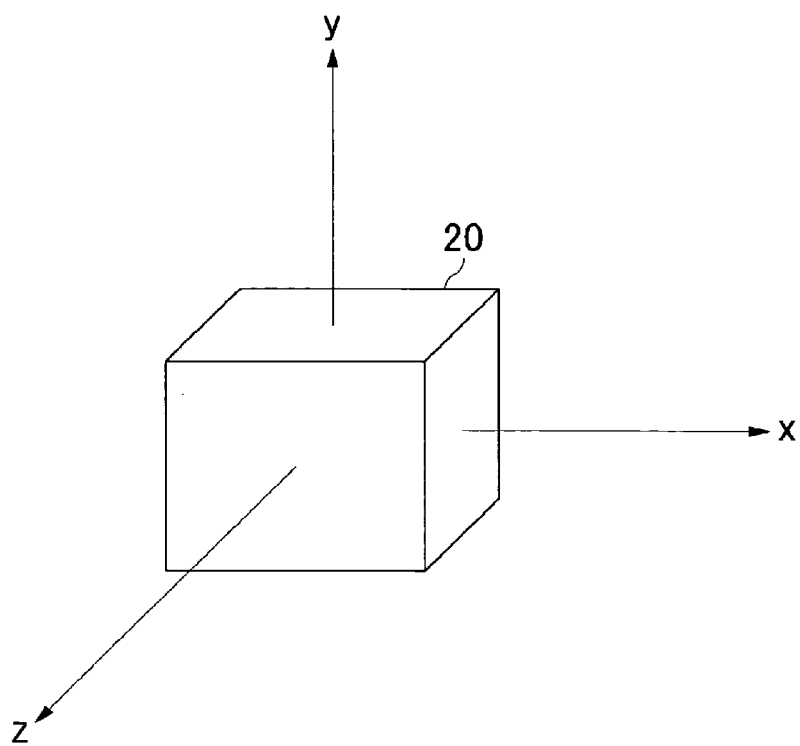
FIG. 5 shows a model coordinate system used in a first three-dimensional image processing apparatus.

FIG. 5 is a model coordinate system, namely, a coordinate space possessed by individual 3D objects 20. This space provides coordinates when a modeling of an object 20 is done. Normally the origin is placed at the center of an object 20.

Figure 6:
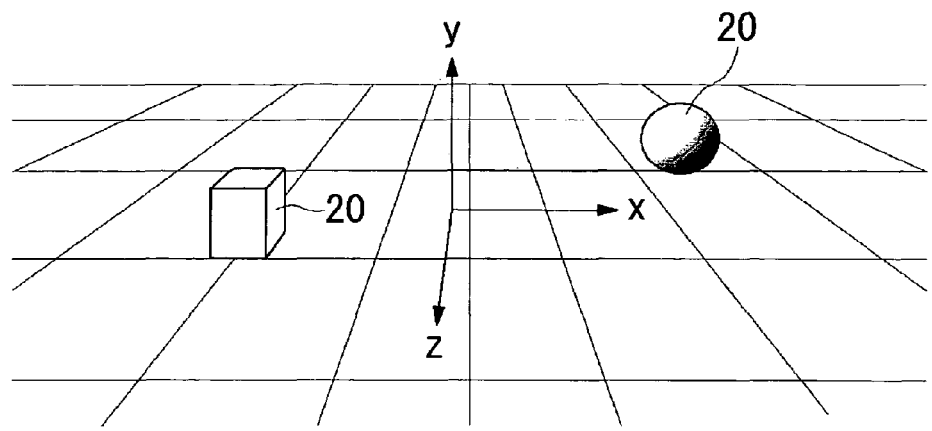
FIG. 6 shows a system of world coordinates used in the first three-dimensional image processing apparatus.

FIG. 6 shows a system of world coordinates. The world space is a wide space where a scene is formed with objects 20, the floor and the walls arranged. A process from the modeling of FIG. 5 to the determination of a world coordinate system as in FIG. 6 can be recognized as a "structuring of three-dimensional data".

Figure 7:
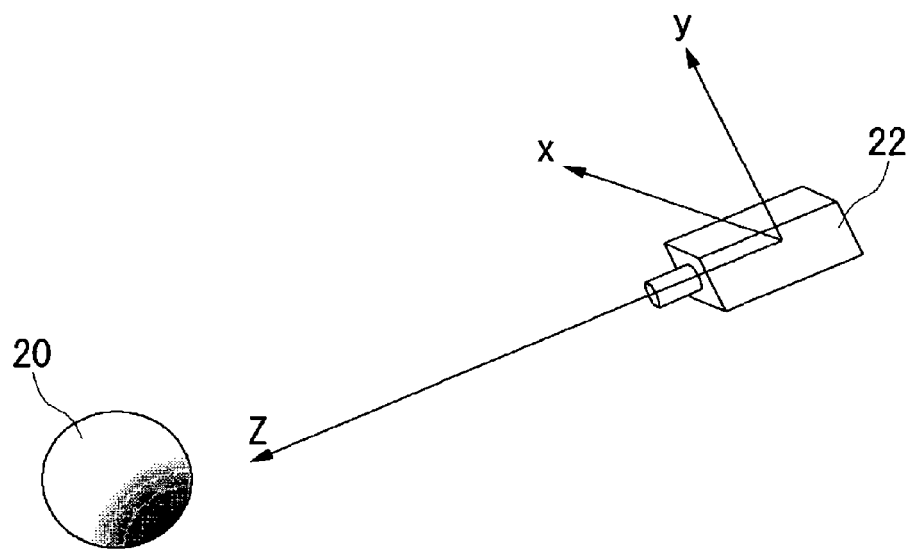
FIG. 7 shows a camera coordinate system used in the first three-dimensional image processing apparatus.

FIG. 7 shows a camera coordinate system. A conversion to a camera coordinate system is done by positioning a camera 22 at an arbitrary angle of view in an arbitrary direction from an arbitrary position of a world coordinate system. The position, the direction and the angle of view are camera parameters. In 3D display, the parameters are decided for two cameras, so that the camera interval and the optical axis intersection position are also decided. Since a middle point between the two cameras is moved to the origin, origin movement is done also.

Figure 8:
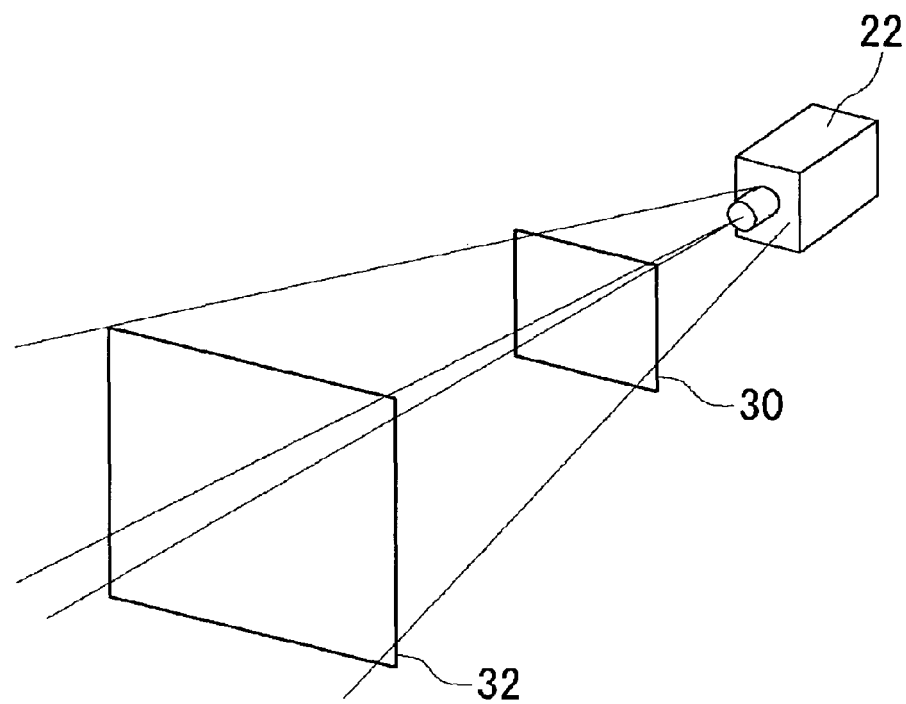
FIG. 8 shows a view volume used in the first three-dimensional image processing apparatus.
Figure 9:
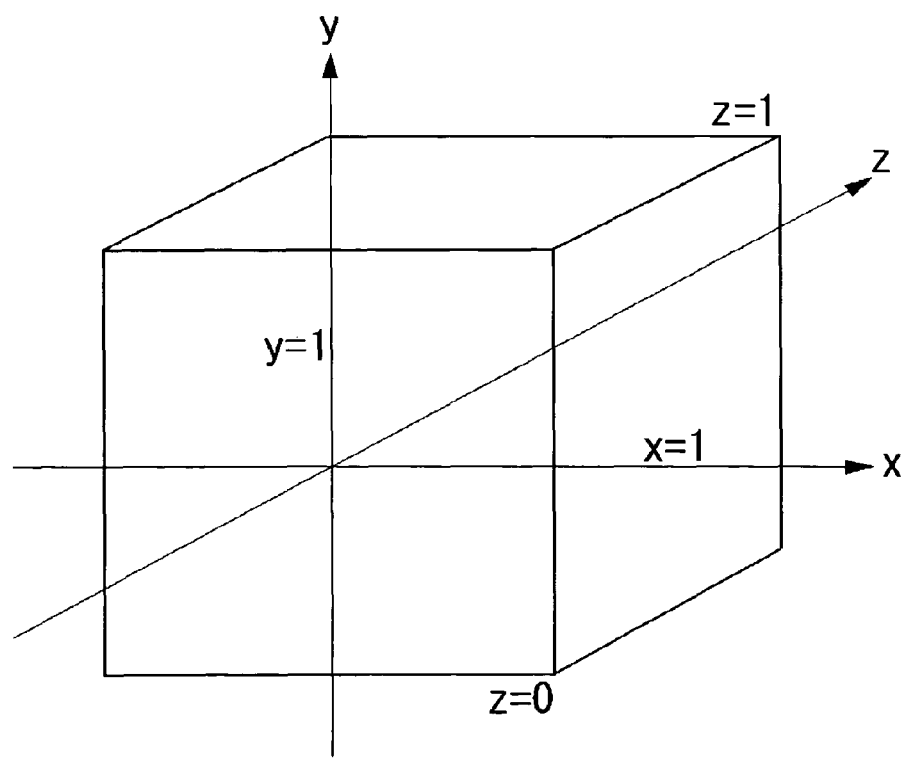
FIG. 9 shows a coordinate system after perspective conversion performed on volume of FIG. 8.

FIGS. 8 and 9 show perspective coordinate systems. Firstly, as shown in FIG. 8, a space to be displayed is clipped at a front projection plane 30 and a back projection plane 32. As will be described later, one of the features of an embodiment is that a plane with a nearer-positioned maximum parallax point is used as the front projection plane 30 and a plane with a farther-positioned maximum parallax point as the back projection plane 32. After the clipping, this view volume is converted into a rectangular parallelepiped as shown in FIG. 9. The processing in FIGS. 8 and 9 is called a projection processing also.

Figure 10:
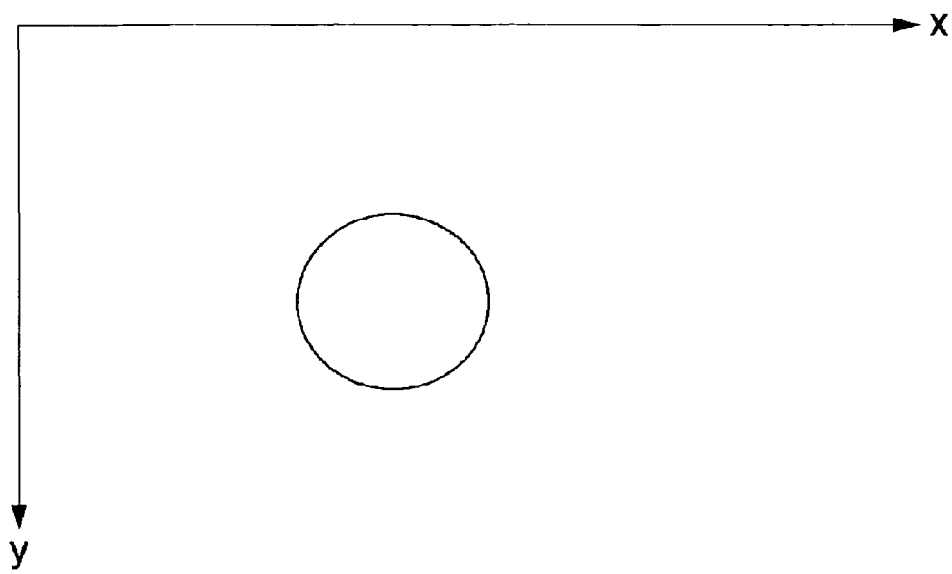
FIG. 10 shows a screen coordinate system used in the first three-dimensional image processing apparatus.

FIG. 10 shows a screen coordinate system. For three-dimensional display, the respective images from a plurality of cameras are converted into their respective coordinates possessed by the screen, thereby generating a plurality of two-dimensional images, namely, parallax images.

Figure 11:
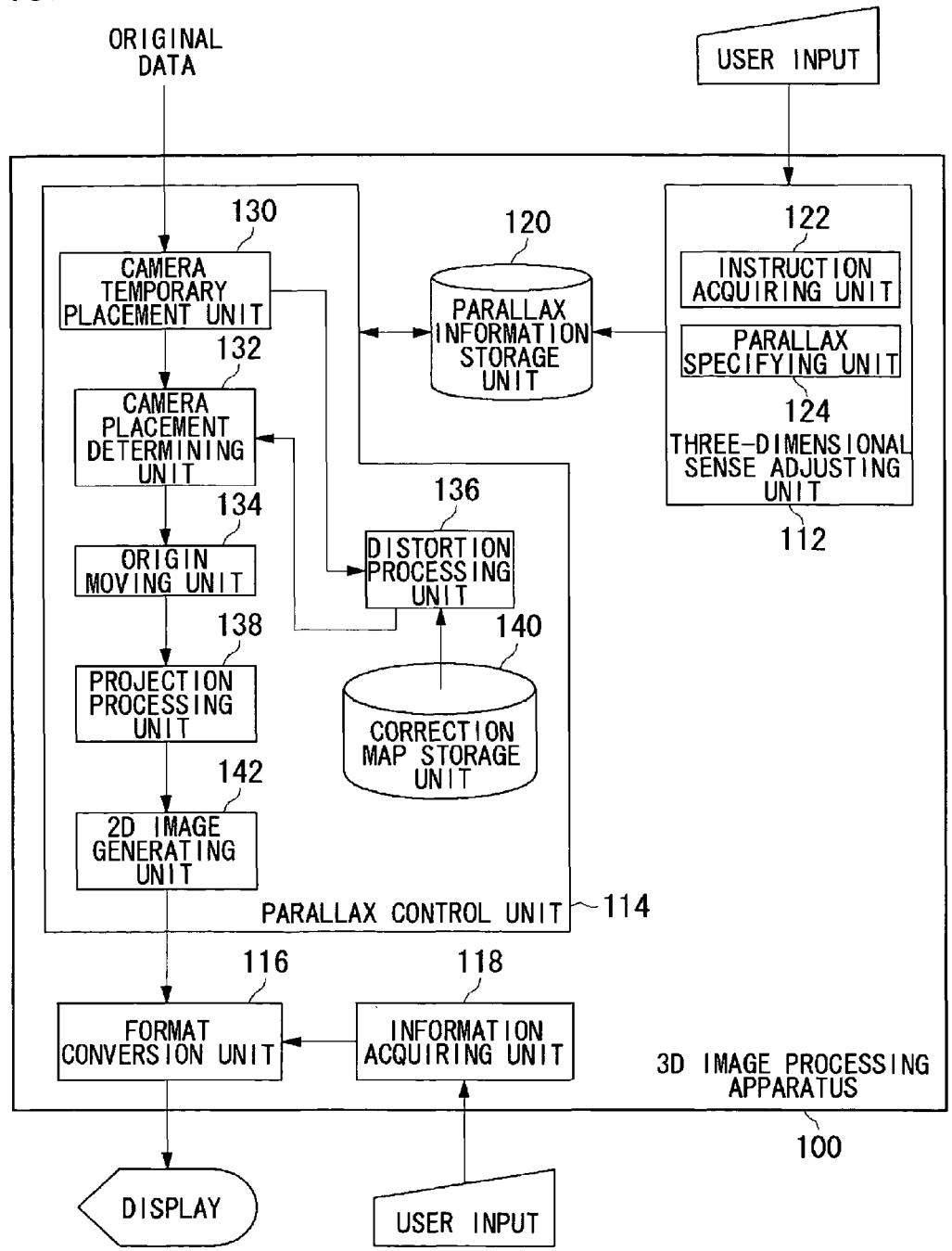
FIG. 11 shows a structure of a first three-dimensional image processing apparatus.
Figure 12:
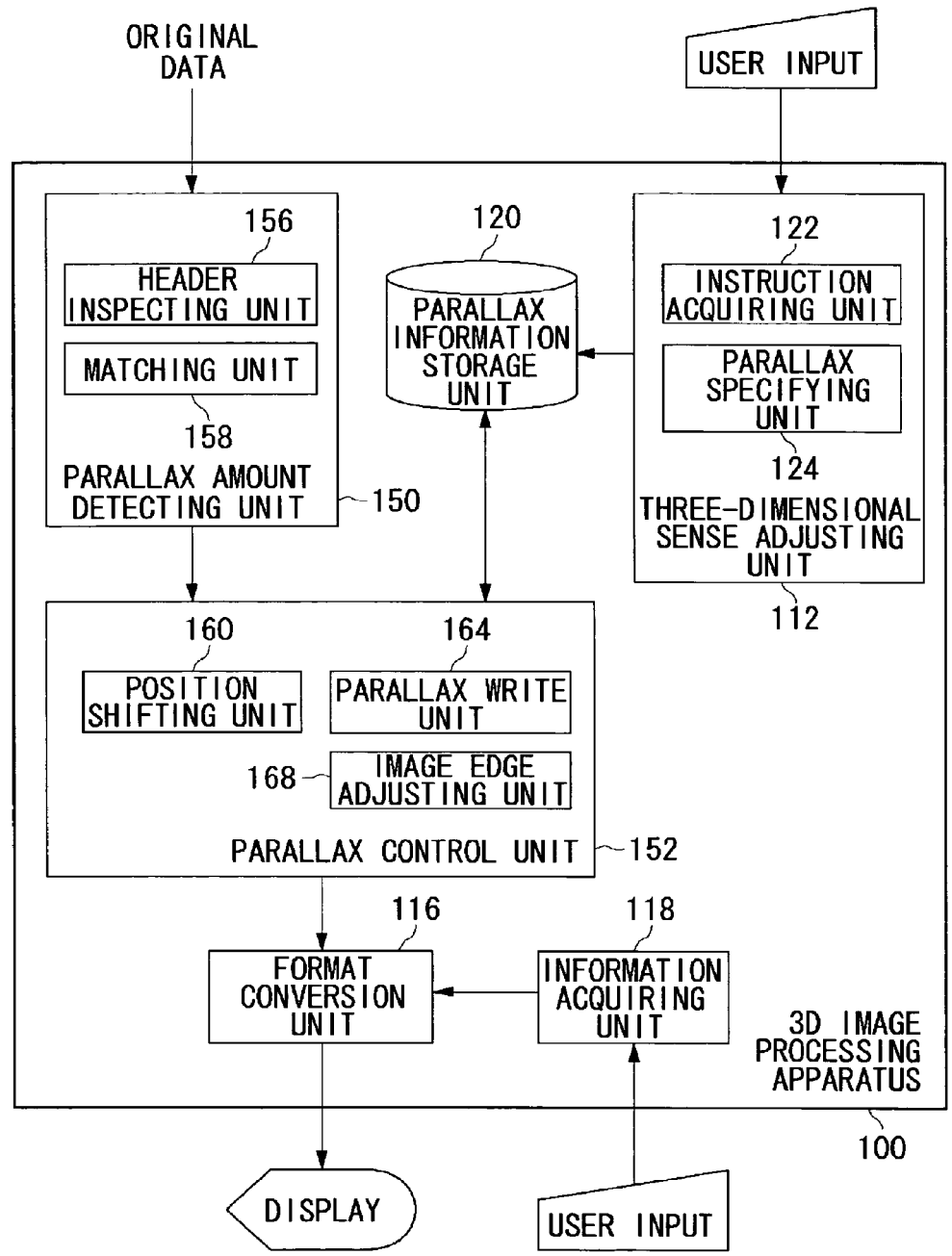
FIG. 12 shows a structure of a second three-dimensional image processing apparatus.
Figure 13:
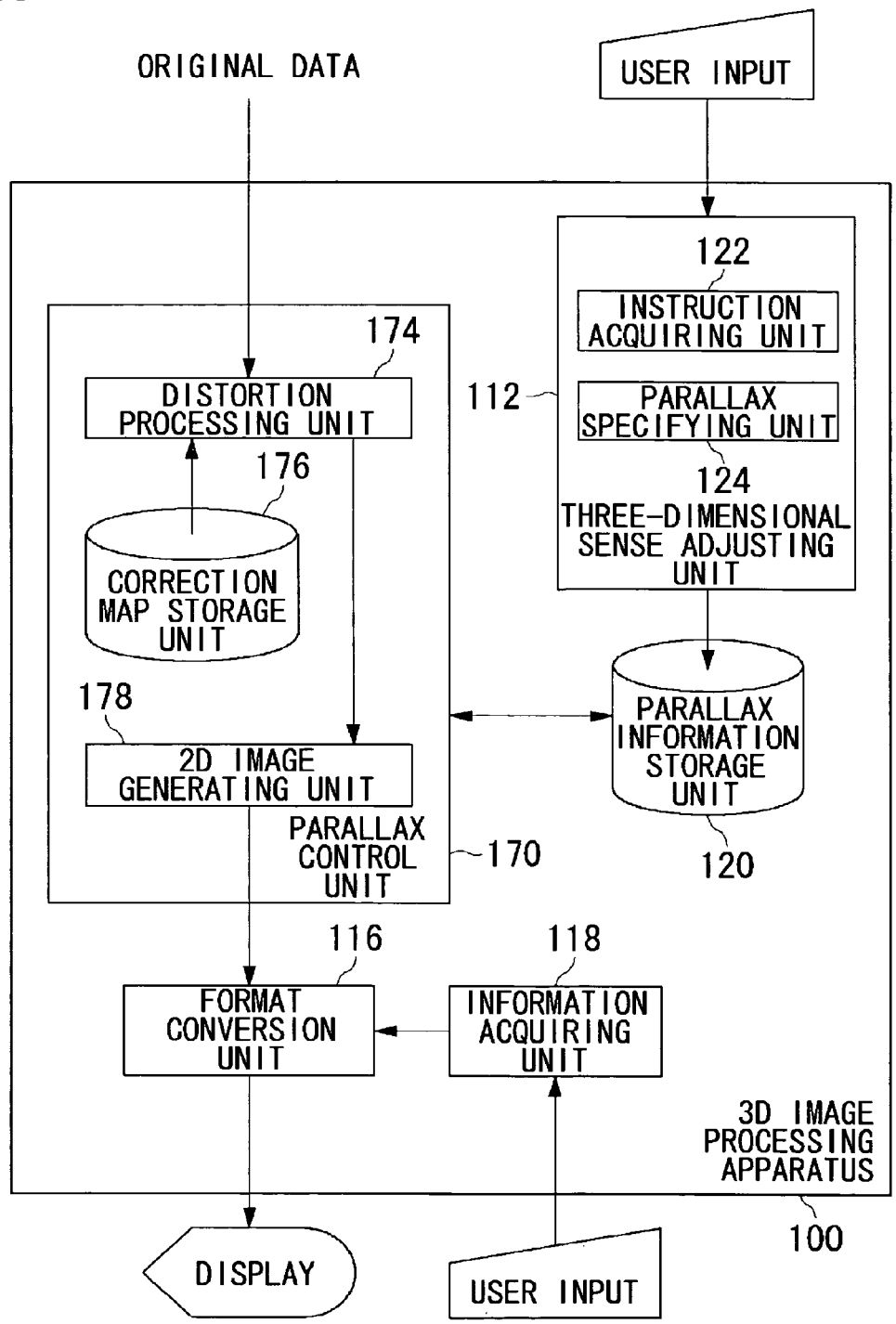
FIG. 13 shows a structure of a third three-dimensional image processing apparatus.

FIGS. 11, 12 and 13 show the structures of three-dimensional image processing apparatuses 100 having different parts from each other. Hereinbelow, for the sake of convenience, these three-dimensional image processing apparatuses 100 are also called the first, the second and the third three-dimensional image processing apparatus 100, respectively. Though it is possible that these three-dimensional image processing apparatuses 100 are incorporated in one piece in an apparatus, they are shown here as three separate units to avoid complexity of figure representation. The first three-dimensional image processing apparatus 100 proves effective when the object and space to be rendered are available from the stage of three-dimensional data, so that the main input thereto is three-dimensional data. The second three-dimensional image processing apparatus 100 proves effective for parallax adjustment of a plurality of two-dimensional images with parallax already given, namely, existing parallax images, so that two-dimensional parallax images are inputted thereto. The third three-dimensional image processing apparatus 100 realizes appropriate parallax by operating the depth information of images with depth information, so that the main input thereto is images with depth information. These three types of input are generically written as "original data".

When the first to the third three-dimensional image processing apparatuses 100 are to be integrated in a single unit, the structure may be such that an "image type determining unit" is provided as a preprocessing unit for them and after the determination of a three-dimensional data, parallax image or image with depth information, the most appropriate of the first to the third three-dimensional image processing apparatus 100 can be started.

The first three-dimensional image processing apparatus 100 has a function of "initial setting" and "automatic adjustment" in setting a stereoscopic sense for 3D display. If the user specifies the range of his/her appropriate parallax for a three-dimensionally displayed image, it will be acquired by the system and from then on other three-dimensional images, when they are to be displayed, will be displayed after a conversion processing has been done to them beforehand to realize this appropriate parallax. Accordingly, if the user, as a rule, goes through one time of setting procedure, using the first three-dimensional image processing apparatus 100, then he/she can thenceforth enjoy 3D displays well suited for himself/herself.

The first three-dimensional image processing apparatus 100 also has a subfunction called "parallax correction" by which the parallax at the periphery of an image is eased artificially. As was described already, the closer to the edges of an image, the more often the dislocations of a plurality of parallax images will be recognized as "double images". The main cause of this is parallax barrier or mechanical errors such as the curvature of the screen of a display apparatus. For the correction at the periphery of an image, therefore, various methods are used, which include 1) reducing both the nearer-positioned parallax and farther-positioned parallax, 2) reducing the nearer-positioned parallax and keeping the farther-positioned parallax unchanged, and 3) shifting the nearer-positioned parallax and the further-positioned parallax as a whole toward the farther-positioned parallax. It is to be noted that the third three-dimensional image processing apparatus 100 also has this "parallax correction" function, but the processing differs because of the difference in input data.

The first three-dimensional image processing apparatus 100 includes a three-dimensional sense adjusting unit 112 which adjusts a stereoscopic effect based on the response from a user to a three-dimensionally displayed image, a parallax information storage unit 120 which stores an appropriate parallax specified by the three-dimensional sense adjusting unit 112, a parallax control unit 114 which reads out the appropriate parallax from the parallax information storage unit 120 and generates a parallax image having the appropriate parallax from original data, an information acquiring unit 118 which has a function of acquiring hardware information on a display apparatus and also acquiring a system of 3D display, and a format conversion unit 116 which changes the format of the parallax image generated by the parallax control unit 114 based on the information acquired by the information acquiring unit 118. The original data is simply called three-dimensional data, but, strictly speaking, what corresponds to it is object and space data described in a world coordinate system.

As examples of information acquired by the information acquiring unit 118, there are the number of viewpoints for 3D display, the system of a stereo display apparatus such as space division or time division, whether shutter glasses are used or not, the arrangement of viewpoint images in the case of a multiple-eye system, whether there is any arrangement of viewpoint images with inverted parallax among the parallax images, the result of head tracking and so forth. Exceptionally, however, the result of head tracking is inputted directly to a camera placement determining unit 132 via a route not shown and processed there.

In terms of hardware, the above-described structure can be realized by a CPU, a memory and other LSIs of an arbitrary computer, whereas in terms of software, it can be realized by programs which have GUI function, parallax controlling function and other functions or the like, but drawn here are function blocks that are realized in cooperation with those. Thus, it is understood by those skilled in the art that these function blocks can be realized in a variety of forms such as hardware only, software only or combination thereof, and the same is true as to the structure in what follows.

The three-dimensional sense adjusting unit 112 includes an instruction acquiring unit 122 and a parallax specifying unit 124. The instruction acquiring unit 122 acquires a range of appropriate parallax when it is specified by the user to the image displayed three-dimensionally. The parallax specifying unit 124 specifies, based on the range, the appropriate parallax when the user uses this display apparatus. An appropriate parallax is expressed in a form of expression that does not depend on the hardware of a display apparatus. Stereoscopic vision matching the physiology of the user can be achieved by realizing the appropriate parallax.

The parallax control unit 114 essentially includes a camera temporary placement unit 130 which temporarily sets camera parameters, a camera placement determining unit 132 which corrects the camera parameters temporarily set according to an appropriate parallax, an origin moving unit 134 which performs an origin movement processing to turn the middle point of a plurality of cameras into the origin when the camera parameters are decided, a projection processing unit 138 which performs the aforementioned projection processing, and a two-dimensional image generating unit 142 which generates parallax images by performing a conversion processing into screen coordinates after the projection processing. Also, as the need arises, a distortion processing unit 136, which performs a space distortion conversion (hereinafter referred to simply as distortion conversion also) to ease the parallax at the periphery of an images, is provided between a camera temporary placement unit 130 and a camera placement determining unit 132. The distortion processing unit 136 reads out a correction map to be described later from a correction map storage unit 140 and utilizes it.

If it is necessary to adjust a display apparatus for 3D display, a GUI, which is not shown, may be added for that purpose. Using this GUI, a processing may be carried out in such a manner that an optimum display position is determined by micro-shifting the whole parallax image display up, down, right or left.

The second three-dimensional image processing apparatus 100 of FIG. 12 receives inputs of a plurality of parallax images. They are simply called input images also. The second three-dimensional image processing apparatus 100 loads an appropriate parallax having been acquired by the first three-dimensional image processing apparatus 100, adjusts the parallax of input images into an appropriate parallax range and outputs it. In that sense, the second three-dimensional image processing apparatus 100 has an "automatic adjustment" function of parallax. However, in addition to that, it has also a "manual adjustment" function with which the user, using the GUI function offered, can change the parallax according to his/her instructions when he/she wants to change the stereoscopic effect while a 3D display is actually going on.

The parallax of parallax images which has already been generated cannot usually be changed, but, by the use of the second three-dimensional image processing apparatus 100, the stereoscopic effect can be changed at a sufficiently practicable level by shifting the synthesis position of viewpoint images constituting the parallax images. The second three-dimensional image processing apparatus 100 displays a satisfactory three-dimensional sense adjusting function even in a situation where the input data cannot be traced back to three-dimensional data. The following description will mainly touch on the differences from the first three-dimensional image processing apparatus 100.

The three-dimensional sense adjusting unit 112 is utilized for manual adjustment. The instruction acquiring unit 122 realizes a numerical input, such as "+n" or "−n" on the screen for instance, and the value is specified by the parallax specifying unit 124 as an amount of change in parallax. There are some ways conceivable for the relationship between the numerical values and the stereoscopic effect to be instructed. For example, the arrangement may be such that "+n" is an instruction for a stronger stereoscopic effect and "−n" for a weaker stereoscopic effect and that the larger the value of n, the greater the amount of change in stereoscopic effect will be. Also, the arrangement may be such that "+n" is an instruction for a general movement of an object in the direction of a nearer position while "−n" is an instruction for a general movement of an object in the direction of a farther position.

As another method, the arrangement may be such that the value of n is not specified, and instead the "+" and "−" buttons only are displayed and the parallax changes at each click on either one of these buttons. The second three-dimensional image processing apparatus 100 includes a parallax amount detecting unit 150 and a parallax control unit 152. Where input images are a plurality of parallax images, the parallax amount detecting unit 150 checks out a header area of these parallax images and acquire the amount of parallax described in the number of pixels, especially, the numbers of pixels of the nearer-positioned maximum parallax and the farther-positioned maximum parallax, if any. If there is no description of the amount of parallax, a matching unit 158 specifies the amount of parallax by detecting the corresponding points between parallax images by the use of a known technique such as block matching. The matching unit 158 may perform the processing only on an important area such as the middle part of an image or may focus its detection on the number of pixels of the nearer-positioned maximum parallax, which is the most important. The amount of parallax thus detected is sent in the form of the number of pixels to the parallax control unit 152.

Generally, when three-dimensional images are displayed on the display screen of a portable telephone, there may be little difference among individuals as to their response to stereoscopic effects and there may be cases where the user finds it troublesome to have to input an appropriate parallax. With a 3D display equipment used by an unspecified large number of users, it is possible that the input of an appropriate parallax strikes the users as troublesome instead of convenient. In such a case, an appropriate parallax range may be determined by the manufacturer of the three-dimensional image display apparatus or by the producer of the contents to be displayed by the three-dimensional image display apparatus, or it may be determined by some other technique, such as following general guidelines. For example, they may reflect the guidelines or standards drawn up by industrial organizations or academic societies related to three-dimensional images. As the example thereof, if there is a guideline "The maximum parallax shall be about 20 mm for a 15-inch display screen", then this guideline may be followed, or a processing, such as correction, based on the guideline may be carried out. In this case, the three-dimensional sense adjusting unit 112 will be unnecessary.

A position shifting unit 160 of the parallax control unit 152 shifts, in the horizontal direction, the synthesis position of viewpoint images constituting parallax images so that the amount of parallax between viewpoint images may become an appropriate parallax. The shifting may be performed on either of the viewpoint images. The position shifting unit 160 has another operation mode and changes an image synthesis position simply following instructions when they are given by a user to increase or decrease the parallax through the three-dimensional sense adjusting unit 112. In other words, the position shifting unit 160 has both the automatic adjustment function and the manual adjustment function to be operated by the user for an appropriate parallax.

A parallax write unit 164 writes the amount of parallax, in the number of pixels, in the header area of any of the plurality of viewpoint images constituting a parallax image, for the aforementioned parallax amount detecting unit 150 or for another use. An image edge adjusting unit 168 fills up the loss of pixels which has resulted at the edges of an image due to the shifting by the position shifting unit 160.

The third three-dimensional image processing apparatus 100 of FIG. 13 receives inputs of images with depth information. The third three-dimensional image processing apparatus 100 adjusts depth in such a way as to realize an appropriate parallax. It has the above-described "parallax correction" function. A distortion processing unit 174 of a parallax control unit 170 carries out a distortion conversion as will be described later, according to a correction map stored in a correction map storage unit 176. The depth information and image after the distortion conversion are inputted to a two-dimensional image generating unit 178, where a parallax image is generated. Different from the two-dimensional image generating unit 142 of the first three-dimensional image processing apparatus 100, this two-dimensional image generating unit 178 gives consideration to an appropriate parallax here. An image with depth information is two-dimensional as an image, so that the two-dimensional image generating unit 178, which has, within itself, a function, though not shown, similar to the position shifting unit 160 of the second three-dimensional image processing apparatus 100, generates stereoscopic effects by shifting the pixels in an image in the horizontal direction according to the depth information. At this time, an appropriate parallax is realized by a processing to be described later.

The processing operations and their principles of each component of the three-dimensional image processing apparatuses 100 whose structures are as described above are as follows.

Figure 14A:
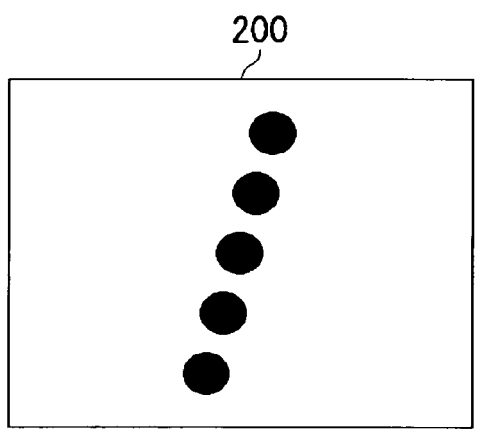
FIG. 14(a) and FIG. 14(b) show respectively a left-eye image and a right-eye image displayed by a three-dimensional sense adjusting unit of a first three-dimensional image processing apparatus.
Figure 14B:
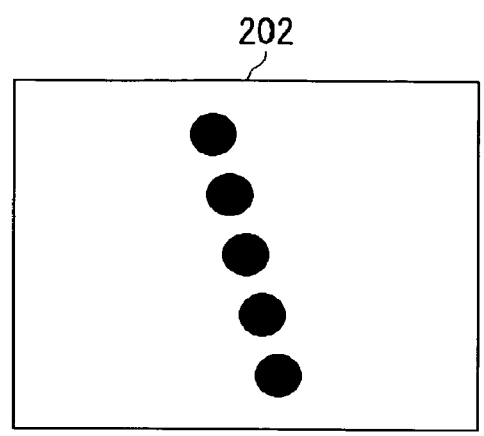

FIG. 14(a) and FIG. 14(b) show respectively a left-eye image 200 and a right-eye image 202 displayed in the process of specifying an appropriate parallax by a three-dimensional sense adjusting unit 112 of a first three-dimensional image processing apparatus 100. The images each display five black circles, for which the higher the position, the nearer the placement and the greater the parallax is, and the lower the position, the farther the placement and the greater the parallax is.

Figure 15:
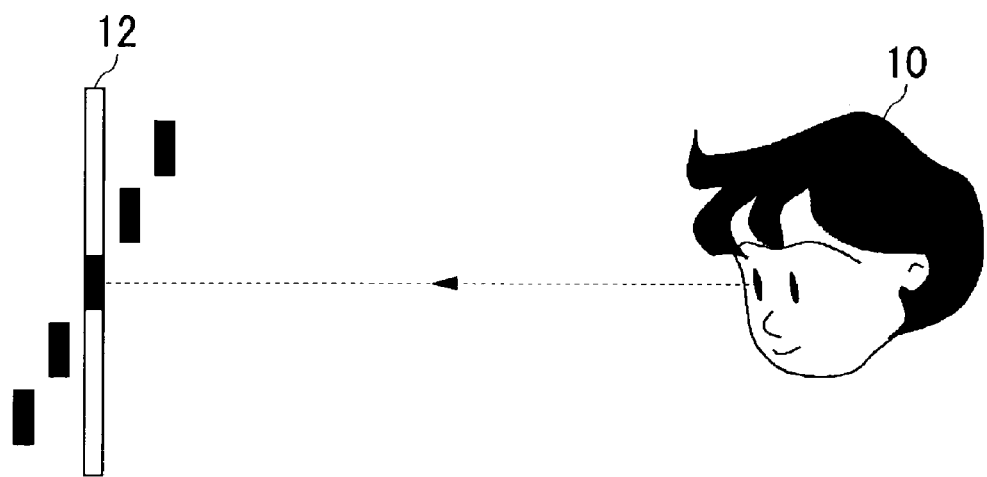
FIG. 15 shows a plurality of objects, having different parallaxes, displayed by a three-dimensional sense adjusting unit of a first three-dimensional image processing apparatus.
Figure 16:
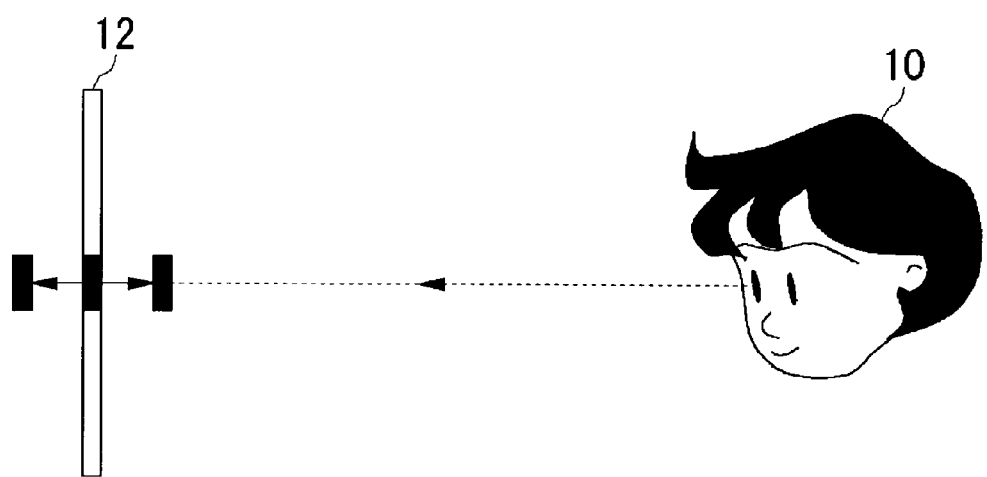
FIG. 16 shows an object, whose parallax varies, displayed by a three-dimensional sense adjusting unit of a first three-dimensional image processing apparatus.

FIG. 15 shows schematically a sense of distance perceived by a user 10 when these five black circles are displayed. The user 10 is responding with "appropriate" for the range of the sense of distance for these five, and this response is acquired by an instruction acquiring unit 122. In the same Figure, the five black circles with different parallaxes are displayed all at once or one by one, and the user 10 performs inputs indicating whether the parallax is permissible or not. In FIG. 16, on the other hand, the display itself is done in a single black circle, whose parallax is changed continuously, and the user 10 responds when the parallax reaches a permissible limit in each of the farther and the nearer placement direction. The response may be made using any known technology, which includes ordinary key operation, mouse operation, voice input and so forth.

Figure 89:
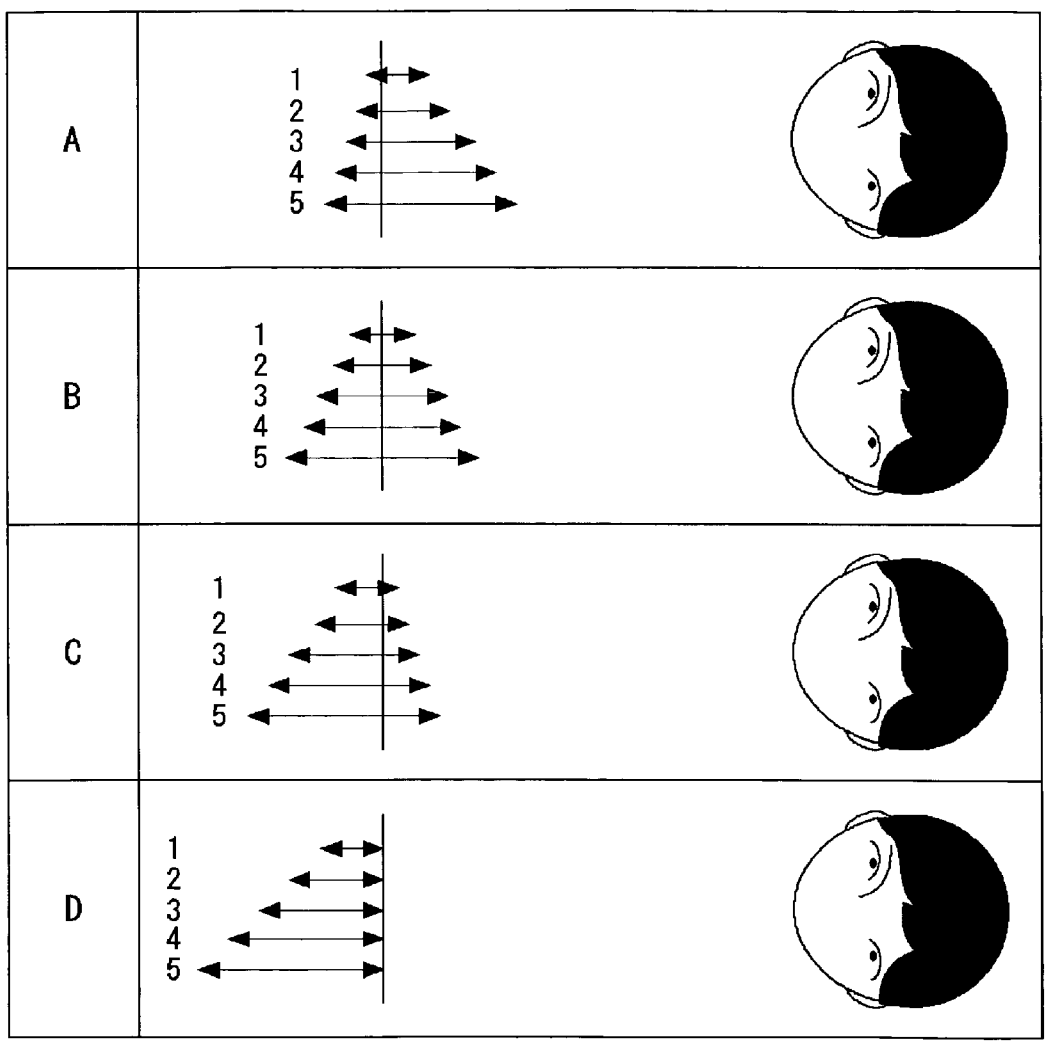
FIG. 89 is a drawing showing a table to be used in a simplified determination of parallax and basic representation space.

Moreover, the determination of parallax may be carried out by a simpler method. Similarly, the determination of the setting range of basic representation space may be carried out by a simple method, too. FIG. 89 shows a table to be used in a simplified determination of parallax and basic representation space. The setting range of basic representation space is divided into four ranks of A to D from the setting with more of nearer-position space to the setting with only farther-position space, and moreover each of the parallaxes is divided into five ranks of 1 to 5. Here, the rank of 5A is to be selected, for instance, if the user prefers a strongest stereoscopic effect and desires a most protruding 3D display. And it is not absolutely necessary that the rank be determined while checking on a 3D display, but the buttons for determining the rank only may be displayed. There may be a button for checking the stereoscopic effect by the side of them, and pushing it may produce a display of an image for checking the stereoscopic effect.

In both cases of FIG. 15 and FIG. 16, the instruction acquiring unit 122 can acquire an appropriate parallax as a range, so that the limit parallaxes on the nearer-position side and the farther-position side are determined. A nearer-positioned maximum parallax is a parallax corresponding to the closeness which the user permits for a point perceived closest to himself/herself, and a farther-positioned maximum parallax is a parallax corresponding to the distance which the user permits for a point perceived farthest from himself/herself. Generally, however, the nearer-positioned maximum parallax often needs to be taken care of for user's physiological reasons, and therefore the nearer-positioned maximum parallax only may sometimes be called a limit parallax, hereinafter.

Figure 17:
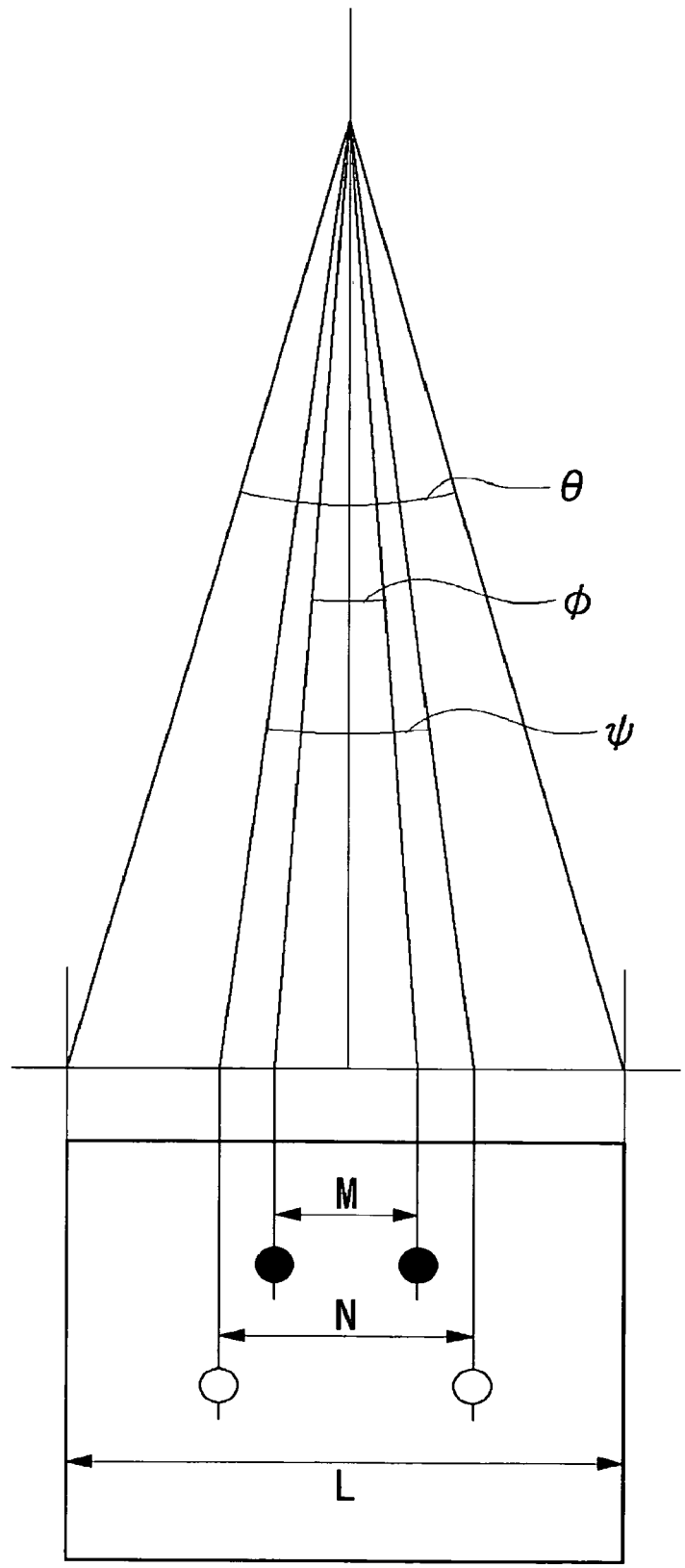
FIG. 17 shows a relationship among camera angle of view, screen size and parallax.

FIG. 17 shows a principle for actually adjusting the parallax of two viewpoints when an image to be displayed three-dimensionally is taken out of three-dimensional data. Firstly, limit parallaxes as decided by the user are converted into subtended angles of a temporarily positioned camera. As shown in the same Figure, the nearer-positioned and farther-positioned limit parallaxes can be denoted respectively by M and N, which are the numbers of pixels, and since the angle of view θ of the camera corresponds to the number of horizontal pixels L of a display screen, the nearer-positioned maximum subtended angle Φ and the farther-positioned maximum subtended angle φ, which are the subtended angles in the numbers of limit parallax pixels, can be represented using θ, M, N and L.

$$\tan(\phi/2) = M\tan(\theta/2)/L$$

$$\tan(\phi/2) = N\tan(\theta/2)/L$$

Figure 18:
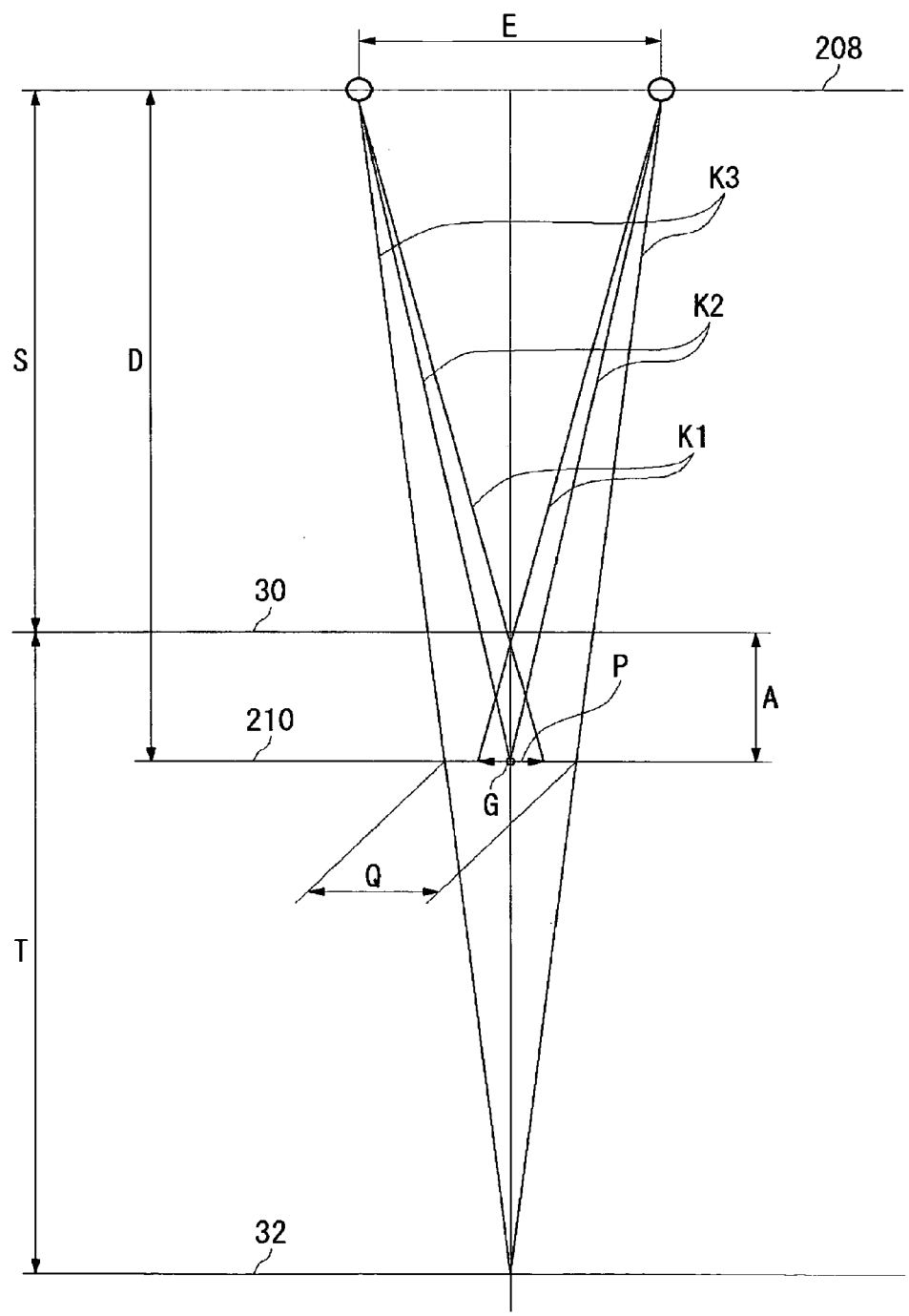
FIG. 18 shows a positional relationship of a shooting system that realizes a state of FIG. 17.

Next, these pieces of information are applied to the taking out of a two-viewpoint image within a three-dimensional space. As shown in FIG. 18, a basic representation space T (its depth is also denoted by T.) is first determined. Here, the basic representation space T is determined by placing limitations on the disposition of objects. The distance from a front projection plane 30, which is the front plane of the basic representation space T, to a camera placement plane, namely, a viewpoint plane 208, is denoted by S. T and S can be specified by the user. There are two viewpoints, and the distance of an optical axis intersection plane 210 thereof from the viewpoint plane 208 is to be D. The distance between the optical axis intersection plane 210 and the front projection plane 30 is denoted by A.

Then, if the nearer-positioned and the farther-positioned limit parallax within the basic representation space T are denoted by P and Q respectively, then $$E:S = P:A$$

$$E:S+T = Q:T-A$$

holds. E is the distance between viewpoints. Now, point G, which is a pixel without parallax given, is positioned where the optical axes K2 from the both cameras intersect with each other on the optical axis intersection plane 210, and the optical axis intersection plane 210 is positioned at a screen surface. The beams of light K1 that produce the nearer-positioned maximum parallax P intersect on the front projection plane 30, and the beams of light K3 that produce the farther-positioned maximum parallax Q intersect on the back projection plane 32.

Figure 19:
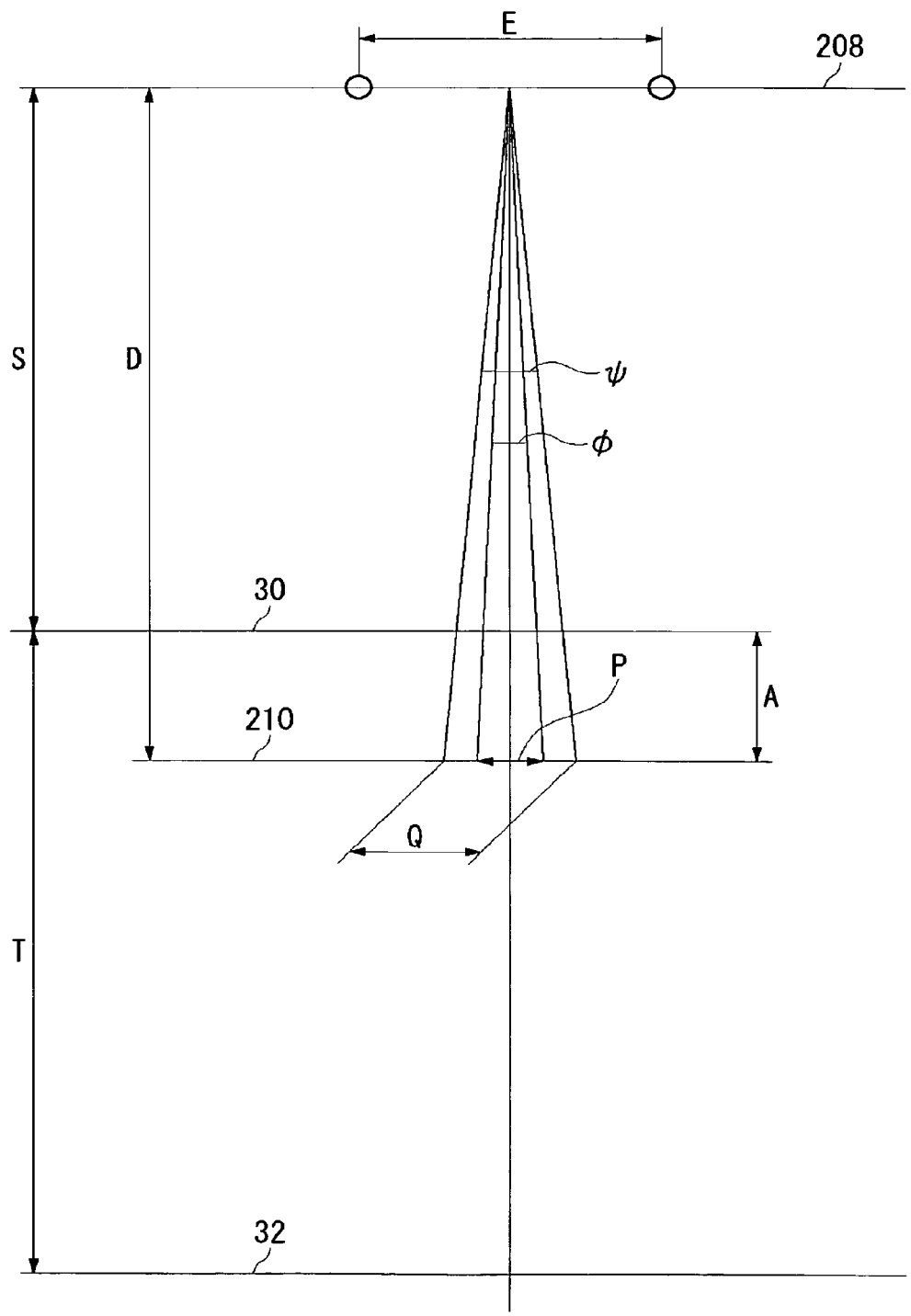
FIG. 19 shows a positional relationship of a shooting system that realizes a state of FIG. 17.

P and Q will be expressed by using φ and φ as in FIG. 19:

$$P = 2(S+A)\tan(\phi/2)$$

$$Q = 2(S+A)\tan(\phi/2)$$

As a result thereof, $$E = 2(S+A)\tan(\theta/2) \cdot (SM+SN+TN)/(LT)$$

$$A = STM/(SM+SN+TN)$$

is obtained. Now, since S and T are known, A and E are automatically determined, thus automatically determining the optical axis intersection distance D and the distance E between cameras and determining the camera parameters. If the camera placement determining unit 132 determines the positions of cameras according to these parameters, then from here on, parallax images with an appropriate parallax can be generated and outputted by carrying out the processings of the projection processing unit 138 and the two-dimensional image generating unit 142 independently for the images from the respective cameras. As has been described, E and A, which do not contain hardware information, realize a mode of representation not dependent on hardware.

Subsequently, if the cameras are placed in observance of A or D and E for 3D display of other images, too, then an appropriate parallax can be realized automatically. All the process from specification of an appropriate parallax to an ideal 3D display can be automated. Thus, if this function is offered as a software library, programmers who produce contents or applications need not to be conscious of programming for 3D display. Also, if L, M and N are represented by the numbers of pixels, then L will be indicative of display range; therefore, it is possible to specify by L whether the display is to be a display by a whole screen or by part of the screen. L is also a parameter which is not dependent on hardware.

Figure 20:
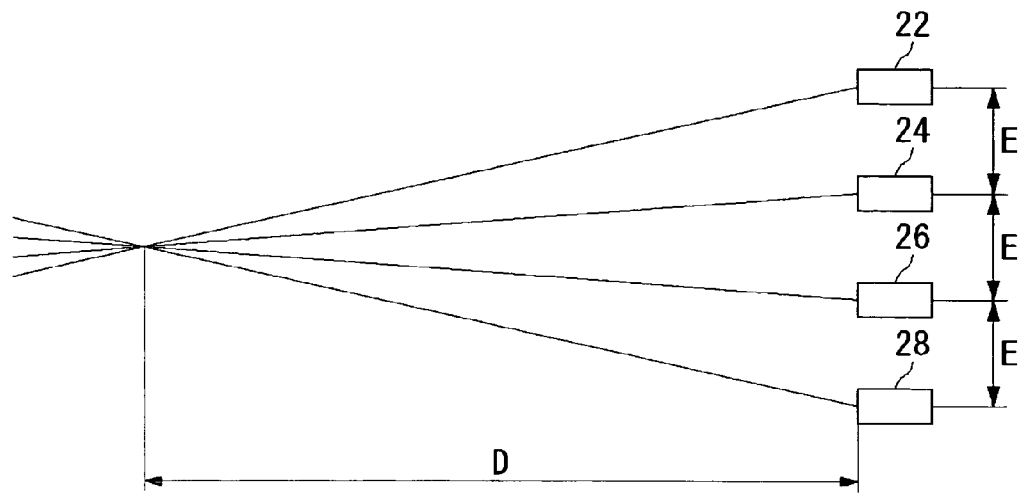
FIG. 20 shows camera arrangement when a multiple viewpoint image is generated with appropriate parallax.

FIG. 20 shows a four-eye camera arrangement by four cameras 22, 24, 26 and 28. To be precise, the above-mentioned A and E should be determined to achieve an appropriate parallax between adjacent cameras, such as between the first camera 22 and the second camera 24. However, in a simplified processing, nearly the same effect is obtained by using the A and E determined between the second camera 24 and the third camera 26, which are closer to the center, as those between the other cameras as well.

Although T has been said to be a limitation on the disposition of objects, T may be decided by a program as a basic size of three-dimensional space. In this case, the objects may be arranged within the basic representation space T only throughout the program, or, for an effective display, parallaxes may sometimes be given intentionally to the objects such that they fly out of the space.

As another example, T may be determined for the coordinates of the nearest-positioned object and the farthest-positioned object in the three-dimensional space, and if this is done in real time, the objects can, without fail, be positioned in the basic representation space T. As an exception to putting objects always in the basic representation space T, a short-time exception can be made by applying a relaxing condition that "the average position of objects in a certain period of time stays within the basic representation space T". Moreover, the objects that define the basic representation space T may be limited to stationary objects, and in this case, dynamic objects can be given such exceptional behavior as sticking out from the basic representation space T. As still another example, a conversion of contracting a space with objects already arranged therein into the size of the width T of basic representation space may be performed, and this may also be combined with the aforementioned operation. It is to be noted that a technique for intentionally displaying objects such that they appear flying out of the basic representation space will be described later.

It is to be noted that if the three-dimensional sense adjusting unit 112 of the first three-dimensional image processing apparatus 100 is so set as to have a tendency to generate double images as images displayed for the user, then the limit parallaxes will be determined on the small side, with the result that the frequency of the appearance of double images when other images are displayed can be reduced. It is known that double images often occur when the color and brightness contrast between an object and the background, and therefore such images as these may be utilized at a stage of specifying limit parallaxes, that is, at the time of initial setting.

FIG. 21 through FIG. 36 show processings and their principles of a distortion processing unit 136 of a first three-dimensional image processing apparatus 100.

Figure 21:
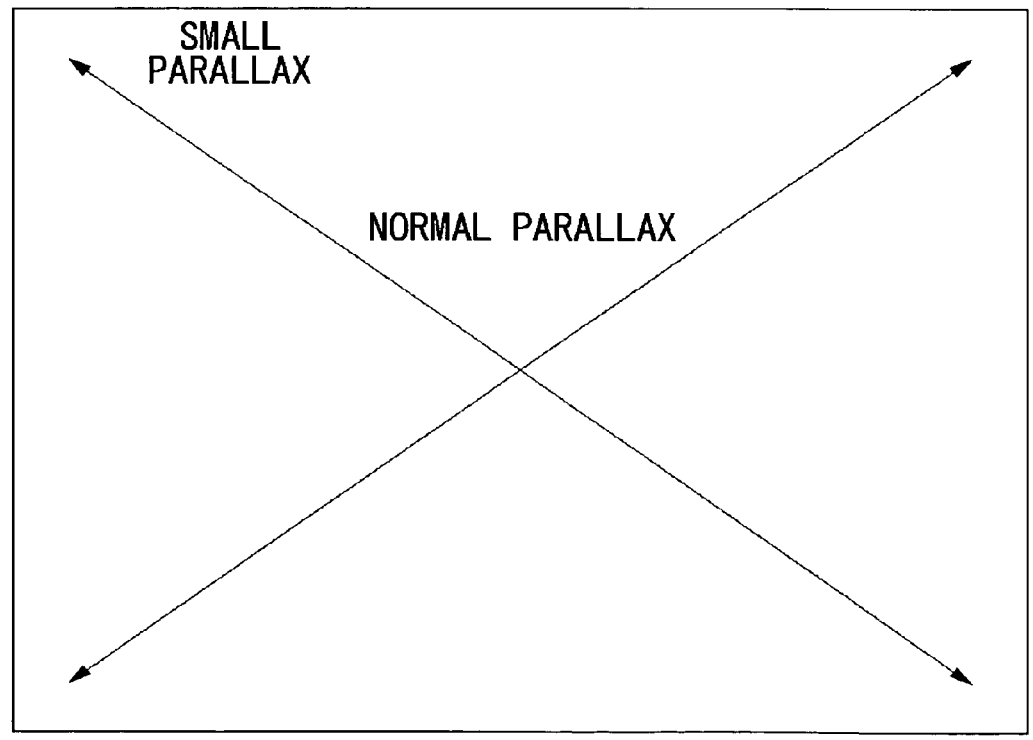
FIG. 21 shows a parallax correction map used in a distortion processing unit of a first three-dimensional image processing apparatus.
Figure 22:
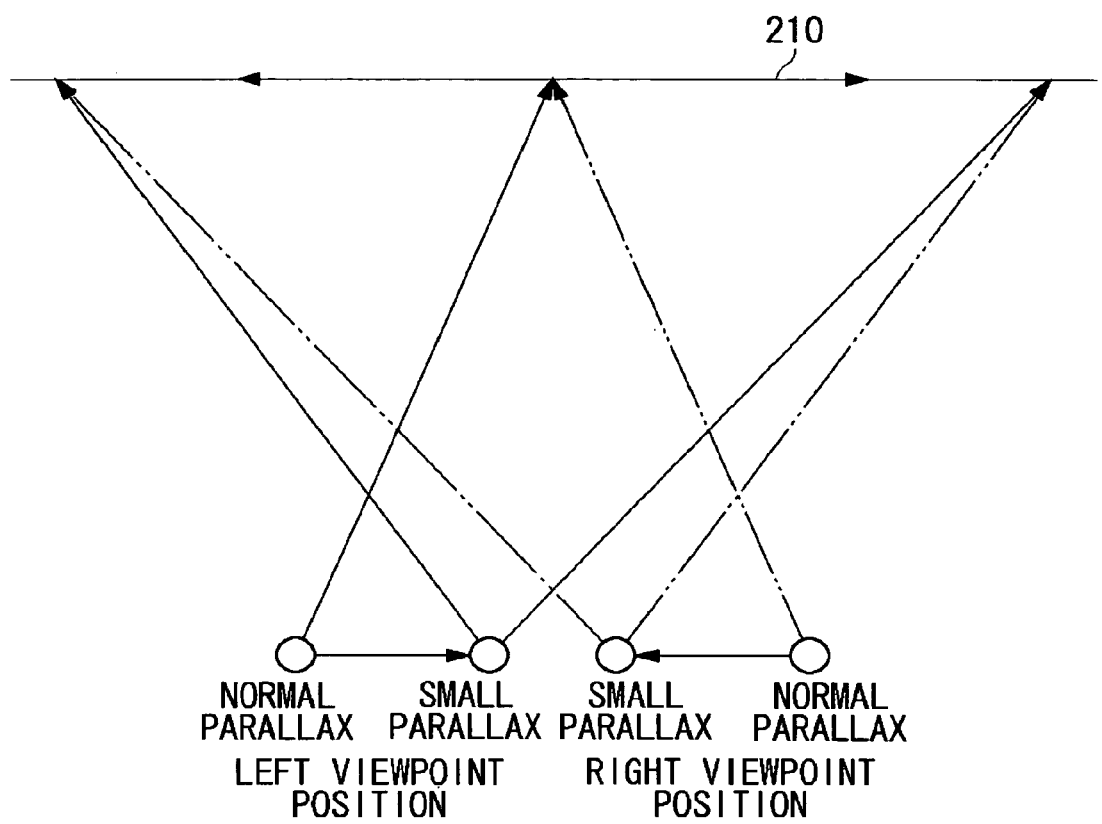
FIG. 22 shows camera's viewpoints when parallax images are generated according to the parallax correction map of FIG. 21.

FIG. 21 shows conceptually an example of a correction map stored in the correction map storage unit 140 of the first three-dimensional image processing apparatus 100. The entirety, as it is, of this map, which serves to correct parallaxes directly, corresponds to a parallax image, and the closer to the periphery, the smaller the parallax is. FIG. 22 shows changes in parallax that results when a distortion processing unit 136 determines camera placement according to the correction map and a camera placement determining unit 132, which has received it, operates camera parameters. "Normal parallax" is given when the viewing is in the front direction from the right and left viewpoint positions of the two cameras, whereas "smaller parallax" is given when the viewing is in the direction deflecting widely from the front. In practice, the camera placement determining unit 132 makes the camera interval smaller for positions closer to the periphery.

Figure 23:
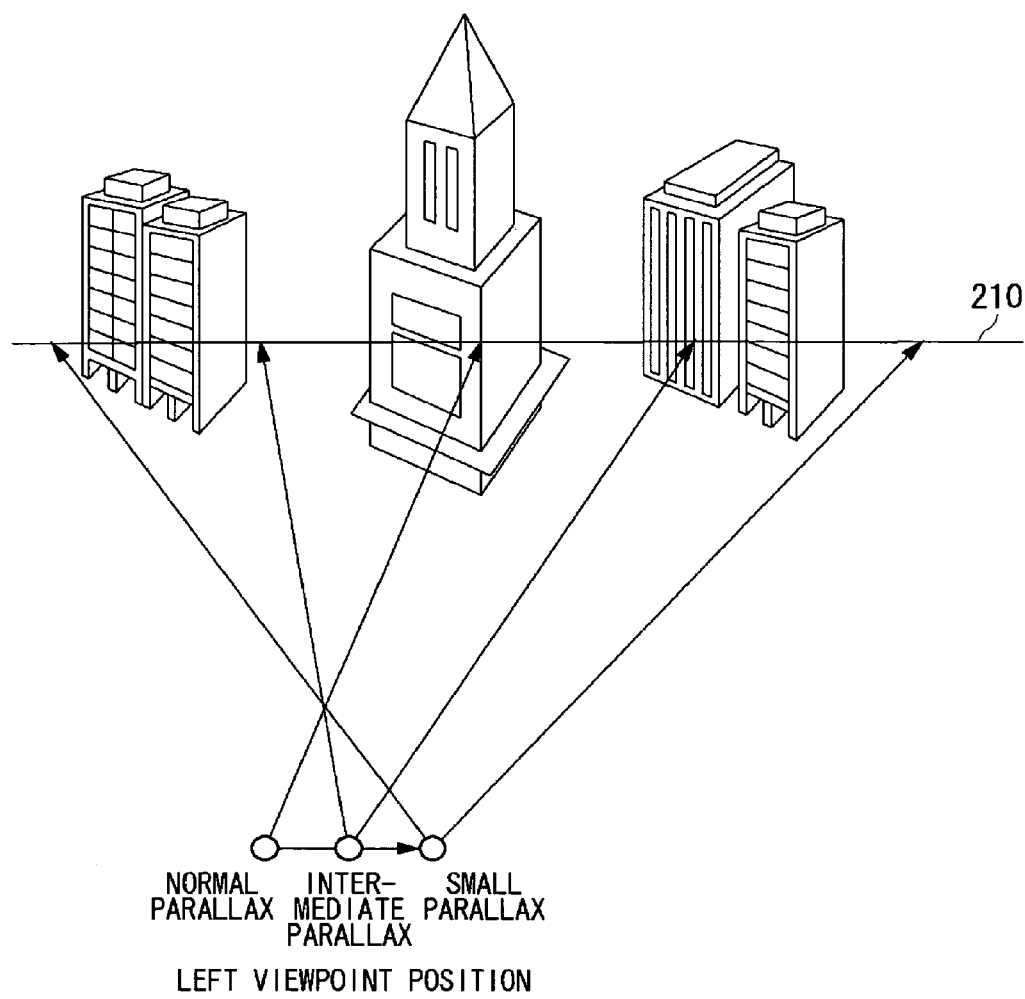
FIG. 23 shows another camera's viewpoints when parallax images are generated according to the parallax correction map of FIG. 21.

FIG. 23 shows another example in which the camera placement determining unit 132 changes parallax by changing the placement of cameras according to the instructions from the distortion processing unit 136. Here, the left-hand camera only of the two cameras is moved, and as it is moved toward the periphery of the image, the parallax changes from "normal parallax" to "intermediate parallax" to "smaller parallax". This method involves lower computation cost than the one in FIG. 22.

Figure 24:
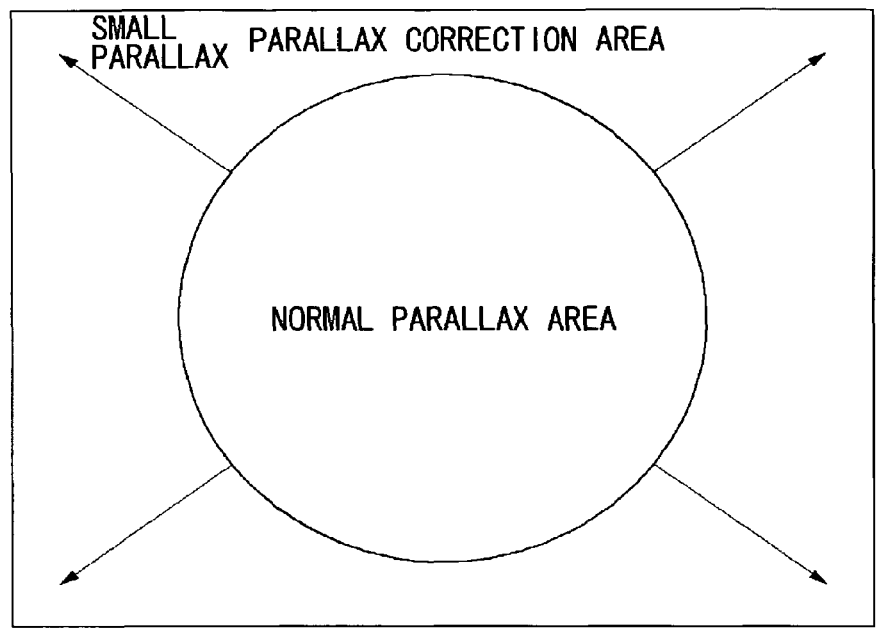
FIG. 24 shows a correction map used by a distortion processing unit of a first three-dimensional image processing apparatus.
Figure 25:
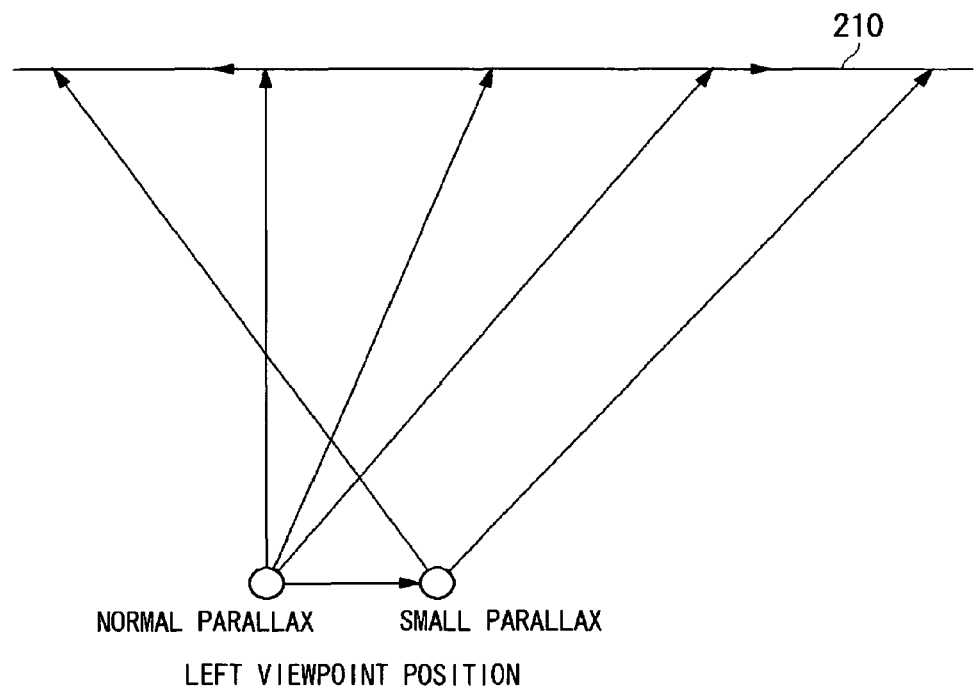
FIG. 25 shows camera's viewpoints when parallax images are generated according to the parallax correction map of FIG. 24.

FIG. 24 shows another example of a correction map. This map also changes the parallaxes; the normal parallax is left untouched near the center of the image and the parallax in other parallax correction areas is made smaller gradually. FIG. 25 shows camera placement which the camera placement determining unit 132 changes according to the map. Only when the camera direction has deflected widely from the front, "small parallax" is given with the position of the left camera moving closer to the right camera.

Figure 26:
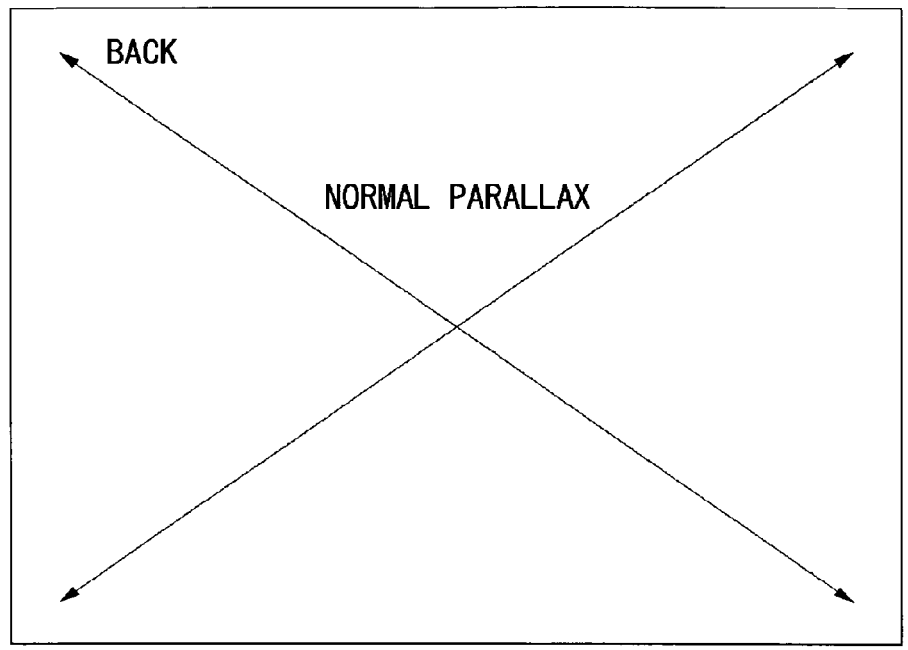
FIG. 26 shows a distance-sense correction map used by a distortion processing unit of a first three-dimensional image processing apparatus.
Figure 27:
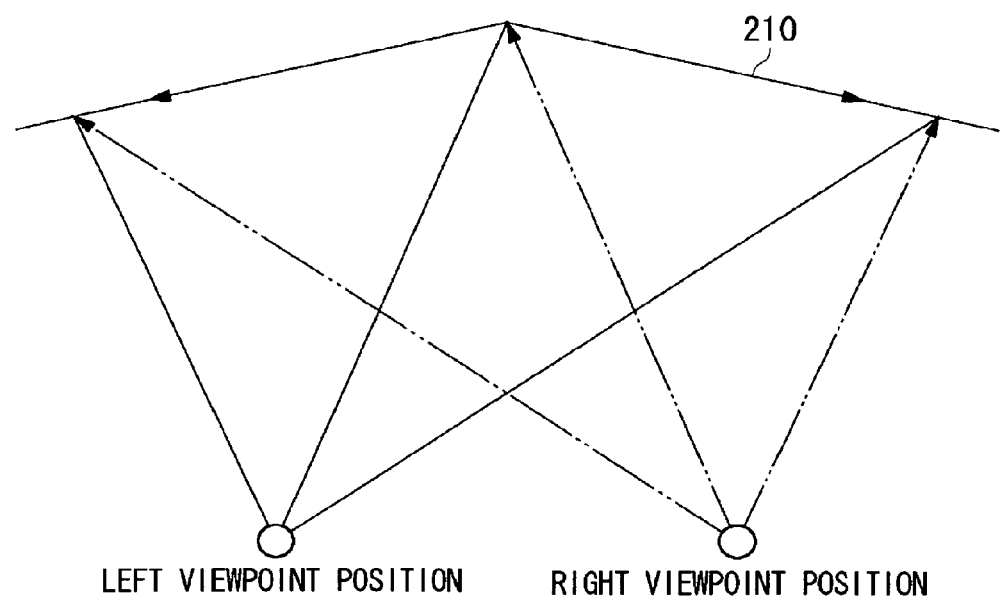
FIG. 27 shows camera's viewpoints when parallax images are generated according to the distance-sense correction map of FIG. 26.

FIG. 26 shows conceptually another example of a correction map. This map is designed to correct the sense of distance from the viewpoint to the object, and to realize it, the camera placement determining unit 132 adjusts the optical axis intersection distance of two cameras. If the optical axis intersection distance is made smaller for positions closer to the periphery of an image, then the objects will look relatively set back in the farther-position direction, so that the purpose can be achieved particularly in the sense that the nearer-positioned parallax is to be made smaller. To make the optical axis intersection distance smaller, the camera placement determining unit 132 may change the direction of the optical axes of the cameras, or, in other words, change the orientation of either one of the cameras. FIG. 27 shows the change in the positions of optical axis intersection or in the optical axis intersection plane 210 when two-dimensional images are generated by the map of FIG. 26. The closer to the periphery of an image, the nearer the optical axis intersection plane 210 will be to the camera.

Figure 28:
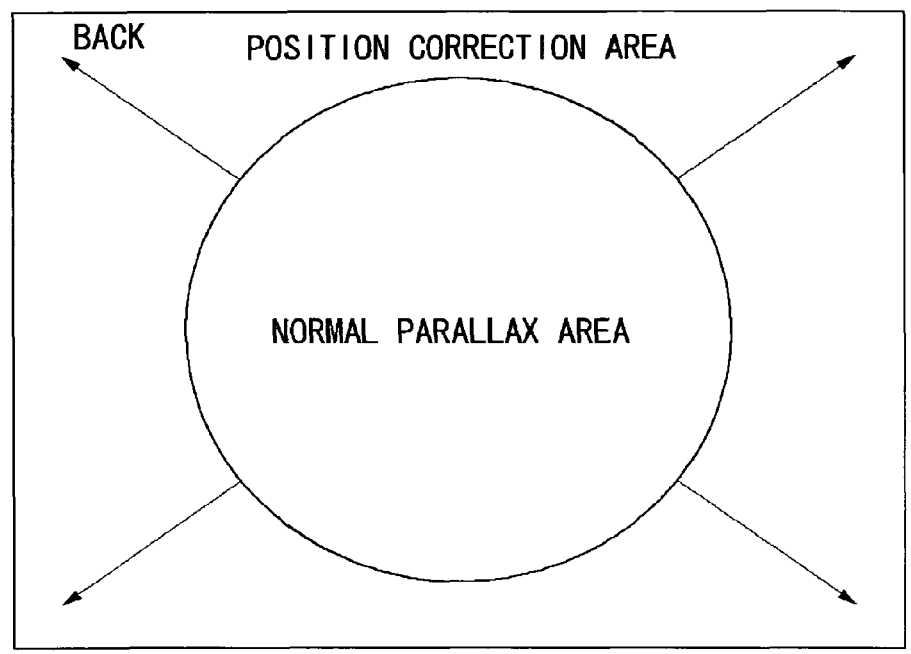
FIG. 28 shows another distance-sense correction map used by a distortion processing unit of a first three-dimensional image processing apparatus.
Figure 29:
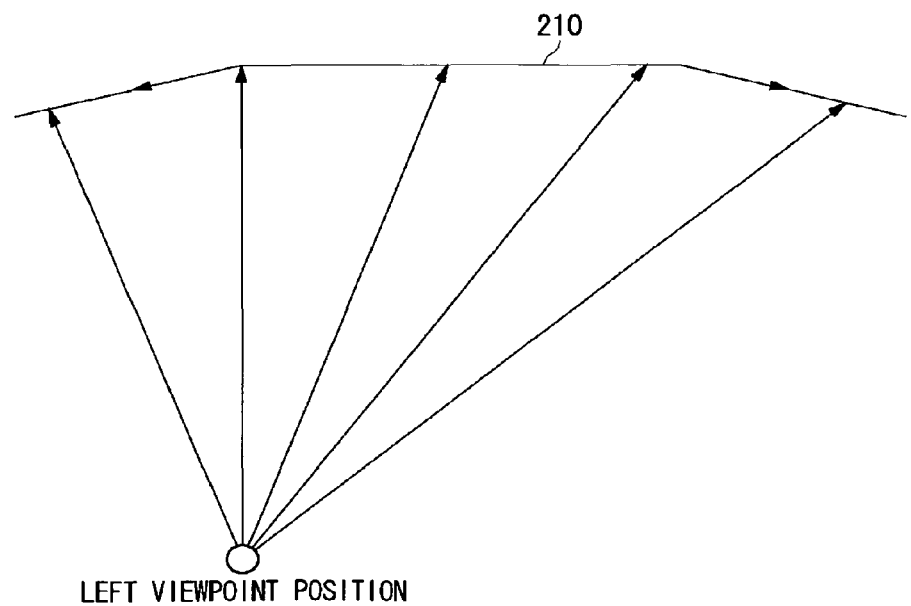
FIG. 29 shows camera's viewpoints when parallax images are generated according to the distance-sense correction map of FIG. 28.

FIG. 28 shows another correction map concerning the sense of distance, and FIG. 29 shows how a camera placement determining unit 132, according to the map of FIG. 28, changes the optical axis intersection plane 210, following the instructions from the distortion processing unit 136. In this example, objects are positioned in normal positions without correction in the central area of the image, whereas the position of objects is corrected in the peripheral area of the image. For that purpose, in FIG. 29, the optical axis intersection plane 210 remains unchanged near the center of the image, and beyond a certain point, the optical axis intersection plane 210 gets nearer to the cameras. In FIG. 29, the operation is done by changing the orientation of the left camera only.

Figure 30A:
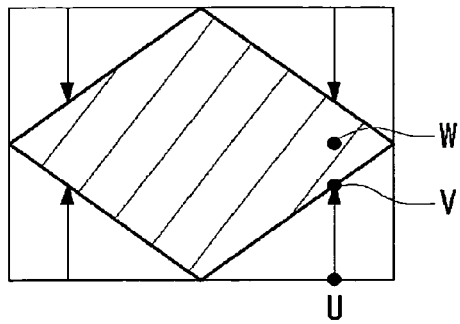
FIG. 30(a), FIG. 30(b), FIG. 30(c), FIG. 30(d), FIG. 30(e) and FIG. 30(f) are each a top view of parallax distribution obtained with a result that a distortion processing unit of a first three-dimensional image processing apparatus has performed a processing to a three-dimensional space.
Figure 30B:
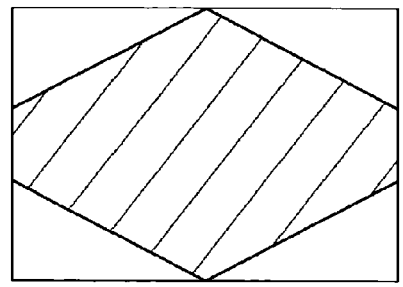
Figure 30C:
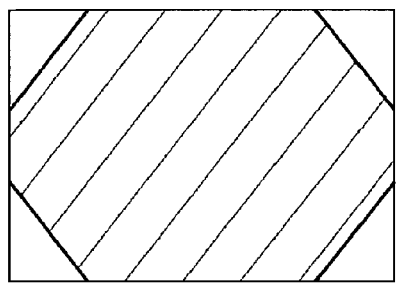
Figure 30D:
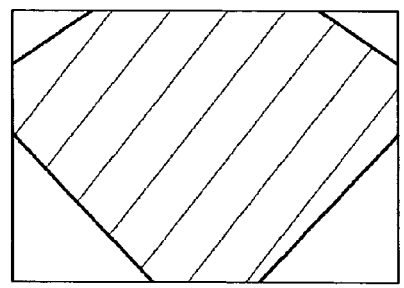
Figure 30E:
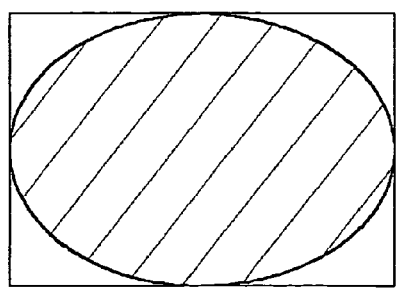

FIGS. 30(a) through 30(f) show another distortion conversion by a distortion processing unit 136. Different from the preceding examples, the camera placement is not changed, but the three-dimensional space itself is directly distorted by the camera coordinate system. In FIGS. 30(a) through 30(f), the rectangular region represents a top view of the original space, and the oblique-lined region a top view of the space after conversion. For example, point U in the original space in FIG. 30(a) is shifted to point V after conversion. This means that this point has been shifted in the farther-position direction. In FIG. 30(a), the space is squeezed more in the depth direction as indicated by the arrows, in positions closer to the periphery, and a sense of distance not too different from a constant sense of distance as indicated by point W in the same Figure is given whether in a nearer position or a farther position. As a result thereof, there is a uniform sense of distance at the periphery of the image without any object particularly nearer-positioned, which not only solves the problem of double images but also presents an expression better suited for the physiology of the user.

Figure 30F:
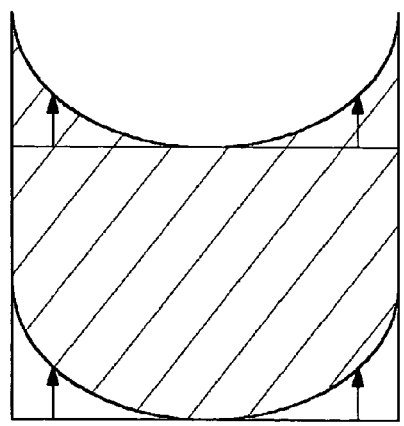

FIGS. 30(b), 30(c), 30(d) and 30(e) all show the variations of conversion wherein the sense of distance at the periphery of an image is brought closer to a constant value. FIG. 30(f) shows an example in which all the points are converted in the farther-position direction.

Figure 31:
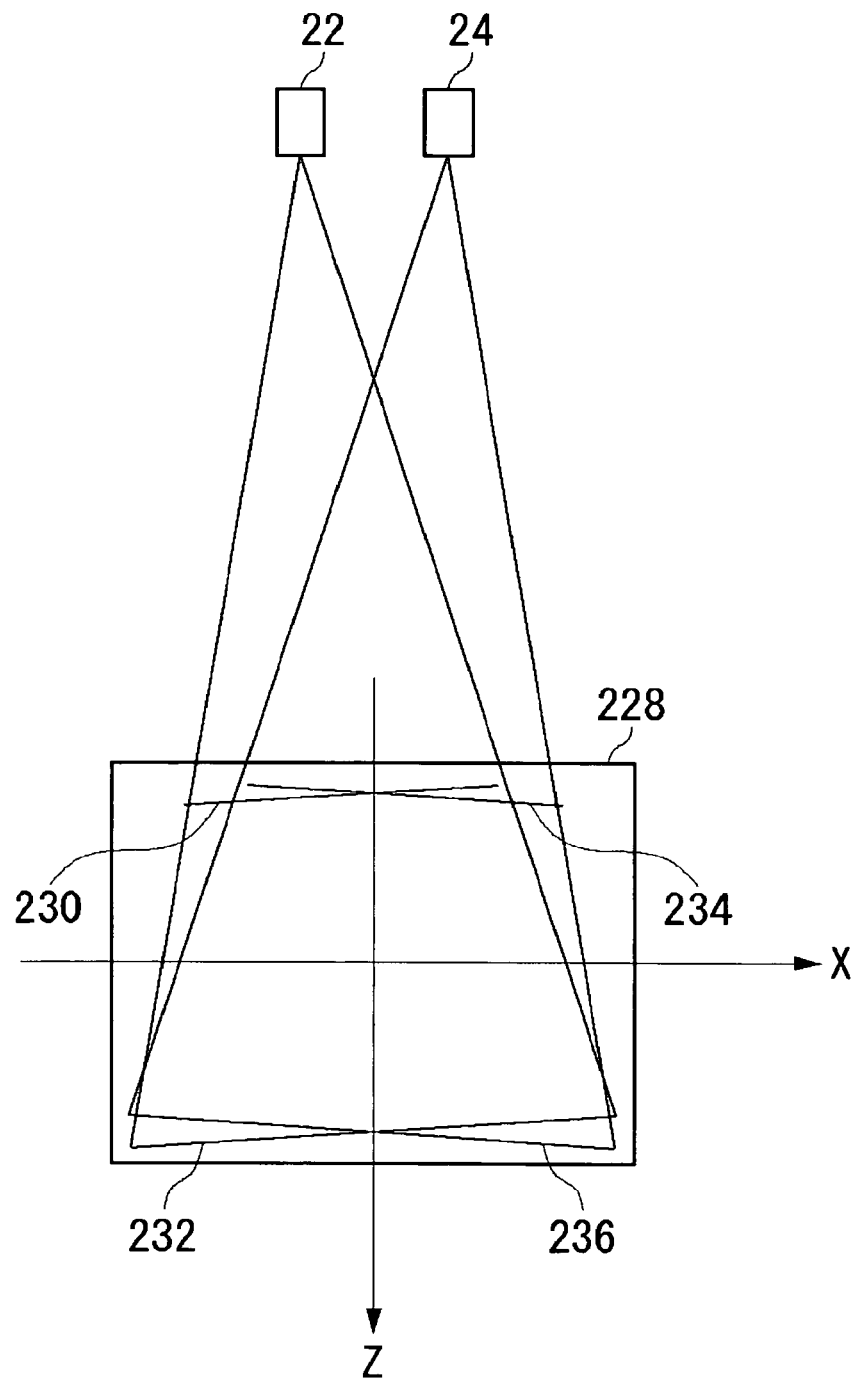
FIG. 31 shows a principle of a processing by a distortion processing unit of a first three-dimensional image processing apparatus.

FIG. 31 shows the principle for realizing the conversion of FIG. 30(a). A cuboid space 228 includes space in which projection processings of a first camera 22 and a second camera 24 are performed. The view volume of the first camera 22 is determined by an angle of view, a front projection plane 230 and a back projection plane 232 of the camera, and that of the second camera 24 is determined by an angle of view, a front projection plane 234 and a back projection plane 236 of the camera. A distortion processing unit 136 carries out distortion conversion on this cuboid space 228. The origin is the center of the cuboid space 228. For a multiple-eye type, the number of cameras only increases, and the same principle of conversion applies.

Figure 32:
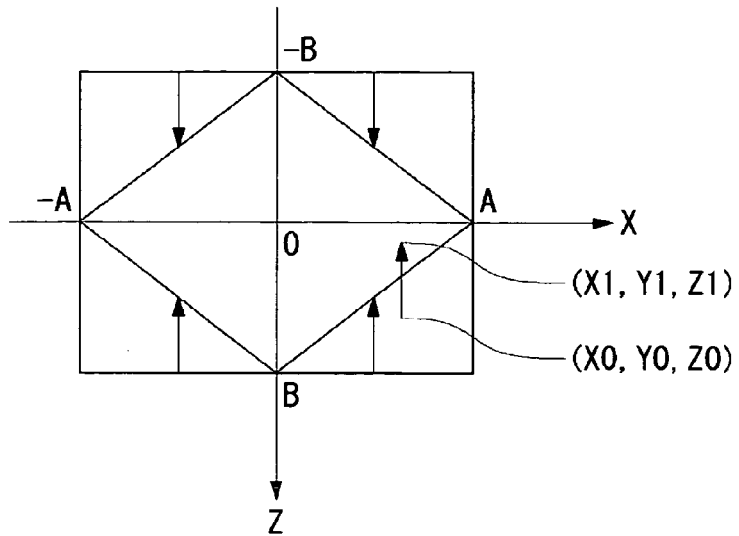
FIG. 32 shows a processing of FIG. 31 in a concrete manner.
Figure 33:
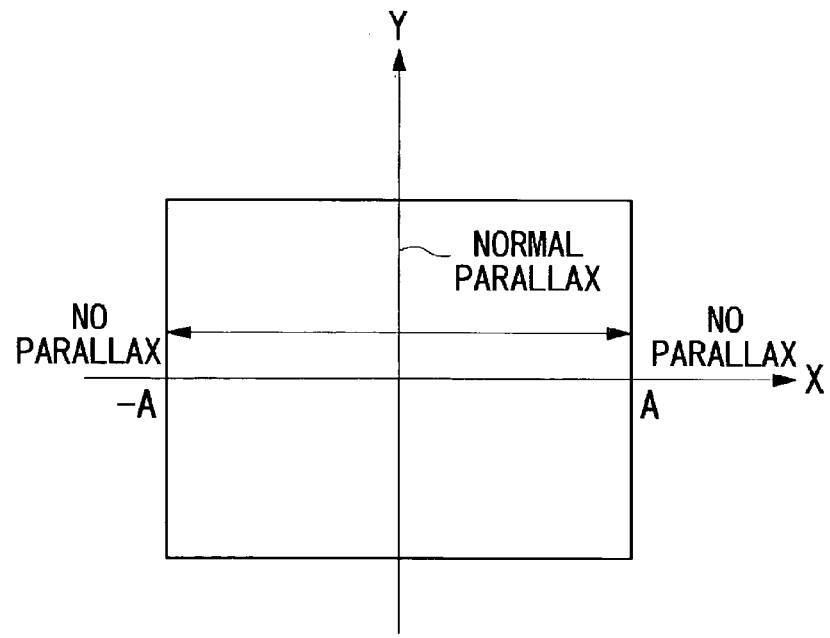
FIG. 33 shows a processing of FIG. 31 in a concrete manner.

FIG. 32 is an example of distortion conversion, which employs reduction conversion in the Z direction. Actually, processing is done for individual objects in the space. FIG. 33 is a representation likening this conversion to a parallax correction map, where the normal parallax is associated to the Y axis and the larger the absolute value of X, the smaller the parallax will be. When X=±A, there is no parallax. Since the reduction conversion here is in the Z direction only, the transform matrix is as follows:

$$(X1, Y1, Z1, 1) = (X0, Y0, Z0, 1)\begin{bmatrix} 1 & 0 & 0 & 0 \\ 0 & 1 & 0 & 0 \\ 0 & 0 & Sz & 0 \\ 0 & 0 & 0 & 1 \end{bmatrix}$$ [Equation 1]

Figure 34:
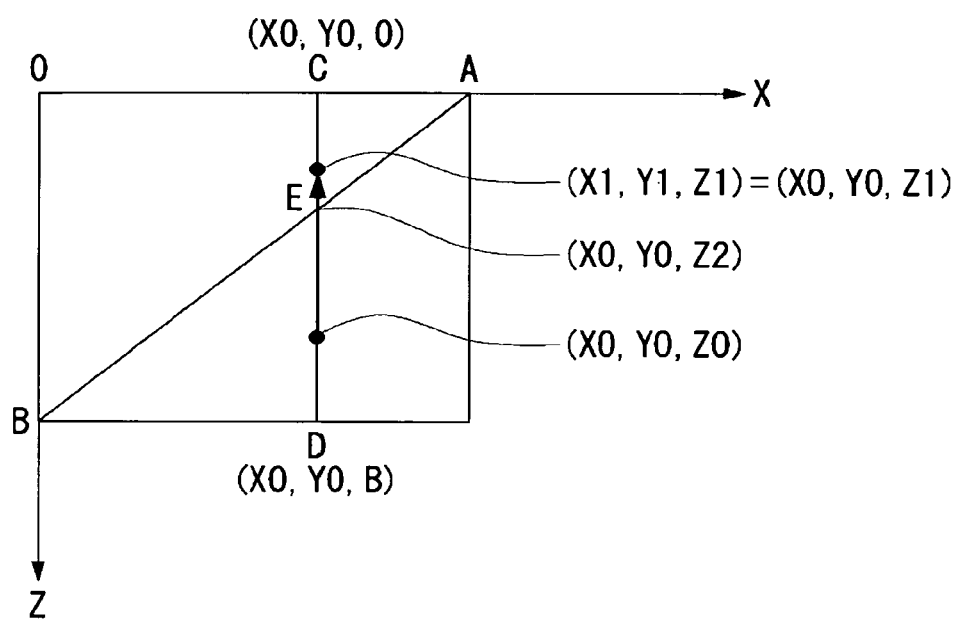
FIG. 34 shows a processing of FIG. 31 in a concrete manner.

The conversion will be explained using FIG. 34. First consider the region where $X \geq 0$ and $Z \geq 0$. When point $(X0, Y0, Z0)$ moves to point $(X0, Y0, Z1)$ as a result of reduction processing, the reduction rate $Sz$ is $$Sz = Z1/Z0$$
$$= CE/CD.$$

The coordinates of C are (X0, Y0, 0) and those of D are (X0, Y0, B).

E is the point of intersection of a straight line and a plane, and if its coordinates are (X0, Y0, Z2), then Z2 can be obtained as follows:

$$Z = B - X \times B/A \text{(Plane)}$$

$$X = X0, Y = Y0 \text{(Straight lines)}$$

$$Z2 = B - X0 \times B/A$$

Hence, $$Sz = CE/CD$$
$$= (B - X0 \times B/A)/B$$
$$= 1 - X0/A$$

Generally, in relation to X, $$Sz = 1 - X/A$$

Similar calculation for the other regions of X and Z will produce the following results, and the conversion can be verified:

$$Sz = 1 - X/A, \text{ for } X \geq 0$$

$$Sz = 1 + X/A, \text{ for } X < 0$$

Figure 35:
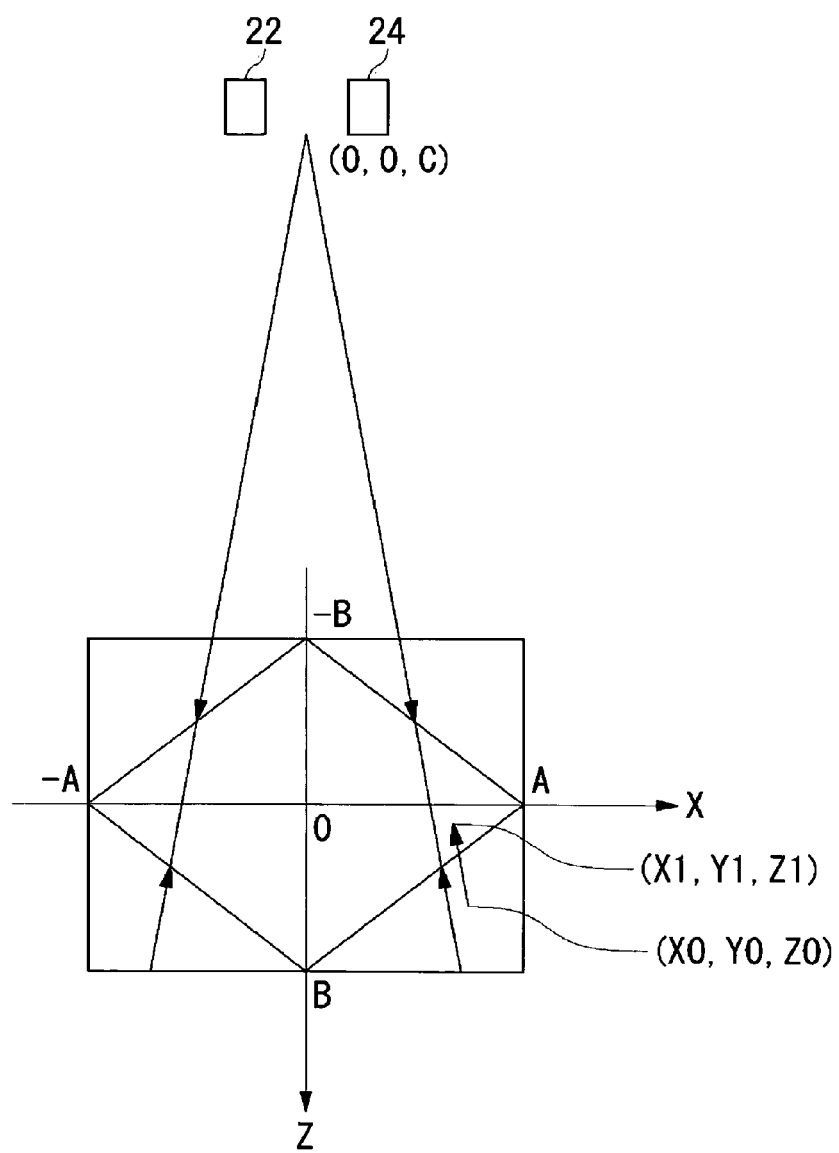
FIG. 35 shows another example of a processing by a distortion processing unit of a first three-dimensional image processing apparatus.

FIG. 35 shows another example of distortion conversion. More strictly speaking, in consideration of the radial shooting from the cameras, reduction processings in the X-axis and Y-axis directions are also combined. Here, conversion is performed using the middle point between the two cameras as representative of the camera position. The transform matrix is as follows:

$$(X1, Y1, Z1, 1) = (X0, Y0, Z0, 1)\begin{bmatrix} Sz & 0 & 0 & 0 \\ 0 & Sy & 0 & 0 \\ 0 & 0 & Sz & 0 \\ 0 & 0 & 0 & 1 \end{bmatrix}$$ [Equation 2]

Figure 36:
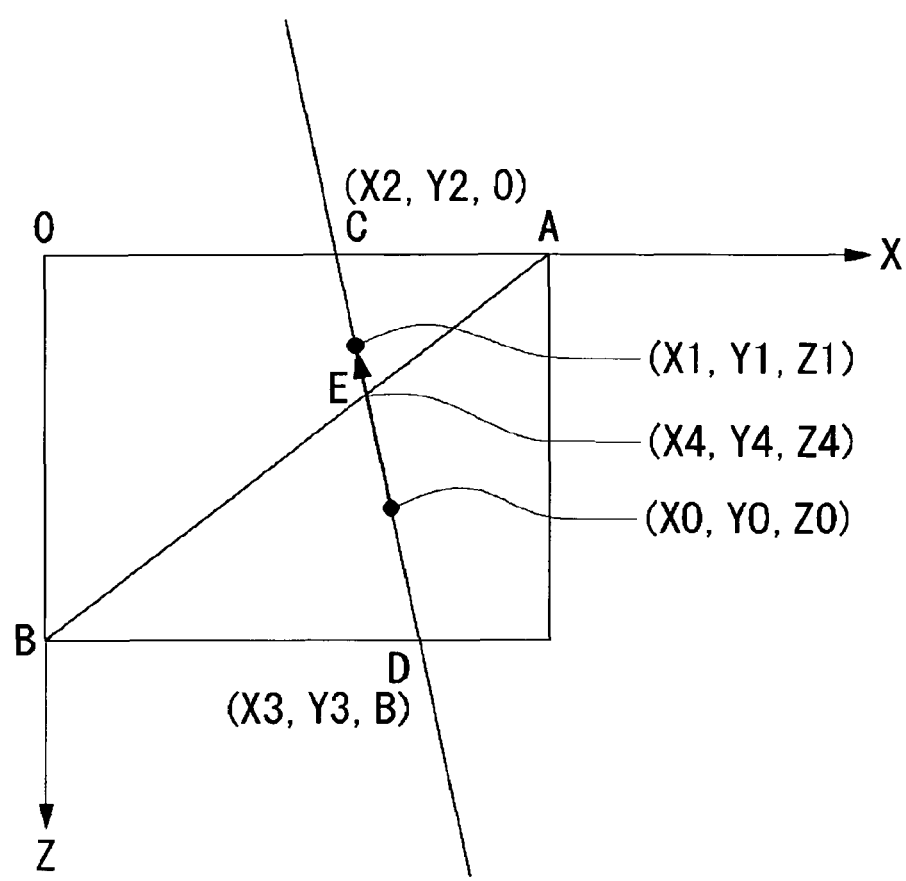
FIG. 36 shows a processing of FIG. 35 in a concrete manner.

FIG. 36 is for a verification of this conversion. Here, too, considered is the region where $X \leq 0$ and $Z \leq 0$. When point $(X0, Y0, Z0)$ moves to point $(X1, Y1, Z1)$ as a result of reduction processing, the reduction rates Sx, Sy and Sz are:

$$Sx = (X1 - X2)/(X0 - X2)$$
$$= (X4 - X2)/(X3 - X2)$$
$$Sy = (Y1 - Y2)/(Y0 - Y2)$$
$$= (Y4 - Y2)/(Y3 - Y2)$$
$$Sz = (Z1 - Z2)/(Z0 - Z2)$$
$$= (Z4 - Z2)/(Z3 - Z2).$$

Since E is the point of intersection of the plane and the straight line, Sx, Sy and Sz can be found the same way as described above.

It is to be noted that when a space after conversion is represented by a set of planes as above, the processing changes at the tangential line to the planes themselves, which may sometimes cause a sense of discomfort. In that case, the connection may be made with curved surfaces, or the space may be constituted by curved surfaces only. The calculation changes simply to one of obtaining the intersection point E of the curved surface and the straight line.

In the above example, the reduction rate, which is the same on the same straight line CD, may be weighted. For example, Sx, Sy and Sz may be multiplied by a weighting function G(L) for the distance L from the camera.

FIGS. 37 through 40 show the processings, and their principles, by a distortion processing unit 174 of a third three-dimensional image processing apparatus 100.

Figure 37:
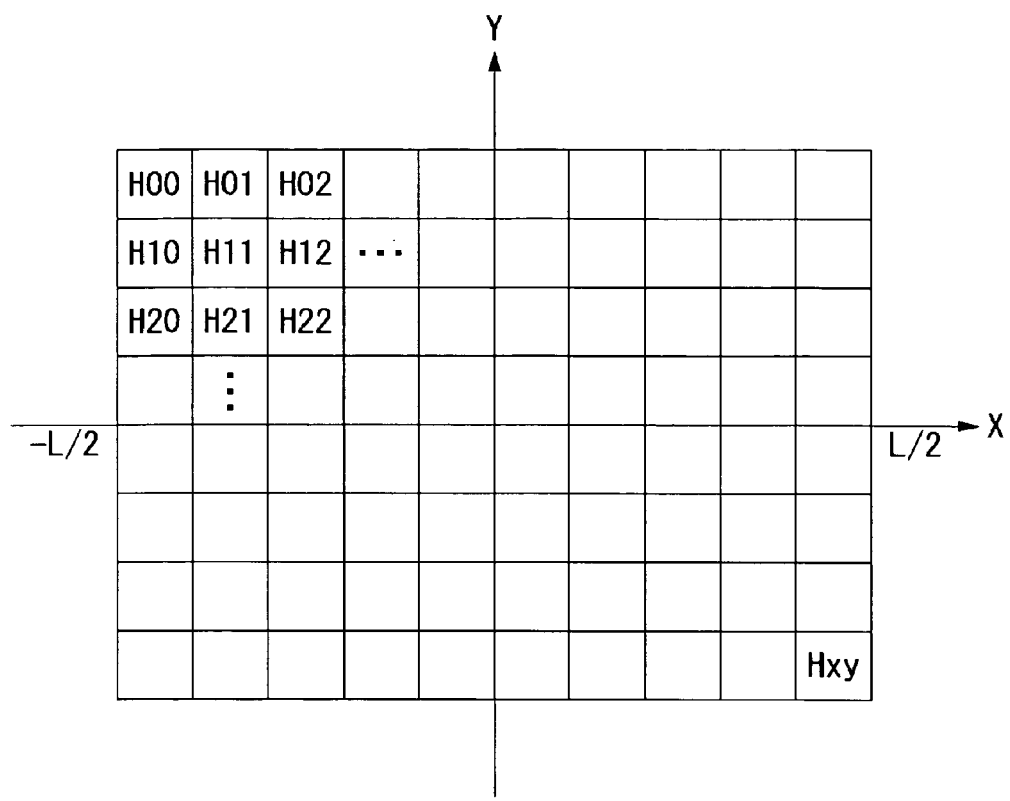
FIG. 37 shows a depth map.

FIG. 37 shows a depth map of an image with depth information inputted to the third three-dimensional image processing apparatus 100, and here the depths come in a range of K1 to K2 in value. Here, the nearer-positioned depths are denoted by "positive" values, and the farther-positioned depths by "negative" values.

Figures 38, 39:
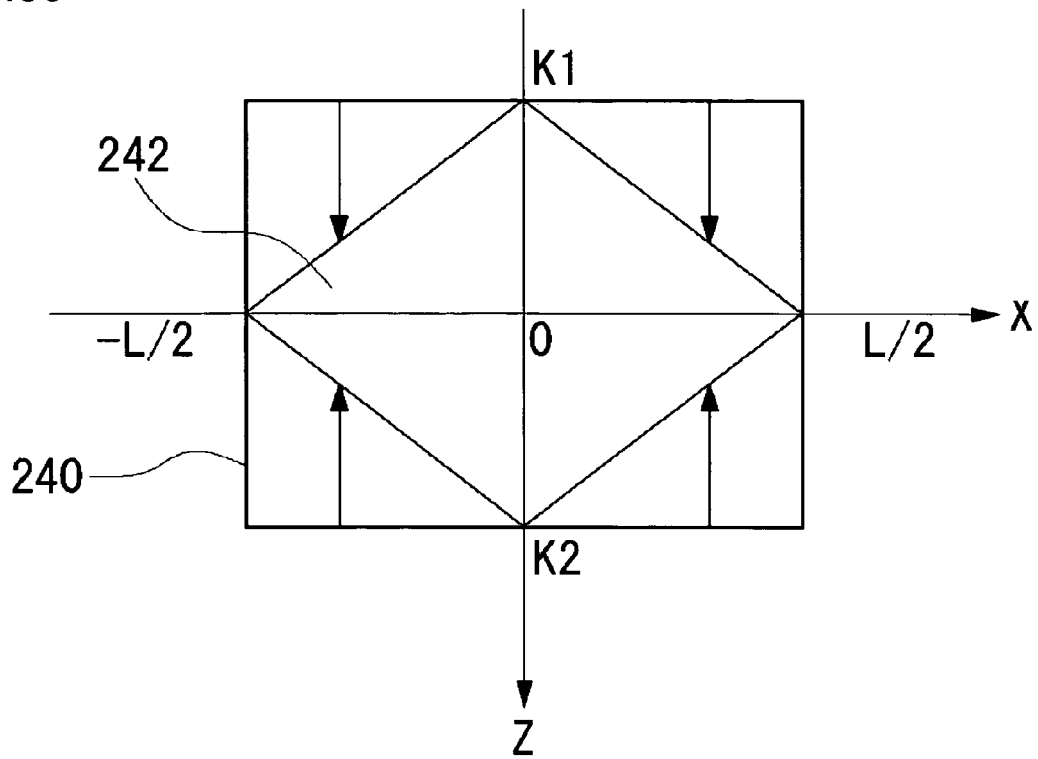
FIG. 38 shows an example of a processing by a distortion processing unit of a third three-dimensional image processing apparatus.
FIG. 39 shows a depth map generated by a processing by a distortion processing unit of a third three-dimensional image processing apparatus.

FIG. 38 shows a relationship between an original range of depth 240 and a post-conversion range of depth 242. The depth approaches a constant value as the position nears the periphery of the image. The distortion processing unit 174 converts the depth map in such a manner as to follow this correction. The same applies to the case where parallax is given in the vertical direction. This conversion, which is the reduction in the Z direction only, can also be expressed by the following equation:

$$(X0, Y0, Gxy, 1) = (X, Y, Hxy, 1) \begin{bmatrix} 1 & 0 & 0 & 0 \\ 0 & 1 & 0 & 0 \\ 0 & 0 & Sz & 0 \\ 0 & 0 & 0 & 1 \end{bmatrix}$$ [Equation 3]

And Sz, which is divided into cases by the value of X, is:

$Sz=1-2X/L$, for $X \geqq 0$ $Sz=1+2X/L$, for $X<0$

Through the above conversion, a new depth map having a new factor shown in FIG. 39 will be generated.

Figure 40:
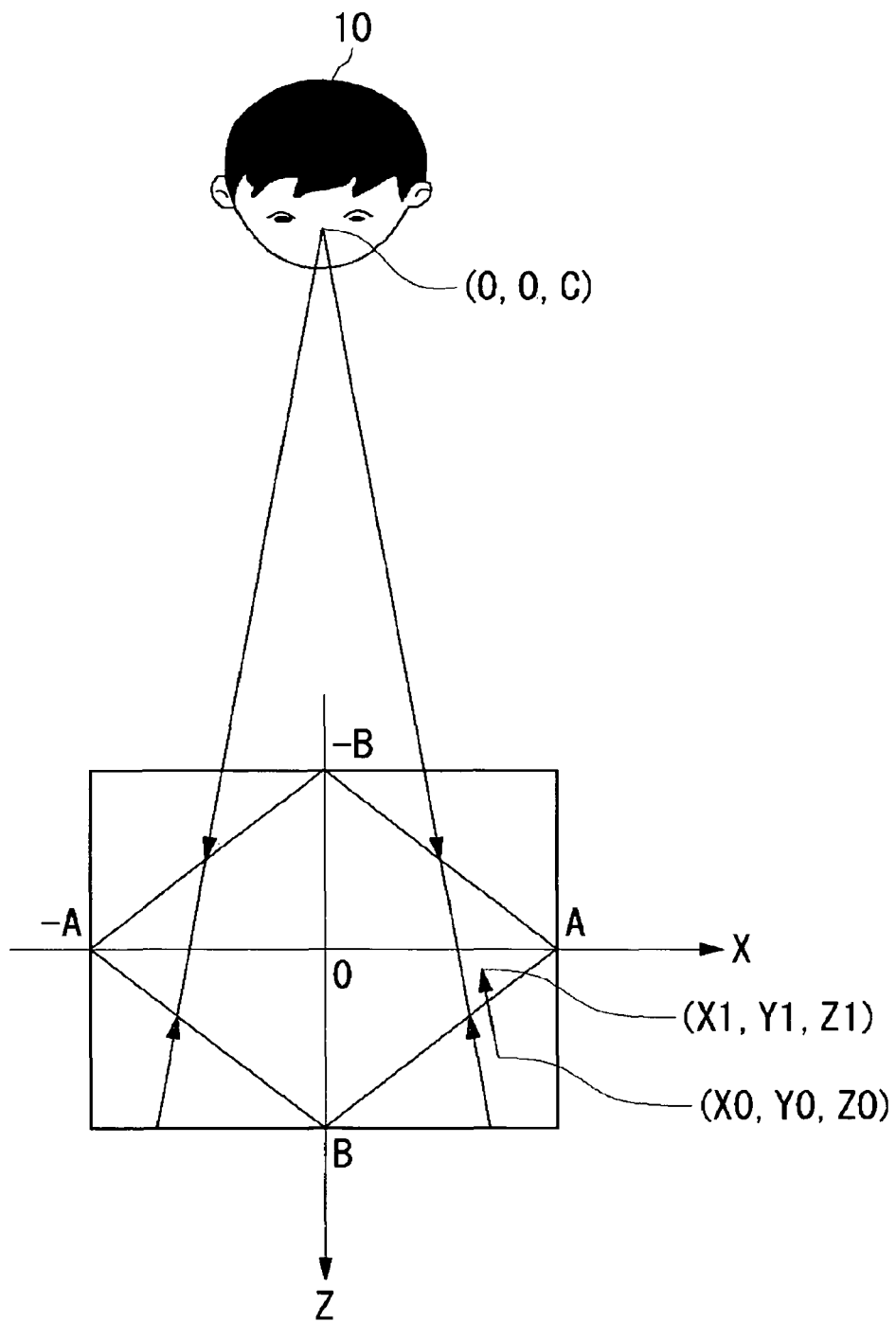
FIG. 40 shows another example of a processing by a distortion processing unit of a third three-dimensional image processing apparatus.

FIG. 40 shows a principle of another distortion conversion for a depth map. Since the space, more strictly speaking, is radially observed from the user 10, the reduction processings in the X-axis and Y-axis directions are also combined. Here, the middle point between the eyes is used as the viewing position. The specific processings are done with the same formulas as in FIG. 36. Although the original depth map has Z values only, the X values and Y values are also stored when this calculation is done. The Z values are converted into pixel shift amounts in the X direction or the Y direction, and the X values and the Y values may be stored as offset values in relation to them.

In any case, the depth map converted by the distortion processing unit 174 and the original image are inputted to the two-dimensional image generating unit 178, where a synthesis processing of shifting in the horizontal direction is carried out to produce appropriate parallax. The details will be described later.

FIGS. 41 through 51 show the processings of a position shifting unit 160 of a second three-dimensional image processing apparatus 100 and a two-dimensional image generating unit 178 of a third three-dimensional image processing apparatus 100, which can be grasped as its extension.

Figure 41:
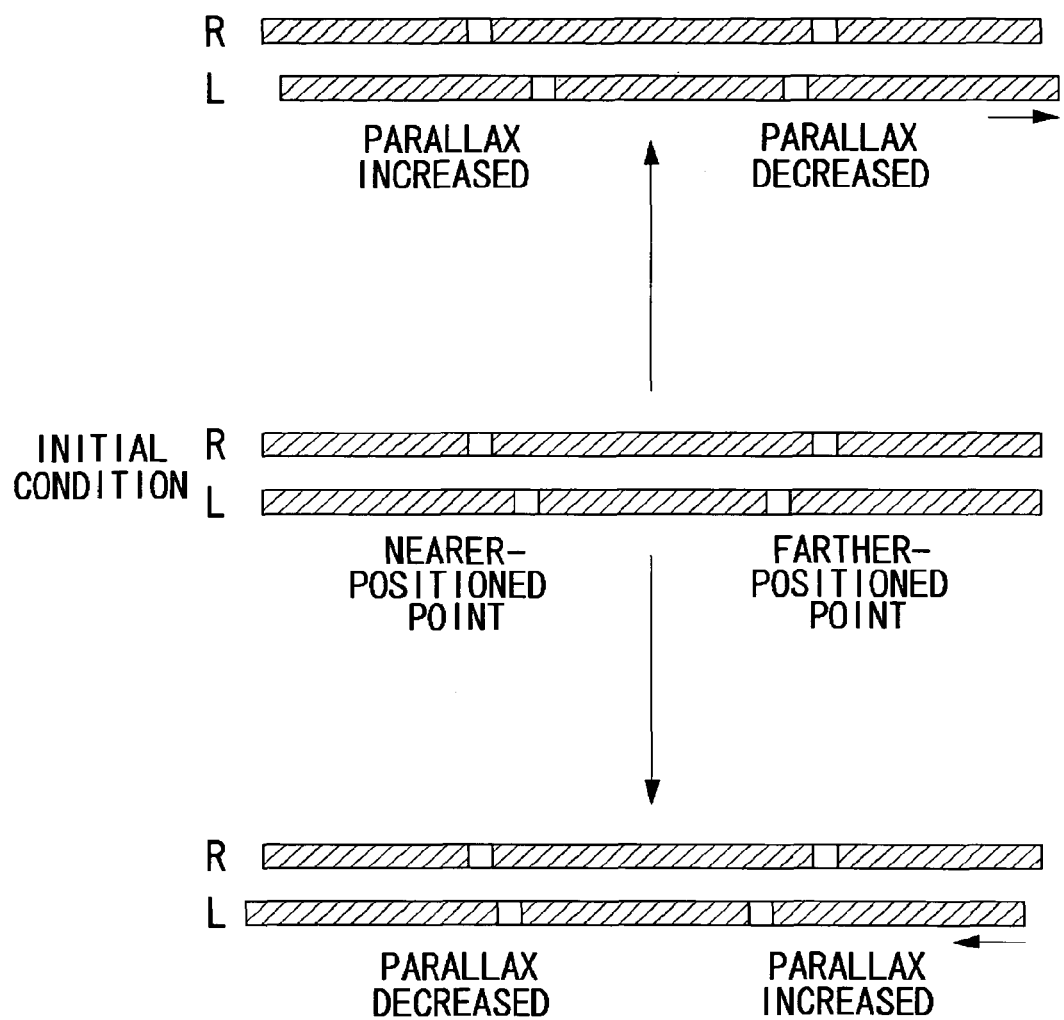
FIG. 41 shows an example of a processing by a two-dimensional image generating unit of a second three-dimensional image processing apparatus.

FIG. 41 shows the principle of shifting the synthesis position of two parallax images by the position shifting unit 160. As shown in the same Figure, the position of a right-eye image R coincides with that of a left-eye image L in the initial condition. However, if the left-eye image L is relatively shifted to the right as shown at the top of the same Figure, then the parallax in nearer positions will increase and the parallax in farther positions will decrease. Conversely, if the left-eye image L is relatively shifted to the left as shown at the bottom of the same Figure, then the parallax in nearer positions will decrease and the parallax in farther positions will increase.

The above is the essence of parallax adjustment by shifting parallax images. The shifting may be done for one of the images or for both of them in mutually opposite directions. Also, from this principle, it is understood that this 3D display system can be applied to all the systems utilizing parallax, whether they are of the type using glasses or not. A similar processing can be applied to multi-viewpoint images or parallaxes in the vertical direction also.

Figure 42:
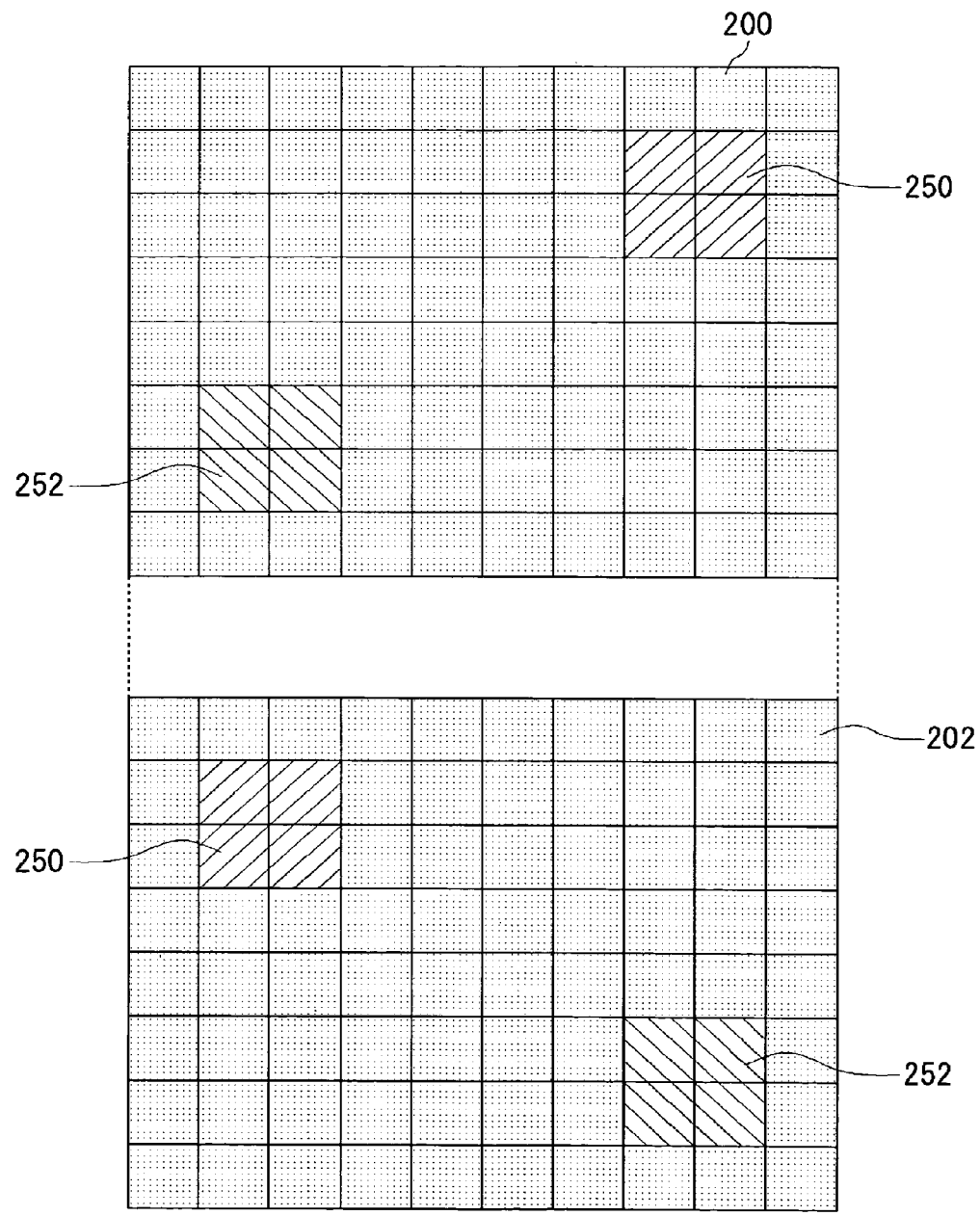
FIG. 42 shows an example of parallax images.

FIG. 42 shows a shift processing at the pixel level. A first quadrilateral 250 and a second quadrilateral 252 are both caught in a left-eye image 200 and a right-eye image 202. The first quadrilateral 250 is given a nearer-positioned parallax, whose parallax amount is expressed by a positive number as "6 pixels". In contrast thereto, the second quadrilateral 252 is given a farther-positioned parallax, whose parallax amount is expressed by a negative number as "−6 pixels". Here, these parallax amounts are denoted by F2 and F1, respectively.

Figure 43:
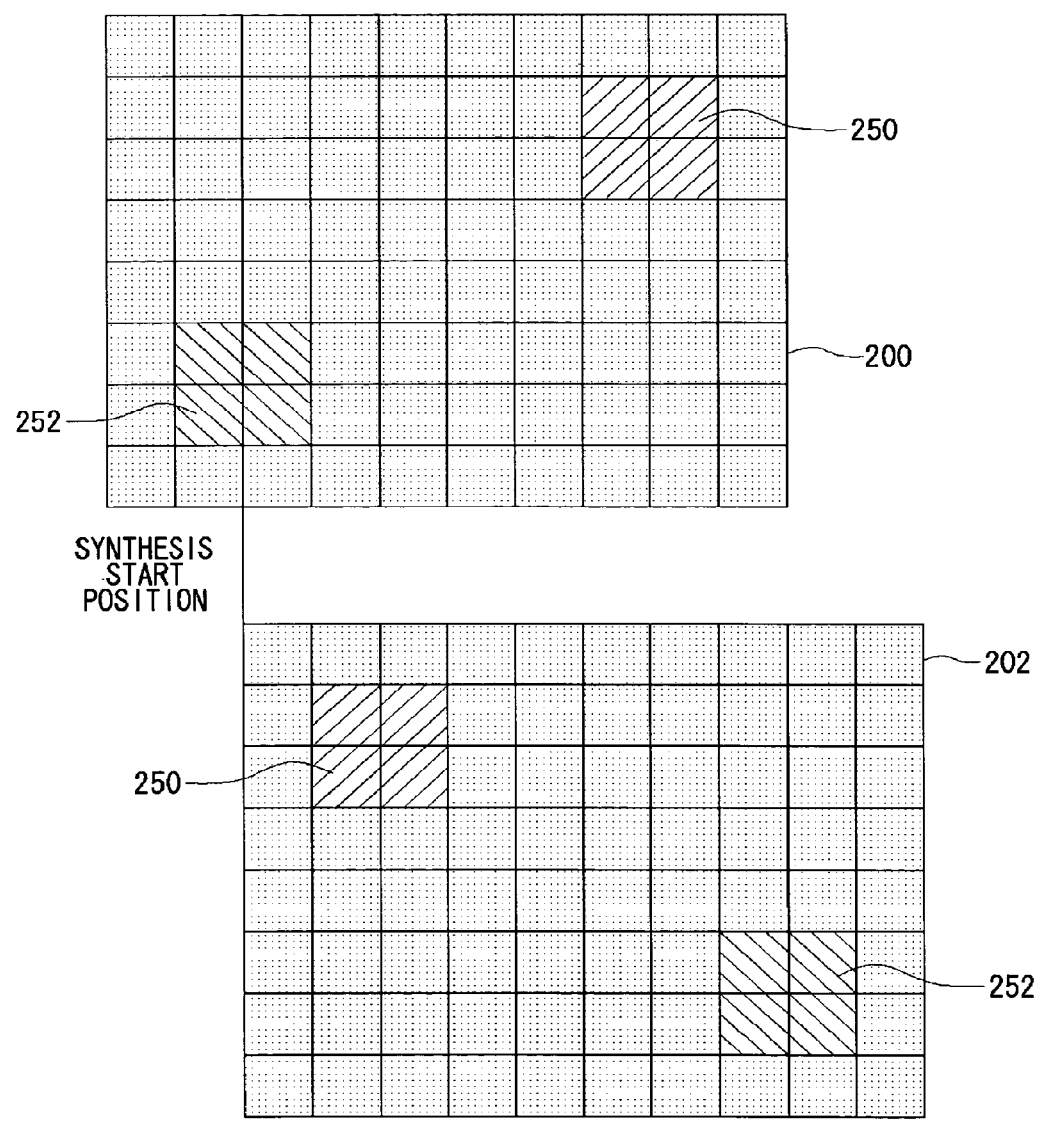
FIG. 43 shows a parallax image where a synthesis position is shifted by a two-dimensional image generating unit of a second three-dimensional image processing apparatus.

On the other hand, suppose that the appropriate parallax of the user's display apparatus is found to be J1 to J2. The position shifting unit 160 performs a pixel shift of (J2−F2) for both the synthesis start positions of the two images. FIG. 43 shows the state after the end of the shifting. Now, if F1=−6, F2=6, and J1=−5, J2=4, then the synthesis start positions are both shifted by −2 pixels, namely, in the entirely farther-position direction. The final parallax amounts, as shown in FIG. 43, are such that E1=−8 and E2=4, so that they are within the limit parallax at least with regard to the nearer-position direction. It is generally believed that double images in the nearer-position direction cause a stronger sense of discomfort than those in the farther-position direction and objects of shooting are often shot in nearer positions, and therefore it is basically desirable that the parallax in the nearer positions lie within the limit. Examples of processing are described below.

1. When a nearer-position point is outside the limit parallax and a farther-position point is within the limit parallax, the nearer-position point is shifted to the limit parallax point. However, the processing is stopped when the parallax of the farther-position point reaches the distance between the eyes.
2. When a nearer-position point is outside the limit parallax and a farther-position point is outside the limit parallax, the nearer-position point is shifted to the limit parallax point. However, the processing is stopped when the parallax of the farther-position point reaches the distance between the eyes.
3. Processing is not done when both the nearer-position point and farther-position point are within the limit parallaxes.
4. When a nearer-position point is within the limit parallax and a farther-position point is outside the limit parallax, the farther-position point is shifted to the limit parallax point. However, the processing is stopped when the nearer-position point reaches the limit parallax point during the processing.

Figure 44:
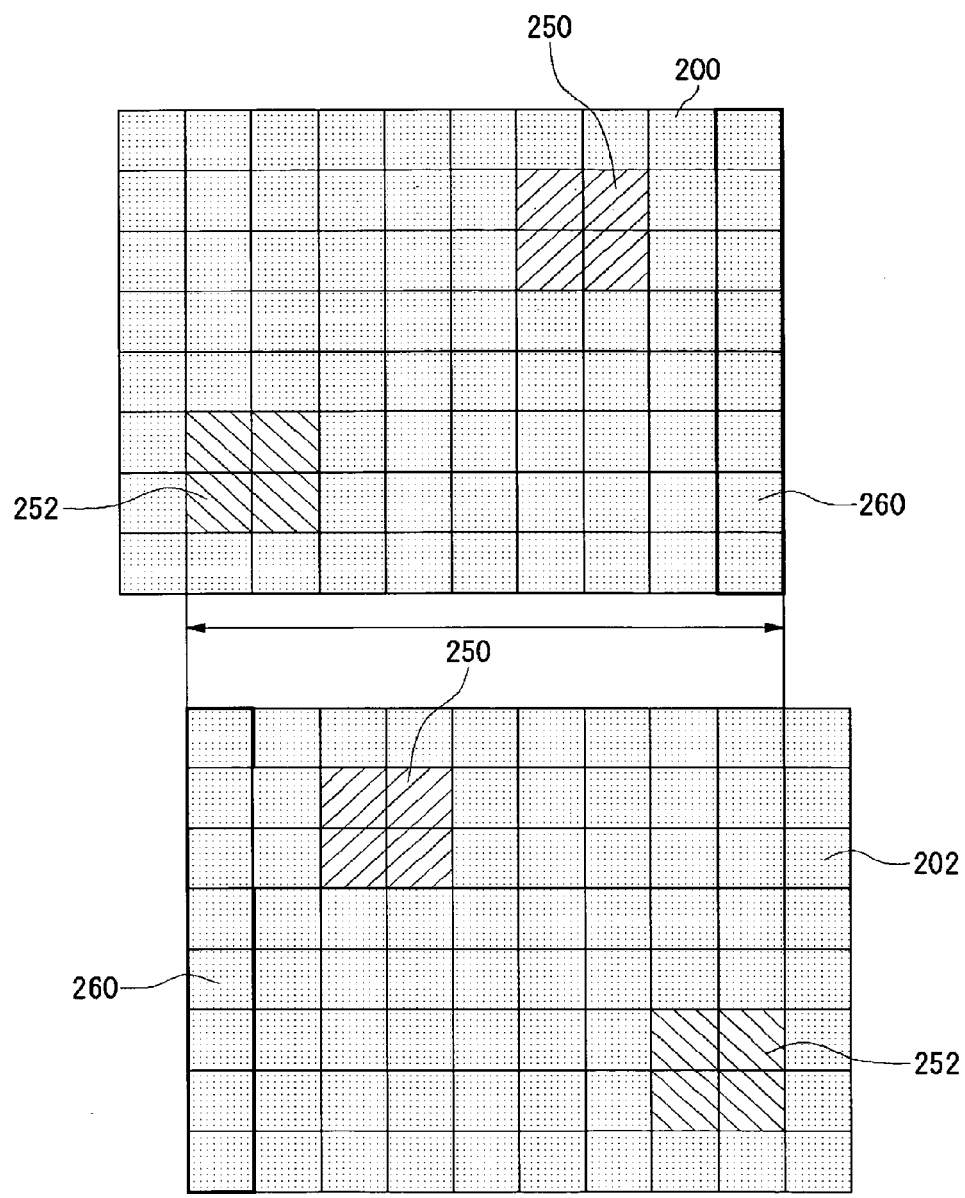
FIG. 44 shows a processing by an image edge adjusting unit of a second three-dimensional image processing apparatus.

FIG. 44 shows the loss of image edges due to the shifting of synthesis positions. Here, the shift amount of a left-eye image 200 and a right-eye image 202 is one pixel, so that there occurs a lost part 260 of 1-pixel width in each of the right-hand edge of the left-eye image 200 and the left-hand edge of the right-eye image 202. At this time, the image edge adjusting unit 168 compensates the horizontal number of pixels by duplicating the pixel sequence at the image edges as shown in FIG. 44.

As a method other than this, the lost part 260 may be indicated by a specific color, such as black or white, or may be non-display. Furthermore, a cutting or adding processing may be performed to restore the size of an initial image. Moreover, it may be so arranged that the size of an initial image is made larger than the actual display size in advance so as to prevent the lost part 260 from affecting the display.

Figure 45:
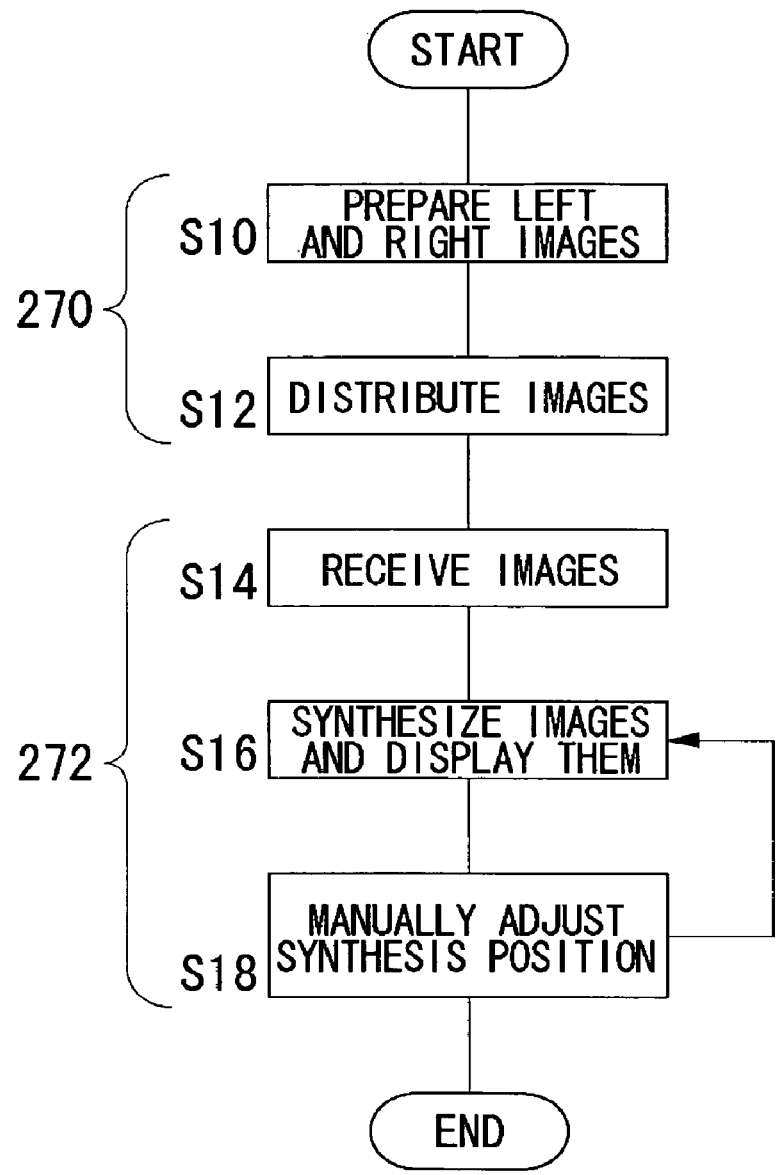
FIG. 45 is a flowchart showing a processing by a second three-dimensional image processing apparatus.

FIG. 45 is a flowchart showing the manual adjustment of parallax by a second three-dimensional image processing apparatus 100. As shown in the same Figure, right and left images are first prepared manually as parallax images (S10), and they are distributed via a network or other routes (S12). They are received by a second three-dimensional image processing apparatus 100 (S14), and, in the case of this Figure, the images are first synthesized and displayed just as they are without shifting (S16). In other words, assumed here is the case where an appropriate parallax has not yet been acquired or the case where a position shifting unit 160 is not yet operated. Following this, the user instructs a parallax adjustment to the three-dimensionally displayed parallax image via a three-dimensional sense adjusting unit 112, and the position shifting unit 160 receives the instruction in a "manual adjust mode" and adjusts the image synthesis position and displays it (S18). Note that S10 and S12 are the procedure 270 of an image creator and the steps of S14 and thereafter are the procedure 272 of a second three-dimensional image processing apparatus 100. Also, although it is not shown, the shift amount may be recorded in the header and reference thereto may be made from the next time on for synthesis, which may save the trouble of readjustment.

Figure 46:
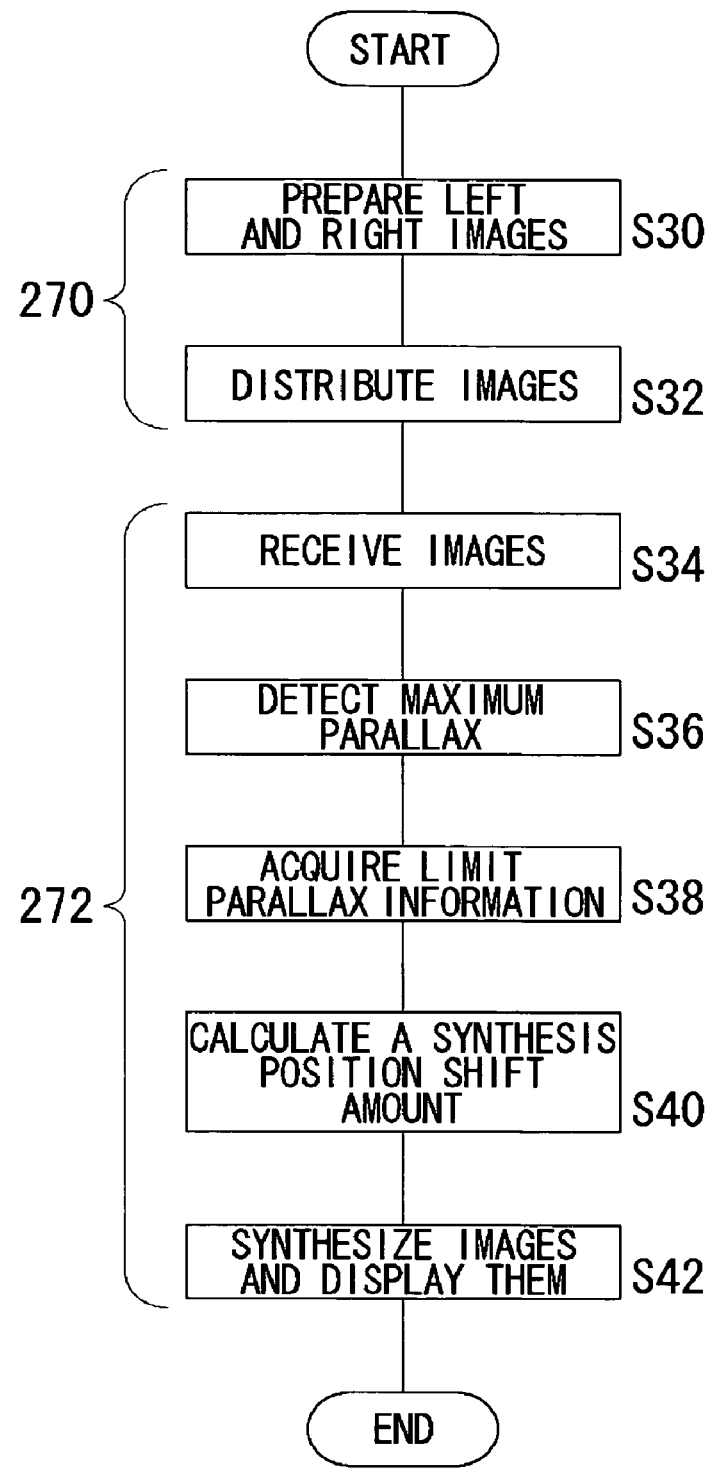
FIG. 46 is a flowchart showing another processing by a second three-dimensional image processing apparatus.

FIG. 46 is a flowchart showing an automatic adjustment by a second three-dimensional image processing apparatus 100. The generation of right and left images (S30) and the distribution of the images (S32), which are the procedure 270 of the image creator, are the same as in FIG. 45. The reception of the images (S34) in the procedure 272 of the second three-dimensional image processing apparatus 100 is not different. Then, parallaxes given in advance between parallax images, especially the maximum parallaxes, are detected by a matching unit 158 of a parallax amount detecting unit 150 (S36), and, on the other hand, appropriate parallaxes, especially the limit parallaxes, are acquired from a parallax information storage unit 120 (S38). After this, a position shifting unit 160 shifts the synthesis position of the images so as to satisfy the limit parallaxes by the aforementioned processing (S40), and the image is three-dimensionally displayed after the processings by a parallax write unit 164, an image edge adjusting unit 168 and a format conversion unit 116 (S42).

Figure 47:
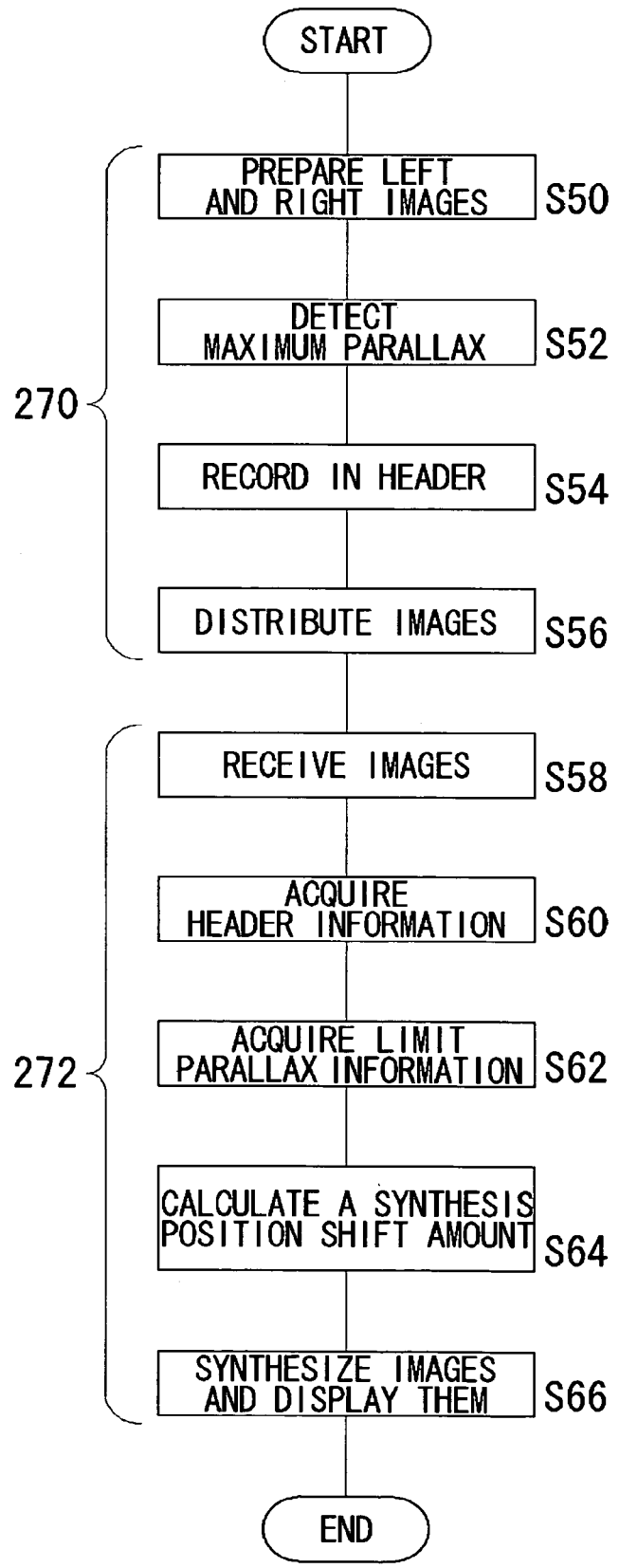
FIG. 47 is a flowchart showing still another processing by a second three-dimensional image processing apparatus.

FIG. 47 is a flowchart showing still another automatic adjustment by a second three-dimensional image processing apparatus 100. After the generation of left and right images by the procedure 270 of an image creator (S50), the maximum parallax at this point is detected (S52) and recorded in the header of a viewpoint image of any of the parallax images (S54). This detection may be accomplished by a corresponding-point matching, but when parallax images are created manually by a creator, the maximum parallax is naturally known in the editing process, and therefore it may be recorded. Then the image is distributed (S56).

On the other hand, the receipt of images (S58) in the procedure 272 of the second three-dimensional image processing apparatus 100 is the same as in FIG. 46. Then the above-mentioned maximum parallax is read out from the header by a header inspecting unit 156 of a parallax amount detecting unit 150 (S60). On the other hand, the limit parallaxes are acquired from a parallax information storage unit 120 (S62), and the subsequent processings S64 and S66 are the same as the processings S40 and S42 in FIG. 46, respectively. According to this method, it is not necessary to calculate the maximum parallax. Also, it is possible to realize an appropriate three-dimensional sense for the whole image. Moreover, since the shift amount can be recorded in the header, there is no possibility of loss of an original image itself. Though not shown, if the detected maximum parallax is recorded in the header even in the case of FIG. 46, a processings can be made, from the next time on, according to the procedure of FIG. 47.

It is to be noted that similar processings are possible even in a multiple-eye system, in which similar processings may be applied to the parallax amounts between the respective adjacent viewpoint images. In actual practice, however, the maximum parallax of the parallaxes between such a plurality of viewpoint images may be taken as the "maximum parallax" among all the viewpoint images and the shift amount of the synthesis position may be determined.

It has been mentioned that there may be header information in at least one of the multiple viewpoint images, but when the multiple viewpoint images are synthesized in a single image, the header of the image can be utilized.

Further, there may be cases where already synthesized images are distributed. In such a case, the images may be separated once by a reverse conversion processing and then resynthesized by calculating the synthesis position shift amount, or a processing may be performed to rearrange the pixels to achieve the same result.

Figure 48:
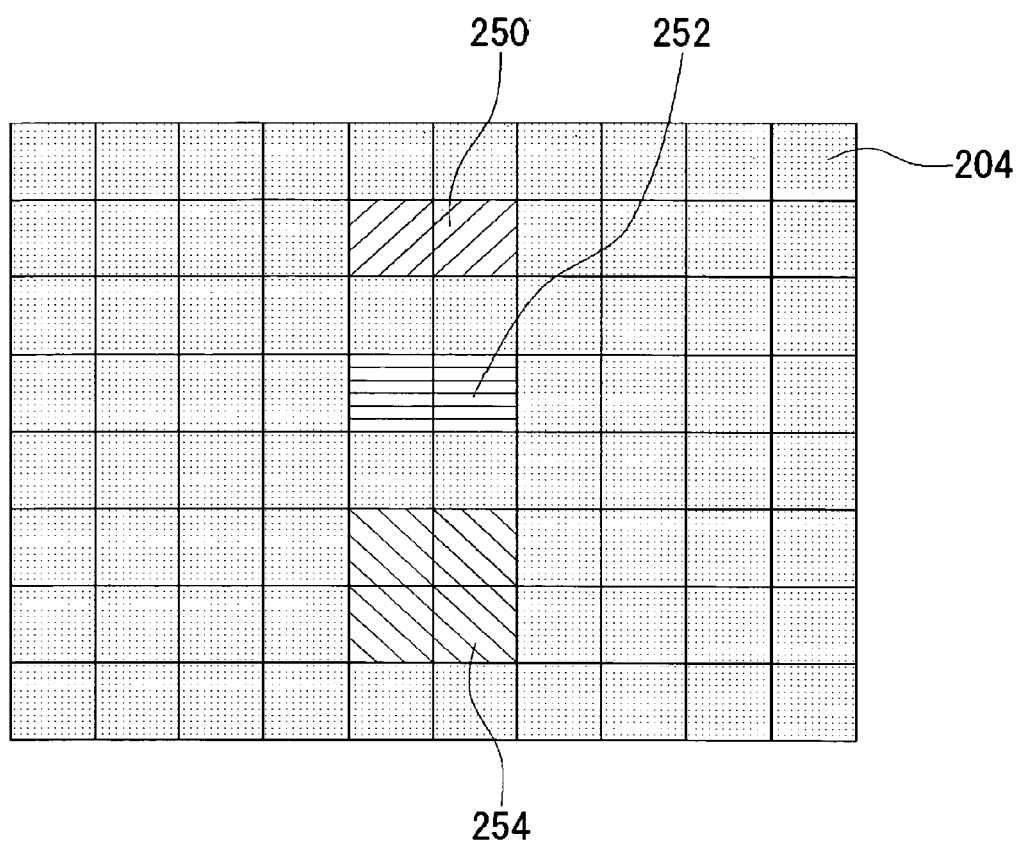
FIG. 48 shows a plane image with a depth map.

FIGS. 48 through 51 show processings for shifting the synthesis position for images with depth information. These are done by a two-dimensional image generating unit 178 of a third three-dimensional image processing apparatus 100. FIG. 48 and FIG. 49 each show a plane image 204 and depth map constituting an image with depth information. Here, nearer-position depths are denoted by plus, and farther-position depths by minus. As objects, there are a first quadrilateral 250, a second quadrilateral 252 and a third quadrilateral 254, and the first quadrilateral 250 has a depth of "4", the second quadrilateral 252 a depth of "2" and the third quadrilateral 254 a depth of "–4". The first quadrilateral 250 is at the nearest-position point, the second quadrilateral 252 at an intermediate nearer-position point and the third quadrilateral 254 at the farthest-position point.

Figure 50:
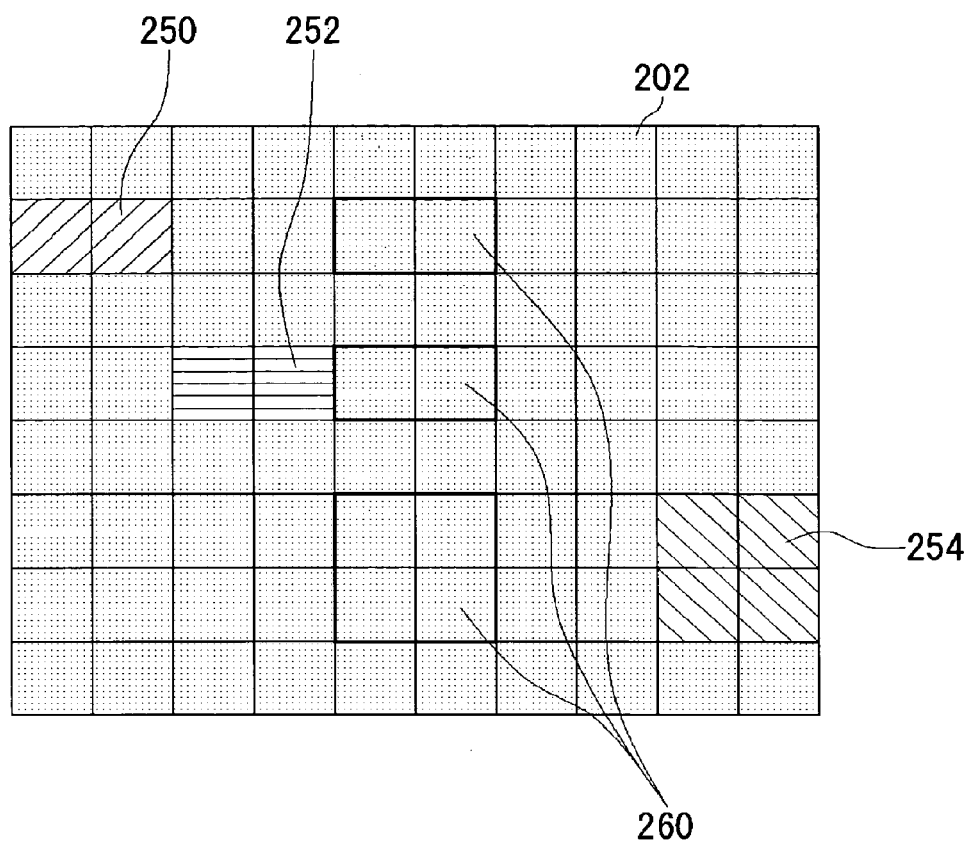
FIG. 50 shows how parallax images are generated, based on a depth map, by a two-dimensional image generating unit of a second three-dimensional image processing apparatus.

Based on the original plane image 204, the two-dimensional image generating unit 178 generates an other viewpoint image by first performing a processing of shifting the pixels by values of the depth map. If reference is to be the left-eye image, the original plane image 204 will be the left-eye image as it is. As shown in FIG. 50, a right-eye image 202 is produced by shifting the first quadrilateral 250 four pixels to the left, the second quadrilateral 252 two pixels to the left and the third quadrilateral 254 four pixels to the right. An image edge adjusting unit 168 fills up a lost part 260 of pixel information caused by the movement of the objects by the adjacent pixels, which have a parallax of "0" and are considered to be the background.

Following this, the two-dimensional image generating unit 178 calculates the depths satisfying appropriate parallaxes. If the range of depth is to be K1 to K2 and the depth value of each pixel is to be Gxy, then the depth map will take a form of Hxy changed to Gxy in FIG. 37. Also, suppose that the appropriate parallax of the display apparatus in the user's possession is found to be J1 to J2. In this case, the depth value G of each pixel in the depth map will be converted as follows to produce a new depth value Fxy:

$$Fxy=J1+(Gxy-K1)\times(J2-J1)/(K2-K1)$$

In the above-mentioned example, if K1=−4, K2=4 and J1=−3, J2=2, the depth map of FIG. 49 will be converted to the depth map of FIG. 51 by this conversion formula. That is, "4" is converted to "2", "2" to "1" and "−4" to "−3", respectively. The intermediate value between K1 and K2 are converted into the value between J1 and J2. For example, the second quadrilateral 252 will be such that when Gxy=2, Fxy=0.75. When Fxy is not an integer, a rounding off or a processing to make the nearer-position parallax smaller may be carried out.

While the above-described conversion formula is a case of linear transformation, multiplication by a weighting function F(Gxy) for Gxy and various other nonlinear transformation are also conceivable. Also, from the original plane image 204, left and right images can be newly created by shifting the objects in mutually opposite directions. In the case of a multiple-eye system, a similar processing may be repeated a plural number of times to generate a multiple-viewpoint image.

The above are structures and operations for the three-dimensional image processing apparatus 100 according to embodiments.

Though the three-dimensional processing apparatus 100 has been described as an apparatus, this may be a combination of hardware and software and it can be structured by software alone. In such a case, convenience will increase if an arbitrary part of the three-dimensional image processing apparatus 100 is turned into a library so that calling can be made from various programs. A programmer can skip the part of programming which requires knowledge of 3D display. For users, trouble of re-setting will be saved because the operation concerning 3D display, namely, the GUI is of the same kind irrespective of software or contents and thus the information set may be shared by the other software.

Moreover, it is proven useful that information, instead of processings for 3D display, can be shared between a plurality of programs. Various programs can determine the status of image by referring to such information. An example of information that can be shared is information acquired by the information acquiring unit 118 of the above-described three-dimensional image processing apparatus 100. This information may be stored in a recording unit (not shown), a correction map storage unit 140 or the like.

Figure 52:
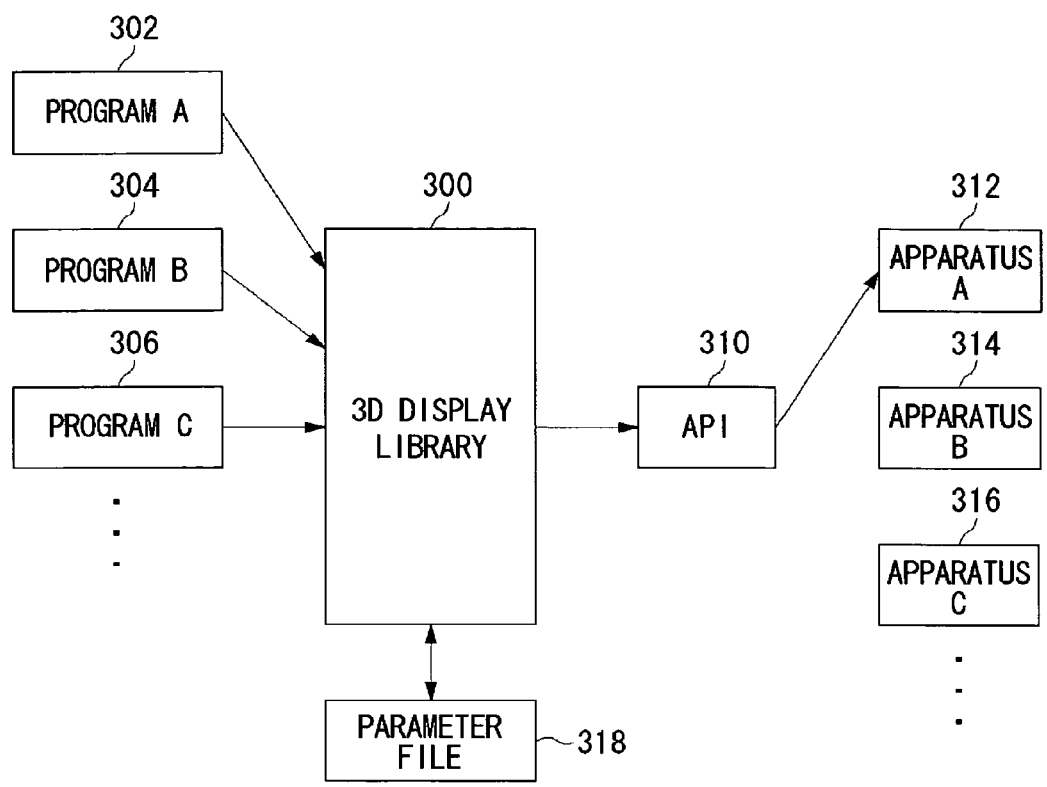
FIG. 52 shows how a three-dimensional image processing apparatus according to an embodiment is turned into a library and utilized.
Figure 53:
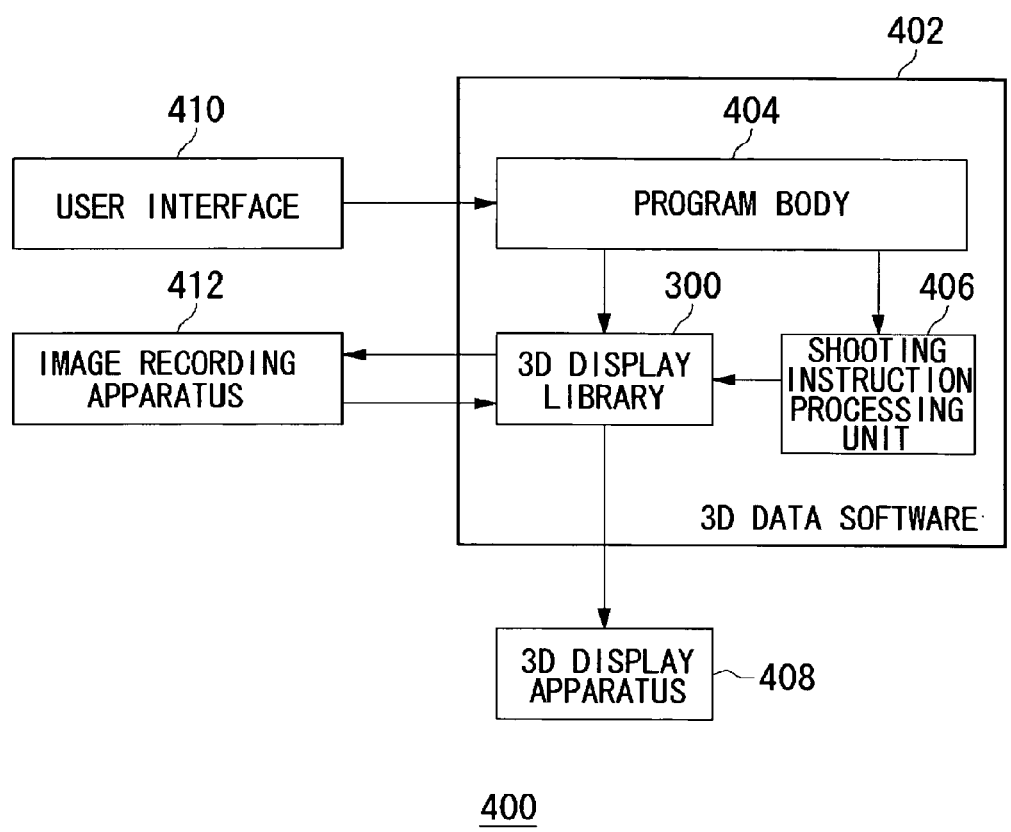
FIG. 53 shows a structure such that a three-dimensional display library is incorporated into three-dimensional data software.
Figure 54:
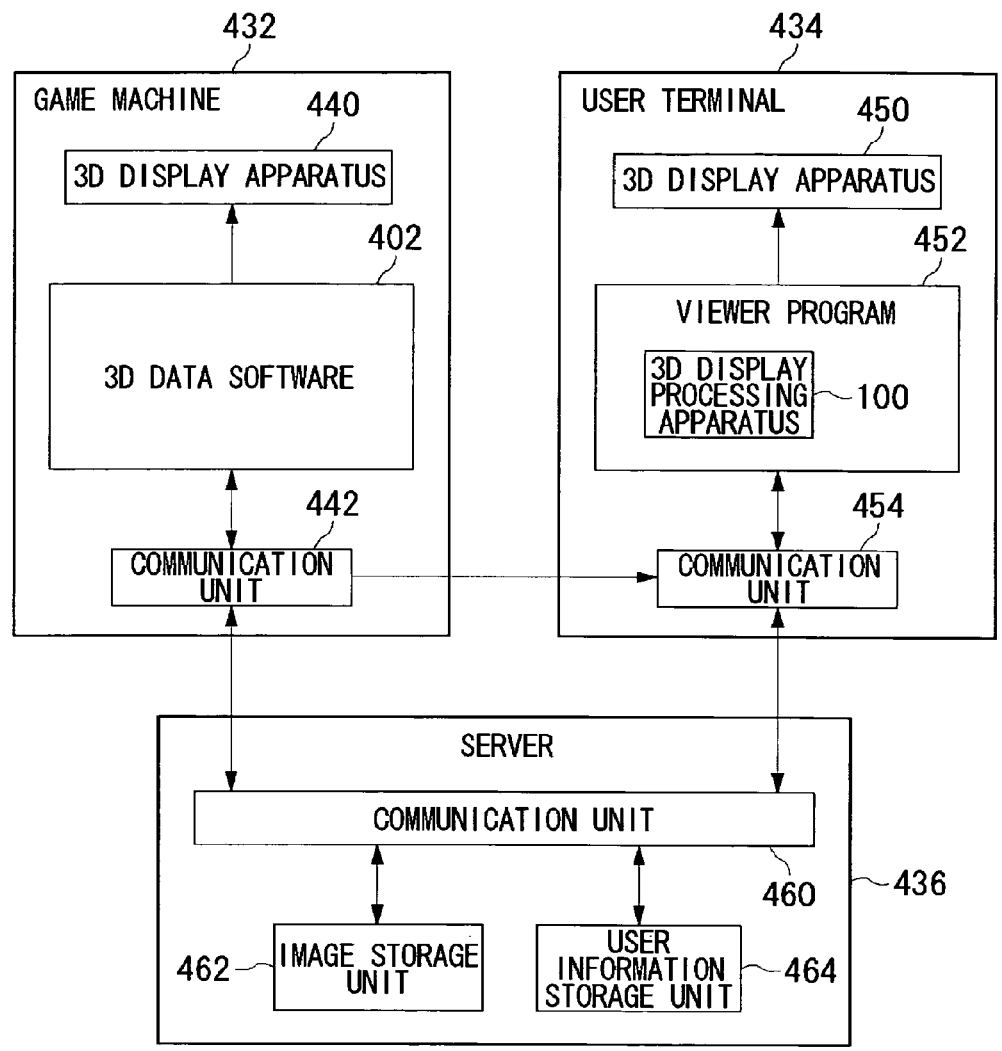
FIG. 54 shows how a three-dimensional display library is utilized in a network-using-type system.

FIGS. 52 to 54 show an example in which an above-described three-dimensional image processing apparatus 100 is used as a library. FIG. 52 shows a usage of a three-dimensional display library 300. The three-dimensional display library 300 is referred to in the form of calling out functions from a plurality of programs, such as program A 302, program B 304 and program C 306. Stored in a parameter file 318 are not only the above-described information but also the user's appropriate parallaxes and so forth. The three-dimensional display library 300 is used by a plurality of apparatuses, such as apparatus A 312, apparatus B 314 and apparatus C 316, via API (Application Program Interface) 310.

Conceivable as examples of program A 302 and others games, three-dimensional applications which are so-called Web3Ds, three-dimensional desktop screens, three-dimensional maps, viewers of parallax images which are two-dimensional images, and viewers of images with depth information and so forth. Some games may naturally differ in the usage of coordinates, but the three-dimensional display library 300 can cope with that.

On the other hand, examples of apparatus A 312 and others are arbitrary three-dimensional display apparatuses using parallax, which may include the two- or multiple-eye parallax barrier type, the shutter glasses type and the polarizing glasses type.

FIG. 53 shows an example in which a three-dimensional display library 300 is incorporated into three-dimensional data software 402. The three-dimensional data software 402 is comprised of a program body 404, a three-dimensional display library 300 to realize appropriate parallaxes therefor, and a shooting instruction processing unit 406. The program body 404 communicates with the user via a user interface 410. The shooting instruction processing unit 406 performs a virtual camera shooting of a predetermined scene during the operation of the program body 404 according to instructions from the user. The shot image is recorded in an image recording apparatus 412. It is also outputted to a three-dimensional display apparatus 408.

Suppose, for instance, that the three-dimensional data software 402 is game software. In that case, the user can execute the game while experiencing an appropriate three-dimensional effect created by the three-dimensional display library 300 during the game. When the user desires to record a scene during the game, for instance, when he/she has won a complete victory in a competing battle game, the user can record the scene by giving instructions to the shooting instruction processing unit 406 via the user interface 410. At that time, parallax images, which will produce an appropriate parallax when reproduced later by the three-dimensional display apparatus 408, are generated by the use of the three-dimensional display library 300, and they are recorded in an electronic album or the like of the image recording apparatus 412. It is to be noted that the recording done in parallax images, which are two-dimensional images, does not allow the escape of three-dimensional data themselves possessed by the program body 404, which can provide a security of copyright protection also.

FIG. 54 shows an example in which a three-dimensional data software 402 of FIG. 53 is incorporated into a network-using-type system 430.

A game machine 432 is connected to a server 436 and a user terminal 434 via a network which is not shown. The game machine 432, which is one for a so-called arcade game, includes a communication unit 442, a three-dimensional data software 402 and a three-dimensional display apparatus 440 for displaying a game locally. The three-dimensional data software 402 is the one shown in FIG. 53. The parallax images coming from the three-dimensional data software 402 and displayed on the three-dimensional display apparatus 440 are optimally set in advance for the three-dimensional display apparatus 440. As will be described later, the adjustment of parallax by the three-dimensional data software 402 is used when images are transmitted to the user via the communication unit 442. The display apparatus to be used here may suffice if it has a function of generating three-dimensional images by adjusting the parallax; that is, the display apparatus is not necessarily one capable of three-dimensional display.

The user terminal 434 is comprised of a communication unit 454, a viewer program 452 for viewing three-dimensional images and a three-dimensional display apparatus 450 of arbitrary size and type for displaying three-dimensional images locally. A three-dimensional image processing apparatus 100 is implemented in the viewer program 452.

The server 436 is comprised of a communication unit 460, an image storage unit 462 which records images shot virtually by the user relative to the game, and a user information storage unit 464 which records personal information, such as the user's appropriate parallax, mail address and other information, in association with the user. The server 436, for instance, functions as an official site for a game and records moving images or still images of the user's favorite scenes or notable matches during the game. 3D display is possible either in moving images or still images.

One example of image shooting in a structure as described above will be performed as follows. The user operates 3D display on the three-dimensional display apparatus 450 of the user terminal 434 in advance, acquires appropriate parallaxes using the function of the three-dimensional image processing apparatus 100, and notifies them to the server 436 via the communication unit 454 to have them stored in the user information storage unit 464. These appropriate parallaxes are set in general-purpose description independent of the hardware of the three-dimensional display apparatus 450 in the user's possession.

The user plays a game on the game machine 432 at his/her arbitrary timing. During that time, 3D display is carried out on the three-dimensional display apparatus 440 with parallaxes initially set or manually adjusted by the user. If the user requests a recording of images during the play or replay of a game, the three-dimensional display library 300 built in the three-dimensional data software 402 of the game machine 432 acquires the user's appropriate parallaxes from the user information storage unit 464 of the server 436 via the two communication units 442 and 460, generates parallax images in accordance with them, and stores the parallax images for the virtually shot images in the image storage unit 462 again via the two communication units 442 and 460. If the user downloads this parallax image to the user terminal 434 after he/she goes back home, 3D display can be done with desired three-dimensional sense. At that time, too, it is possible to manually adjust the parallaxes using the three-dimensional image processing apparatus 100 possessed by the viewer program 452.

According to the example of application as described above, the programming for the three-dimensional sense, which has primarily had to be set for each hardware and each user, is consolidated in the three-dimensional image processing apparatus 100 and the three-dimensional display library 300, so that a game software programmer has absolutely no need to care about the complex requirements for 3D display. This is not limited to game software, but the same can be said of any arbitrary software using 3D display, thus eliminating restrictions on the development of contents or applications using 3D display. Thus, this can dramatically accelerate the popularization of these.

In particular, with games or other applications which have three-dimensional CG data in the first place, there have often been cases where the three-dimensional data already there are not put to use in 3D display mainly because it has been conventionally difficult to code the 3D display accurately. However, the three-dimensional image processing apparatus 100 and the three-dimensional display library 300 according to an embodiment can remove such adverse effect and contribute to the enhancement of 3D display applications.

In FIG. 54, the user registers his/her appropriate parallaxes in the server 436, but the user may use a game machine 432 by bringing an IC card or the like with the information recorded. And he/she can record the scores regarding the game or favorite images on this card.

The present invention has been described based on the embodiments. The embodiments are only exemplary, and it is understood by those skilled in the art that there can exist other various modifications to the combination of each component and process described above and that such modifications are encompassed by the scope of the present invention. Such modified examples will be described hereinbelow.

A first three-dimensional image processing apparatus 100 is capable of high-accuracy processing with the input of three-dimensional data. However, the three-dimensional data may be once brought down to images with depth information, and parallax images therefor may be generated using a third three-dimensional image processing apparatus 100. As the case may be, such a processing may result in lower calculation cost. Similarly, it is also possible to create a depth map using a high-accuracy corresponding-point matching when inputting a plurality of viewpoint images and, by bringing down to images with depth information, parallax images therefor may be generated using a third three-dimensional image processing apparatus 100.

In the first three-dimensional image processing apparatus 100, a camera temporary placement unit 130 is constituted as part of the three-dimensional image processing apparatus 100, but the temporary camera positioning may be a preprocessing of the three-dimensional image processing apparatus 100. That is because the processing up to the temporary placement of cameras can be performed irrespective of the appropriate parallaxes. Similarly, it is also possible to place any arbitrary processing unit constituting the first, the second and the third three-dimensional image processing apparatus 100 outside of the three-dimensional image processing apparatus 100, and the high degree of freedom in structuring the three-dimensional image processing apparatuses 100 will be understood by those skilled in the art.

In the embodiments, description has been made of cases where parallax control is done in the horizontal direction, but similar processings can be performed in the vertical direction, too.

A unit may be provided that performs an enlargement processing of character data during the operation of the three-dimensional display library 300 or the three-dimensional image processing apparatus 100. For example, in the case of a parallax image with two horizontal viewpoints, the horizontal resolution of an image visible to the eyes of the user will become ½. As a result, the readability of characters may drop, and therefore a processing to extend the characters two times in the horizontal direction proves effective. Where there is a parallax in the vertical direction, it is also useful to extend the characters in the vertical direction.

During the operation of the three-dimensional display library 300 or the three-dimensional image processing apparatus 100, a "display during operation portion" may be provided where characters or a mark, such as "3D", is entered in the image being displayed. In that case, the user can know whether the image allows the adjustment of parallax or not.

Also, a 3D display/normal display switching unit may be provided. It will be convenient if this unit is structured such that it contains GUI and, at the click of a designated button by the user, it can switch the display from 3D display to normal two-dimensional display and vice versa.

The information acquiring unit 118 may be such that it does not necessarily acquire information by user input only but there may be information it can acquire automatically by a plug and play or like function.

In the embodiment, the method is such that E and A are derived, but the method may be such that they are fixed and the other parameters are derived and the variables are freely specified.

Another method of expression will be proposed for 3D display. In general plane image display, there are limitations in terms of reality on the expression particularly in the depth direction, such as "when an object passes through a boundary face". Also, it is difficult to have a viewer recognize the presence of a boundary face separating a space from another actually at the surface of a window. Therefore, as explained hereinafter, it will become possible that displaying objects three-dimensionally on a three-dimensional image display apparatus enables the viewers to recognize an agreement between an actual entity, such as a screen or a frame, and the boundary face on an object expressed within an image, thus giving rise to a new method of expression. Generally, a display screen and a frame around it are recognized visually. Hence, a displaying method using them as a window can be conceived, in which case it is necessary to specify an arrangement of the boundary face between spaces or a plate-like object at this surface. In this case, an optical axis intersecting position D will be specified in the positional relationship shown in FIG. 18.

In the positional relationship of a shooting system shown in FIG. 18, the following relations were obtained if the limit parallaxes in nearer and farther positions within a basic representation space T are P and Q, respectively:

$$E:S=P:A$$

$$E:S+T=Q:T-A$$

And when these relations are solved for the nearer-position and farther-position limit parallaxes, respectively, $$E=PS/A$$

$$E=Q(S+T)/(T-A)$$

are obtained. And a three-dimensional image of an appropriate parallax range is obtained by selecting a smaller E of these two E's.

Figure 55:
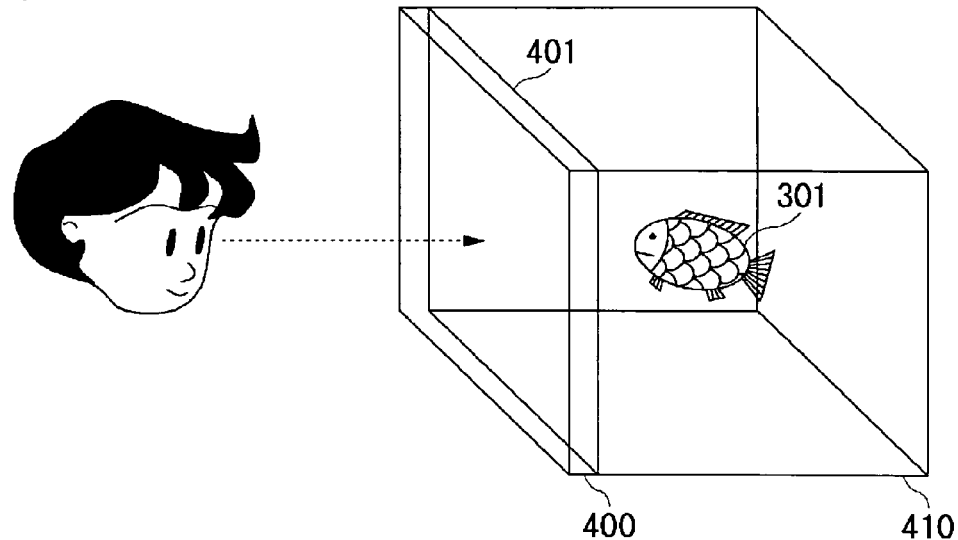
FIG. 55 shows a state in which an image structured by three-dimensional data is displayed on a display screen.
Figure 56:
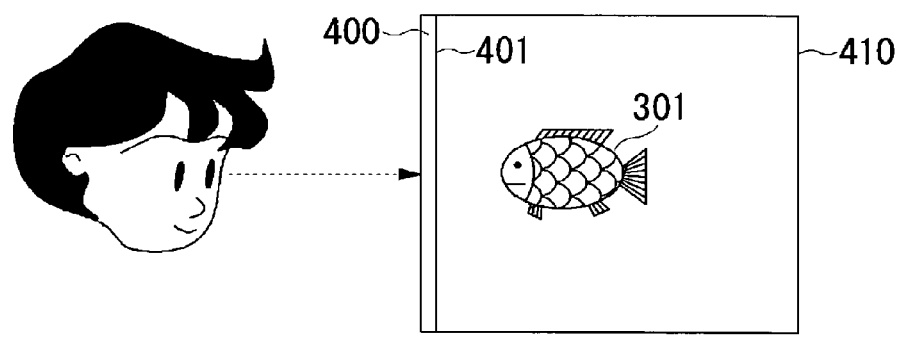
FIG. 56 shows another state in which an image structured by three-dimensional data is displayed on a display screen.
Figure 57:
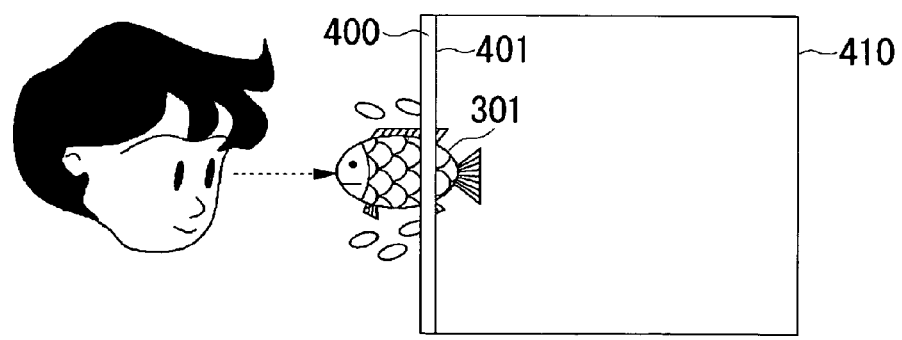
FIG. 57 shows still another state in which an image structured by three-dimensional data is displayed on a display screen.

FIG. 55 shows a state in which an image structured by three-dimensional data is displayed on a display screen 400. In this image, one glass surface 401 of a tank 410 coincides with the display screen 400, and that a fish 301 is swimming in the fish tank 410 is being expressed. If processing is done in such a manner that the far side of the display screen 400 is the farther-position space and the near side thereof the nearer-position space, then the fish 301 is normally expressed as if it is swimming in the farther-position space as shown in FIG. 56, and every now and then, as shown in FIG. 57, the expression can be made such that "the fish 301 appears in the nearer-position space after breaking through the display screen 400". Moreover, the expression can be made such that when the fish 301 passes through the display screen 400, for instance, "water splashes around the display screen 400 and then the boundary face is restored after the passage of the fish 301". Another example of expression can be made such that "there is no water in the nearer-position space on this side of the display screen and so after a while of swimming there, the fish 301 is out of breath and goes back to the farther-position space by breaking through the boundary face, or the display screen 400, again".

It is to be noted that when an object has passed through an interface, it is not necessary that the boundary face broken by the passage of the object be recovered, and it is obvious that a variety of expressions can be made of the interaction between the boundary face and the object, such as the boundary face remaining broken, the object bumping against the boundary face without passing therethrough and the boundary face deforming, or the shock then only transmitting, an electric shock, for instance, serving as the effect on images, being added. Also, the boundary face may not only be a simple surface but also the placement of a plate-like object like glass or a thin object like paper. Further, it is not necessary that the boundary face be perfectly coincident with the display screen, but it may be in the neighborhood thereof. In the expressing effects as described above, it is obvious that planar images cannot communicate the circumstances fully to the viewer. Especially when the original data from which three-dimensional images are generated are three-dimensional data, the editing becomes easier for expressing the effects as mentioned above.

Figure 58:
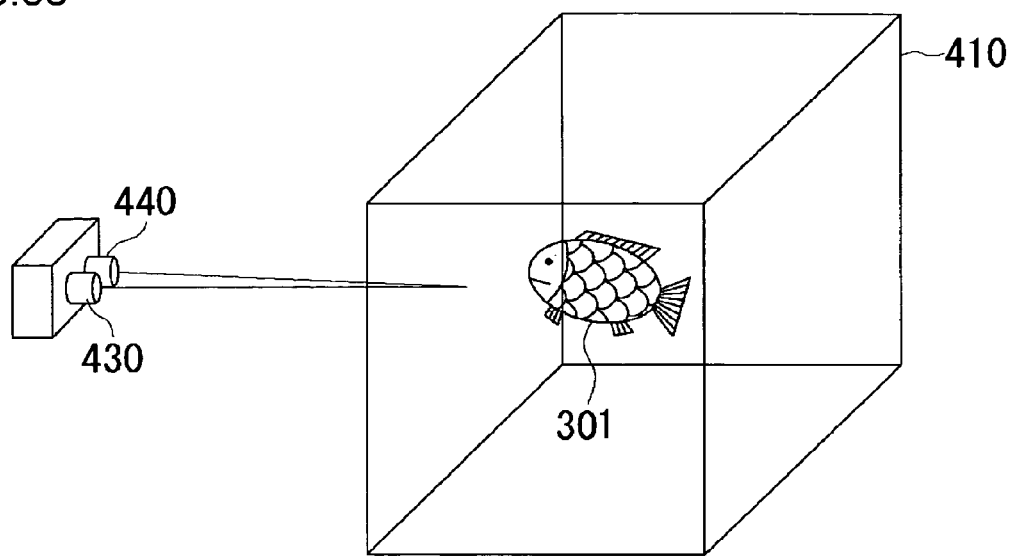
FIG. 58 shows a technique in which a boundary face possessed by an object to be displayed is made to coincide with a display screen.
Figure 59:
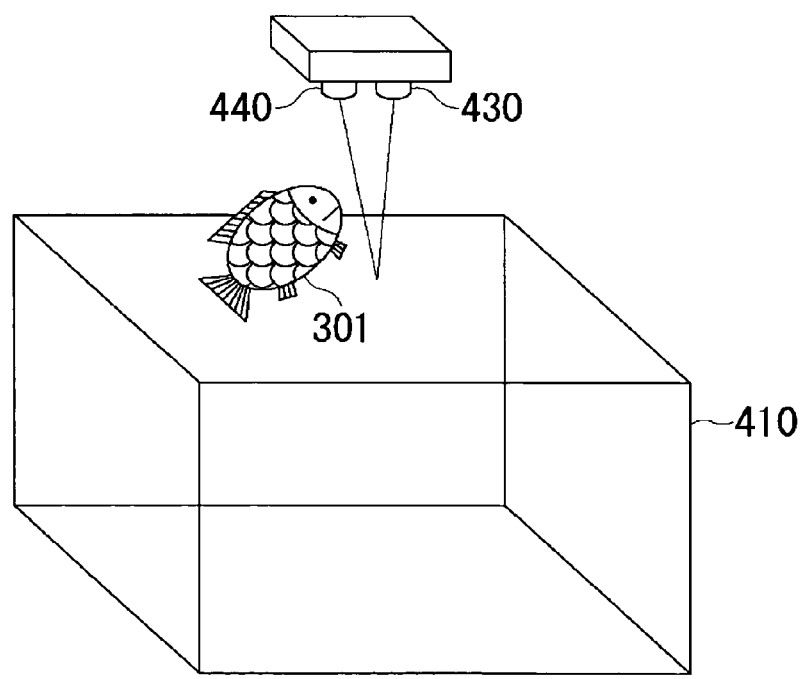
FIG. 59 shows another state in which an image is shot in a manner such that an optical axis intersecting position of two virtual cameras is made to coincide with one surface of a tank.

The expression in which the boundary face possessed by an object to be displayed is brought into agreement with the display screen can be accomplished by a technique shown in FIG. 58. That is, a virtual tank 410 is placed in a three-dimensional space and two images are generated from two virtual cameras 430 and 440 positioned to the left thereof. At this time, the optical axis intersecting position of the two virtual cameras 430 and 440 is brought into agreement with one surface of the tank. And this kind of image can be shot as shown in FIG. 59. Two virtual cameras 430 and 440 are disposed above an actual tank 410, and the tank 410 is shot. At that time, the optical axis intersecting position of the two virtual cameras is brought into agreement with the water surface.

Figure 60:
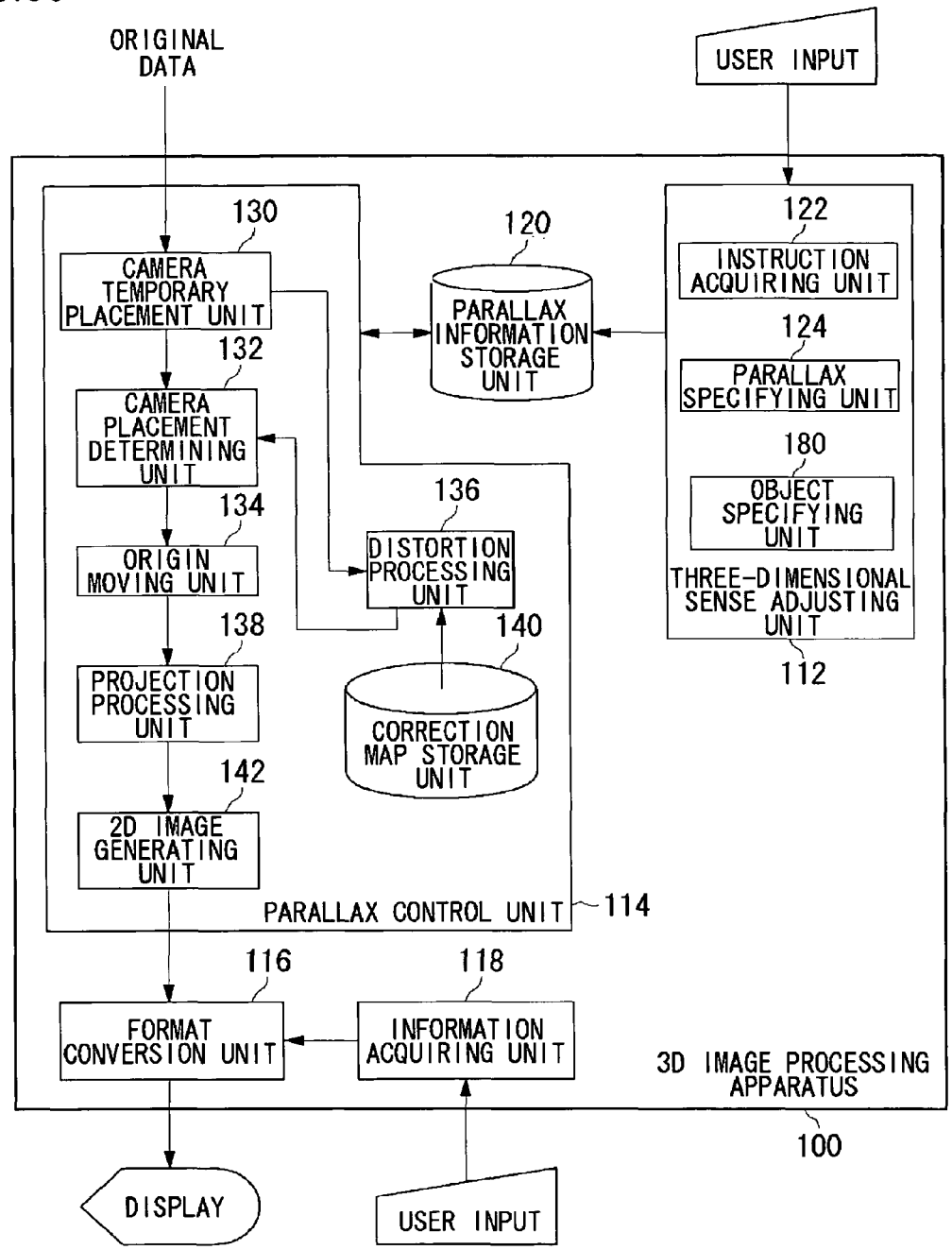
FIG. 60 shows a structure of a fourth three-dimensional image processing apparatus.

FIG. 60 shows a structure of a fourth three-dimensional image processing apparatus 100 to realize the above-described processing. This three-dimensional image processing apparatus 100 is of a structure with an object specifying unit 180 added to the three-dimensional sense adjusting unit 112 of the first three-dimensional image processing apparatus 100 shown in FIG. 11. This object specifying unit 180 performs a processing to position the boundary face of an object specified by the user near or exactly at the display screen. Here the user is assumed to be a producer of three-dimensional images, and the above-mentioned processing is done at the time of producing or editing three-dimensional images. It is to be noted that the user may be a viewer, too.

Firstly, a processing procedure will be explained concerning a three-dimensional image processing apparatus 100 shown in FIG. 60. An object specifying unit 180 receives specification of an object corresponding to the optical axis intersecting plane of two virtual cameras 430 and 440 from the user via a predetermined input device such as a mouse and informs a parallax control unit 114 of the specified object. The parallax control unit 114, or more specifically a camera placement determining unit 132, makes such an adjustment as to have the place possessed by the object specified by the user coincide with the optical axis intersecting plane of the two virtual cameras 430 and 440. The operation other than this processing may be the same as that of the three-dimensional image processing apparatus 100 shown in FIG. 11. Added to the object determined like this is information indicating that it will be displayed in the vicinity of the display screen. This will be read out as appropriate at the time of display to determine the optical axis intersection distance D, and the distance E between cameras is determined by a processing described earlier.

Another expressing technique will be proposed. When there are a plurality of objects to be displayed on the display screen, it is not necessary that all the objects always fall within the appropriate parallaxes. For effective display, some of the objects may at times be displayed outside of the conditions of appropriate parallax, for instance, for a certain period under certain conditions. As this technique, a way of determining a basic representation space for a still object has been described earlier, but, in more detail, for each object, information for determining an object to be expressed within a basic representation space containing objects to be displayed three-dimensionally (hereinafter referred to simply as "identification information" also) may be added. It is to be noted that an object to be expressed within a basic representation space is also called a "calculation object for basic representation space". And, based on this identification information, a basic representation space may be determined as required.

If the identification information is so structured as can be changed as required, then it is possible to flexibly set a condition in which the object itself is to be excluded from appropriate parallax. For example, if the identification information includes a description of time specification for exclusion from the appropriate parallax conditions, a return may be made back to the range of appropriate parallax automatically after the passage of the specified time.

Described hereunder is a technique whereby some of the objects are temporarily excluded from the appropriate parallax conditions for display on the display screen as mentioned above. For example, the camera placement determining unit 132 in the first three-dimensional image processing apparatus 100 shown in FIG. 11 makes corrections to the temporarily set camera parameters according to the appropriate parallaxes, but the function may be further expanded as follows. That is, the camera placement determining unit 132 reads the identification information, which is associated to each object, and arranges the camera parameters in such a manner as to reflect the identification information.

Figure 61:
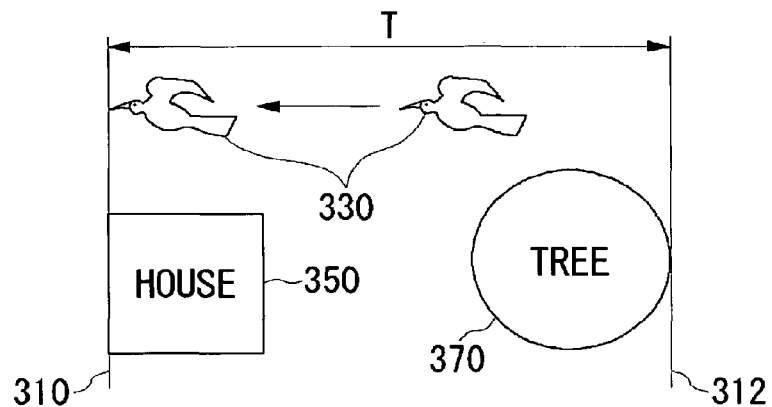
FIG. 61 is, for convenience, an illustration of a basic representation space T concerning an image displayed on a fourth three-dimensional image processing apparatus.

Still another expressing technique will be proposed. If the front plane and the back plane of a basic representation space, namely, the front projection plane, which is the nearer-position limit, and the back projection plane, which is the farther-position limit, are determined by a certain object, it will become impossible to express motion in the space before and behind the space corresponding to the object. FIG. 61 shows, for convenience, an illustration in the depth direction, especially a basic representation space T, concerning an image displayed on a fourth three-dimensional image processing apparatus 100. A front projection plane 310 is set on the left of this Figure and a back projection plane 312 on the right thereof, and the space between the front projection plane 310 and the back projection plane 312 is the basic representation space T. Still objects expressed within the range of the basic representation space T are a house 350 on the front projection plane 310 side and a tree 370 on the back projection plane 312 side. Furthermore, a bird 330, which is a moving object, is moving forward in a space above those two still objects. The movement of the bird 330 can be expressed as long as it is moving within the range of the basic representation space T. However, after it has reached the front projection plane 310 or the back projection plane 312, the bird 330 becomes an object placed at the front projection plane as the bird 330 shown at the left of FIG. 61 or at the back projection plane, though not shown. Thus the bird 330 will be fixed at the maximum parallax and cannot move further forward or backward in real space. If an object can be so expressed as to be moving even a little, then the sense of reality about the object can maintained.

As mentioned above, a processing of excluding a moving object from the objects for a basic representation space T is conceivable. Yet, except for the cases where a certain effect is to be sought as described above, there is a possibility of the user having a sense of discomfort and so it is often desirable that the expression be done within the range of basic representation space T.

Figure 62:
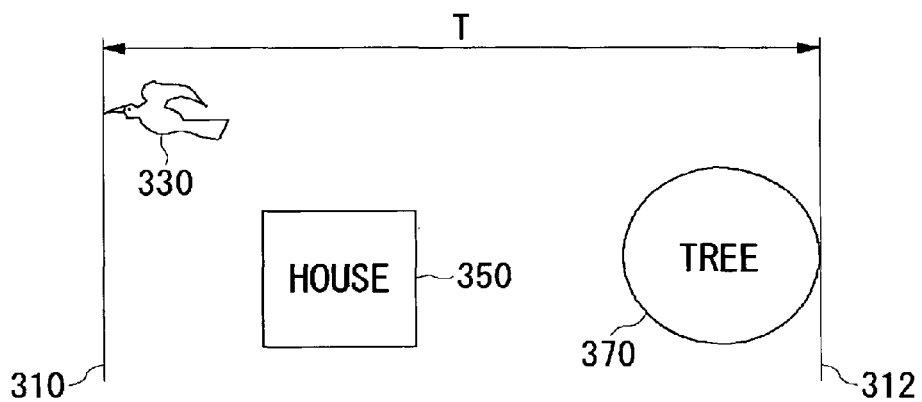
FIG. 62 is a drawing in which an area where no object exists is represented in such a manner as to be included in a basic representation space T.
Figure 63:
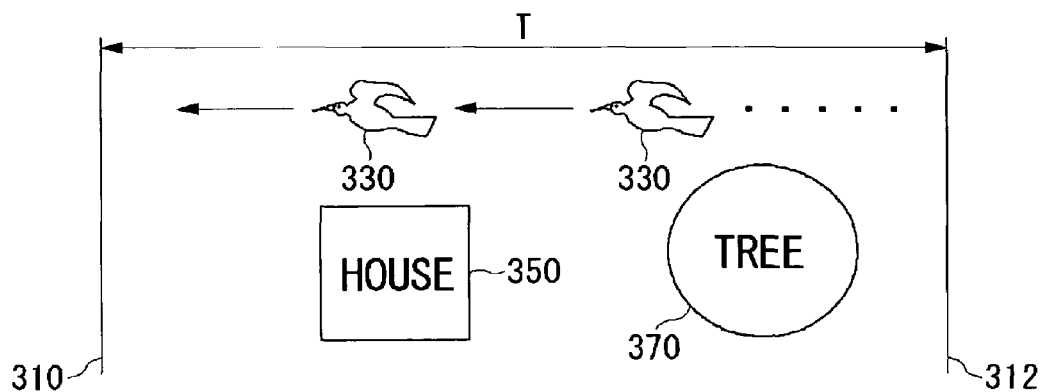
FIG. 63 is a drawing in which an area where no object exists is represented in such a manner as to be included in a basic representation space T.

Therefore, as shown in FIG. 62, a region without the presence of any object is included in the basic representation space T. In FIG. 62, a region without the presence of any object is provided, as part of the basic representation space T, in the further front of the house 350, which is a still object in front, and thus the bird 330, which is a dynamic object, may be able to move in front of the house 350. In FIG. 63, a region without the presence of any object is also further provided, as part of the basic representation space T, in the further back of the tree 370, which is a stationary object placed in back. Thereby, the bird 330, which is a dynamic object, may, for instance, be so expressed as to have moved from the back, and even when it has moved further forward past the front of the house 350, the expressing can be made with appropriate parallax because the bird 330 is positioned within the basic representation space T. Thus the viewer, who is the user, does not have a sense of discomfort about the movement.

Figure 64:
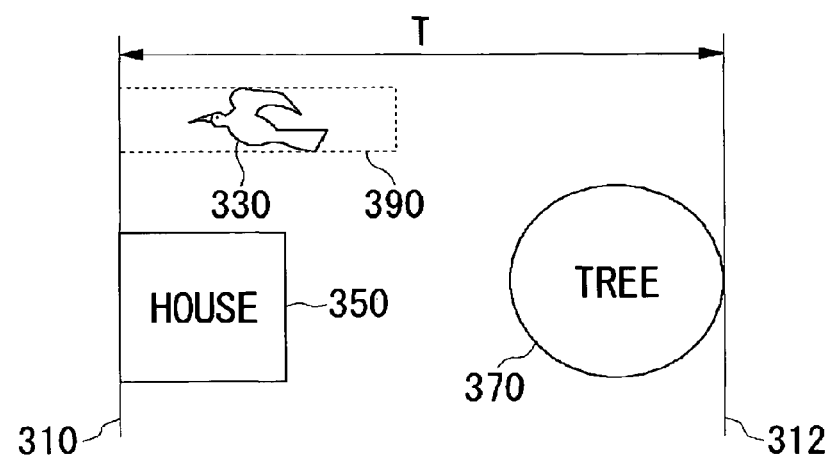
FIG. 64 shows how a moving object, as an object for parallax calculation, is formed in such a manner that not only the bird 330 alone but also spaces in front and back are included therein.

As shown in FIG. 64, a moving object 390, as an object for parallax calculation, is formed, for instance, in such a manner that not only the bird 330 itself but also the spaces in front and back are included therein. When the forefront surface of the moving object 390 reaches the front projection plane 310, the bird 330 only is moved. In that case, by slowing the moving velocity of the bird 330 from the original speed, the timing can be delayed for the bird 330 to reach the front projection plane 310 too quickly to make the expressing thereafter impossible.

Figure 65:
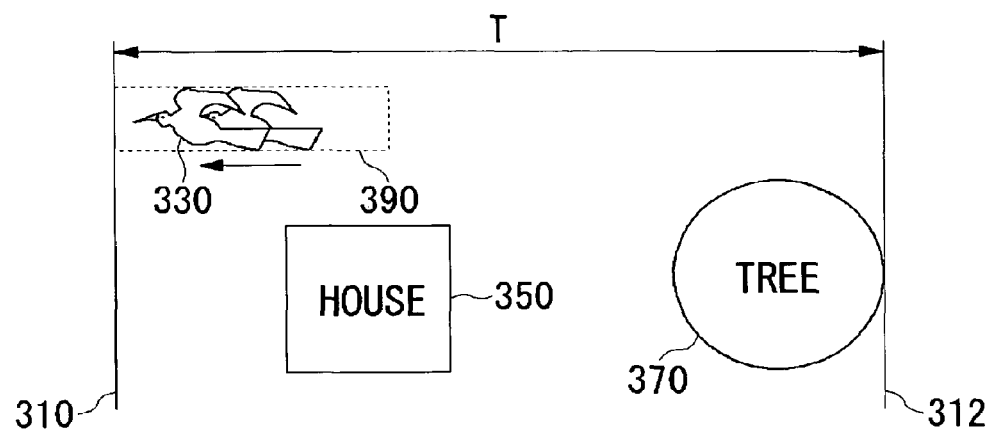
FIG. 65 shows how a bird is moved in a previously included space after a moving object has gone past a front projection plane.

As shown in FIG. 65, it may be so arranged, for instance, that after the moving object 390 has gone past the front projection plane 310, the bird 330 is allowed to move in a previously included space. By this, the maximum parallax is determined by the moving object 390, and the bird 330, which nears the maximum parallax gradually, can keep moving forward in real space. This can be realized by a judgment to enable or disable the movement depending on the position of the object, or the bird 330. The moving velocity may be set to any of the originally assumed moving velocity, a fast velocity or a slow velocity; the flexibility given to the moving velocity makes a variety of expressions possible. For example, by changing the moving velocity slower in positions closer to the end of the moving object 390, the movement forward can be expressed while preventing excessively large parallax amount in the forward and the backward direction.

Moreover, if another object further makes its appearance in front or in back of it, the maximum parallax will now depend on the object. Hence, the bird 330 is returned gradually to the original position within the moving object 390.

Next, a principle of preventing rapid changes in parallax while changing the maximum parallax will be explained based on the previously shown FIG. 17 and FIG. 18. As described above, the following relations hold:

$$\tan(\phi/2) = M\tan(\phi/2)/L$$

$$E:S = P:A$$

From these equations, the parallax amount on the nearer-position side of an object in a certain camera setting may be expressed as:

$$M = LEA/(2S(A+S)\tan(\theta/2))$$

Here, if the object moves forward, A becomes larger, S smaller and the parallax amount larger unless the camera setting is changed.

Here, if M becomes M', S becomes S' and A becomes A' with the movement of the object forward, then $$M'=LEA'/(2S'(A'+S')\tan(\theta/2))$$

$$M<M'$$

With E and A' of the camera settings changed, the conversion is done as in:

$$M''=LE''A''/(2S'(A''+S')\tan(\theta/2))$$

And at this time, if the following relationship:

$$M<M''<M'$$

is satisfied, rapid changes in parallax amount can be prevented when an object moving toward the viewer is displayed three-dimensionally. It is to be noted that only one of E and A' may be changed. At this time, M" is expressed as $$M''=LE''A'/(2S'(A'+S')\tan(\theta/2))$$

or $$M''=LEA''/(2S'(A''+S')\tan(\theta/2))$$

To prevent rapid changes in parallax amount for the movement of an object in the depth direction, the relationship to be satisfied will be:

$$M>M''>M'$$

Similarly for the parallax amount N on the farther-position side, $$N=LE(T-A)/(2(T+S)(A+S)\tan(\theta/2))$$

$$N'=LE(T-A')/(2(T+S')(A'+S')\tan(\theta/2))$$

$$N''=LE''(T-A'')/(2(T+S')(A''+S')\tan(\theta/2))$$

are obtained. Here, if the relation:

$$N>N''>N'$$

is satisfied, the moving velocity on an actual coordinate system can prevent rapid changes in parallax amount for the movement of an object toward the viewer. Also, if the relation:

$$N<N''<N'$$

is satisfied, rapid changes in parallax amount can be prevented for the movement of an object in the depth direction.

Hereinabove, the structure of a three-dimensional image display apparatus 100, which realizes expressing techniques as shown in FIGS. 61 to 65, is explained. This three-dimensional image display apparatus 100 can be realized by a three-dimensional image display apparatus 100 shown in FIG. 60. However, a camera placement determining unit 132 is further provided with a function of reading, from original data, information on the range on which the calculation is to be done in a basic representation space or information on the change of parallax amount for an object, when correcting the temporarily set camera parameters according to the appropriate parallax, and reflecting them on camera parameters. The information may be incorporated into the original data themselves or may, for instance, be stored in a parallax information storage unit 120.

In the embodiment, the processing is such that the parallax of a three-dimensional image is made smaller when an appropriate parallax processing judges that the parallax is in a state of being too large for a correct parallax condition where a sphere can be seen correctly. At this time, the sphere is seen in a form crushed in the depth direction, but a sense of discomfort for this kind of display is generally small. People, who are normally familiar with plane images, tend not to have a sense of discomfort, most of the time, as long as the parallax is between 0 and a correct parallax state.

Conversely, the processing will be such that the parallax is made larger when an appropriate parallax processing judges that the parallax of a three-dimensional image is too small for a parallax condition where a sphere can be seen correctly. At this time, the sphere is, for instance, seen in a form swelling in the depth direction, and people may have a sense of significant discomfort for this kind of display.

A phenomenon that gives a sense of discomfort to people as described above is more likely to occur, for example, when 3D displaying a stand-alone object. Particularly when objects often seen in real life, such as a building or a vehicle, are to be displayed, a sense of discomfort with visual appearance due to differences in parallax tends to be more clearly recognized. To reduce the sense of discomfort, correction needs to be added to a processing that increases the parallax.

When three-dimensional images are to be generated from three-dimensional data, the parallax can be adjusted with relative ease by changing the camera placement. With reference to FIGS. 66 through 71, parallax correction procedures will be shown. This parallax correction can be made using the above-described first to fourth three-dimensional image processing apparatuses 100. Assumed here is the generation of three-dimensional images from three-dimensional data by a first three-dimensional image processing apparatuses 100 shown in FIG. 11. It is to be noted that the above-mentioned correction processing can be realized by the fourth and the sixth three-dimensional image processing apparatus 100 to be described later.

Figure 66:
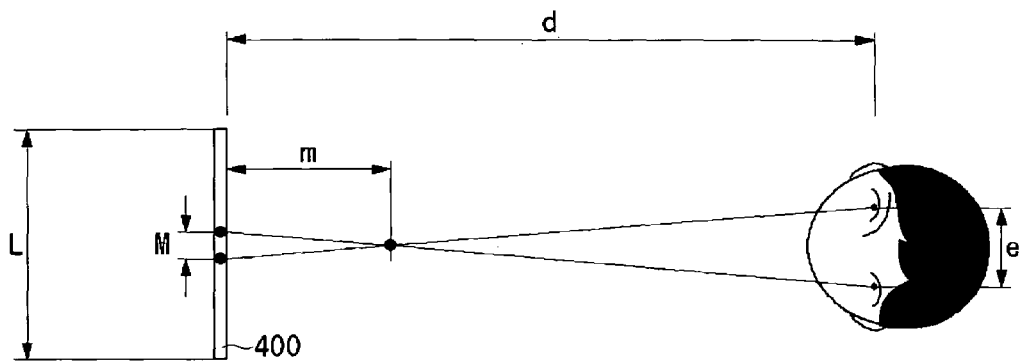
FIG. 66 shows a state in which a viewer is viewing a three-dimensional image on a display screen.

FIG. 66 shows a state in which a viewer is viewing a three-dimensional image on a display screen 400 of a three-dimensional image display apparatus 100. The screen size of the display screen 400 is L, the distance between the display screen 400 and the viewer is d, and the distance between eyes is e. The nearer-position limit parallax M and the farther-position limit parallax N have already been obtained beforehand by a three-dimensional sense adjusting unit 112, and appropriate parallaxes are between the nearer-position limit parallax M and the farther-position limit parallax N. Here, for easier understanding, the nearer-position limit parallax M only is displayed, and the maximum fly-out amount m is determined from this value. The fly-out amount m is the distance from the display screen 400 to the nearer-position point. It is to be noted that L, M and N are given in units of "pixels", and unlike such other parameters as d, m and e, they need primarily be adjusted using predetermined conversion formulas. Here, however, they are represented in the same unit system for easier explanation.

Figure 67:
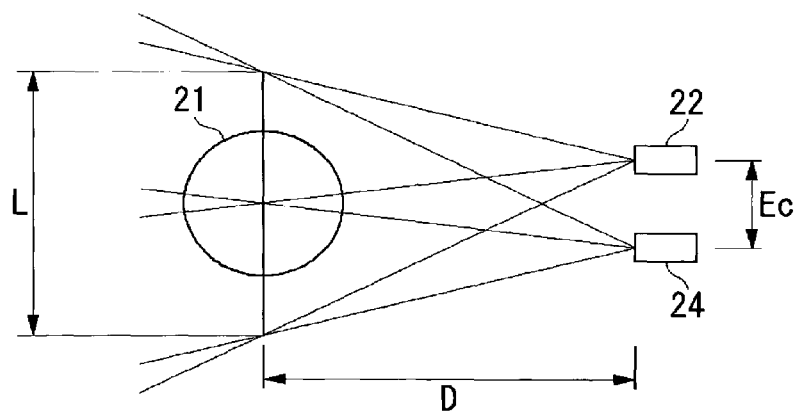
FIG. 67 shows a camera placement determined by a camera placement determining unit.
Figure 68:
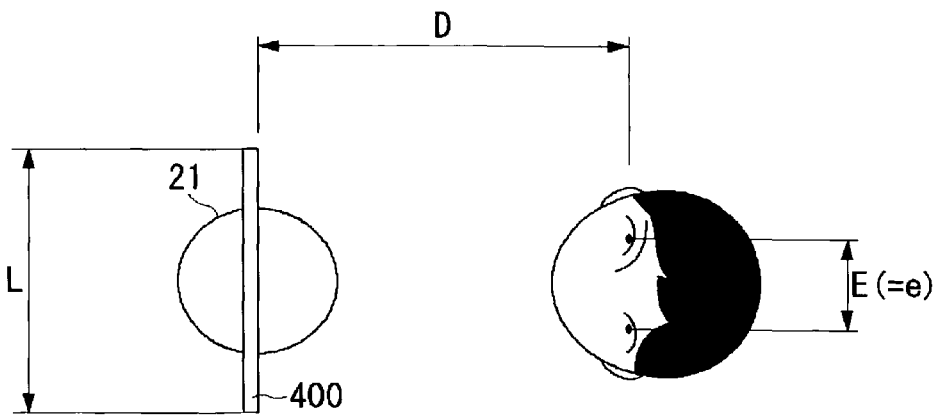
FIG. 68 shows how a viewer is viewing a parallax image obtained with the camera placement shown in FIG. 67.
Figure 69:
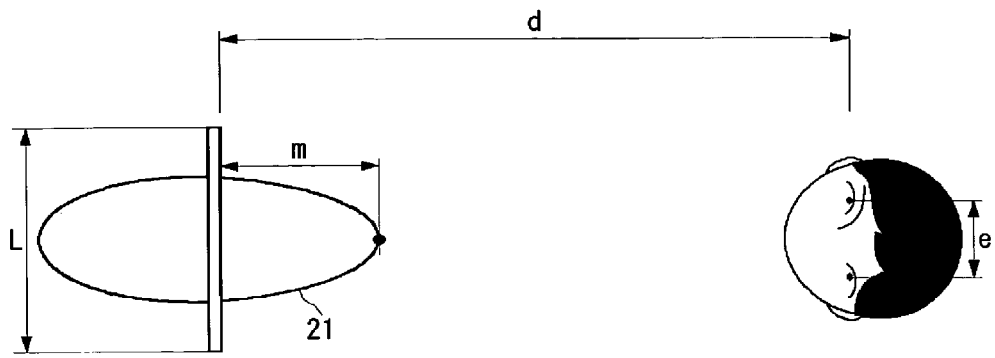
FIG. 69 shows how a viewer at a position of the viewer shown in FIG. 66 is viewing on a display screen an image whose appropriate parallax has been obtained at the camera placement of FIG. 67.

At this time, assume that in order to display a sphere 21 a camera placement is determined as shown in FIG. 67 by a camera placement determining unit 132 of a parallax control unit 114, with reference to the nearest-position point and the farthest-position point of the sphere 21. The optical axis intersection distance of the two cameras 22 and 24 is D, and the interval between the cameras is Ec. However, to make the comparison of parameters easier, an enlargement/reduction processing of the coordinate system is done in a manner such that the subtended width of the cameras at the optical axis intersection distance coincides with the screen size L. At this time, suppose, for instance, that the interval between cameras Ec is equal to the distance e between eyes and that the optical axis intersection distance D is smaller than the viewing distance d. Then, in this system, as shown in FIG. 68, the sphere 21 looks correctly when the viewer view it from the camera position shown in FIG. 67. If an image generated by a shooting system like this is viewed as a sphere 21 on the original three-dimensional image display apparatus 100, a sphere 21 elongated in the depth direction for the whole appropriate parallax range is viewed as shown in FIG. 69.

Figure 70:
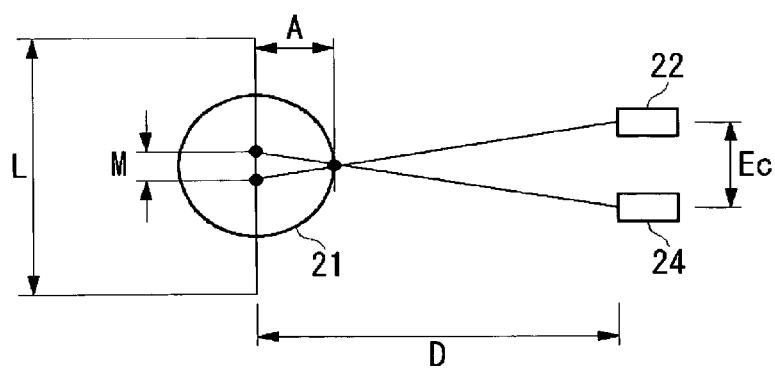
FIG. 70 shows a state in which a nearest-position point of a sphere positioned at a distance of A from a display screen is shot from a camera placement shown in FIG. 67.
Figure 71:
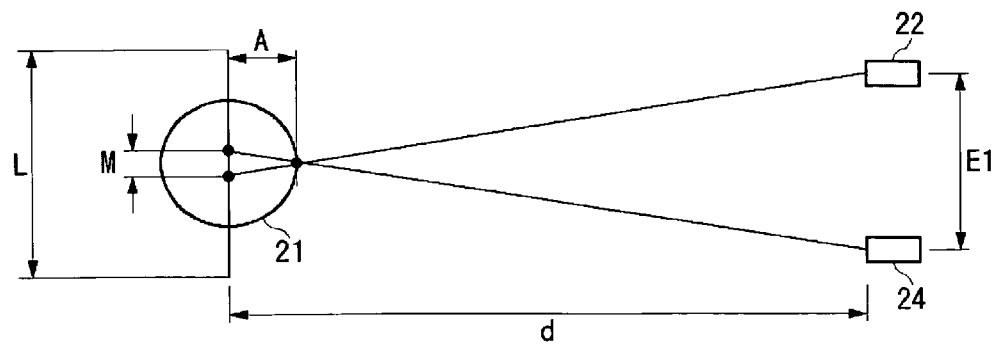
FIG. 71 shows a relationship among two cameras, optical axis tolerance distance of camera and camera interval required to obtain parallax shown in FIG. 70.

A technique for judging the necessity of correction to a three-dimensional image using this principle will be presented below. FIG. 70 shows a state in which the nearest-position point of a sphere positioned at a distance of A from the display screen 400 is shot from a camera placement shown in FIG. 67. At this time, the maximum parallax M corresponding to distance A is determined by the two straight lines connecting each of the two cameras 22 and 24 with the point positioned at distance A. FIG. 71 shows the camera interval E1 necessary for obtaining the parallax M shown in FIG. 70 when an optical axis tolerance distance of the cameras from the two cameras 22 and 24 is d. This can be said to be a conversion in which all the parameters of the shooting system other than the camera interval are brought into agreement with the parameters of the viewing system. In FIG. 70 and FIG. 71, the following relations hold:

$$M:A=Ec:D-A$$

$$M:A=E1:d-A$$

$$Ec=E1(D-A)/(d-A)$$

$$E1=Ec(d-A)/(D-A)$$

And it is judged that a correction to make the parallax smaller is necessary when E1 is larger than the distance e between eyes. Since it suffices that E1 is made to equal the distance e between eyes, Ec shall be corrected as shown in the following equation:

$$Ec=e(D-A)/(d-A)$$

Figure 72:
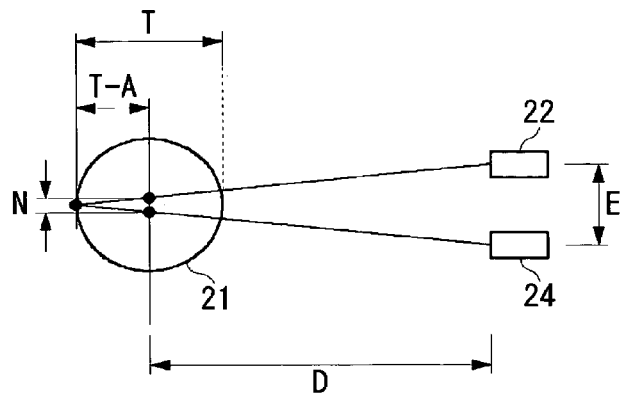
FIG. 72 shows a state in which a farthest-position point of a sphere positioned at a distance of T-A from a display screen is shot from a camera placement shown in FIG. 67.
Figure 73:
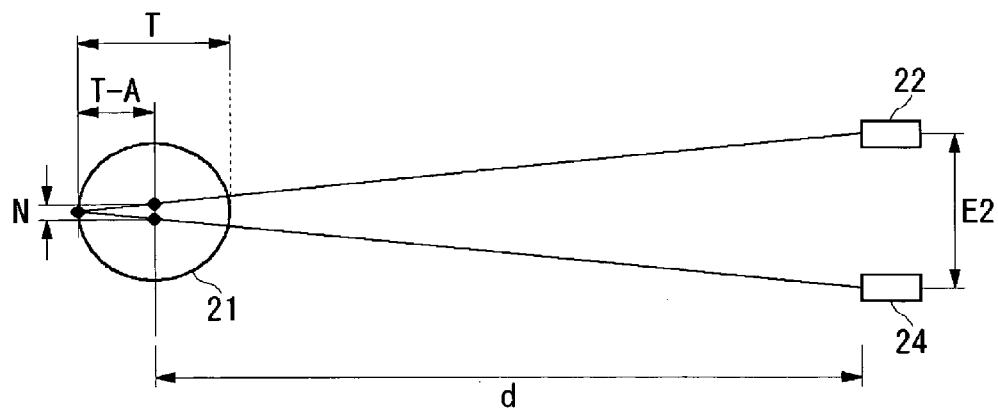
FIG. 73 shows a relationship among two cameras, optical axis tolerance distance of camera and camera interval required to obtain parallax shown in FIG. 72.

The same thing can be said of the farthest-position point. If the distance between the nearest-position point and the farthest-position point of a sphere 21 in FIG. 72 and FIG. 73 is T, which is a basic representation space, then $$N:T-A=Ec:D+T-A$$

$$N:T-A=E2:d+T-A$$

$$Ec=E2(D+T-A)/(d+T-A)$$

$$E2=Ec(d+T-A)/(D+T-A)$$

Moreover, it is judged that a correction is necessary when the E2 is larger than the distance e between eyes. Subsequently, since it suffices that E2 is made to equal the distance e between eyes, Ec shall be corrected as shown in the following equation:

$$Ec=e(D+T-A)/(d+T-A)$$

Finally, if the smaller of the two Ec's obtained from the nearest-position point and the farthest-position point, respectively, is selected, there will be no too large parallax for both the nearer-position and the farther-position. The cameras are set by returning this selected Ec to the coordinate system of the original three-dimensional space.

More generally, the camera interval Ec is preferably set in such a manner as to satisfy the following two equations simultaneously:

$$Ec<e(D-A)/(d-A)$$

$$Ec<e(D+T-A)/(d+T-A)$$

Figure 74:
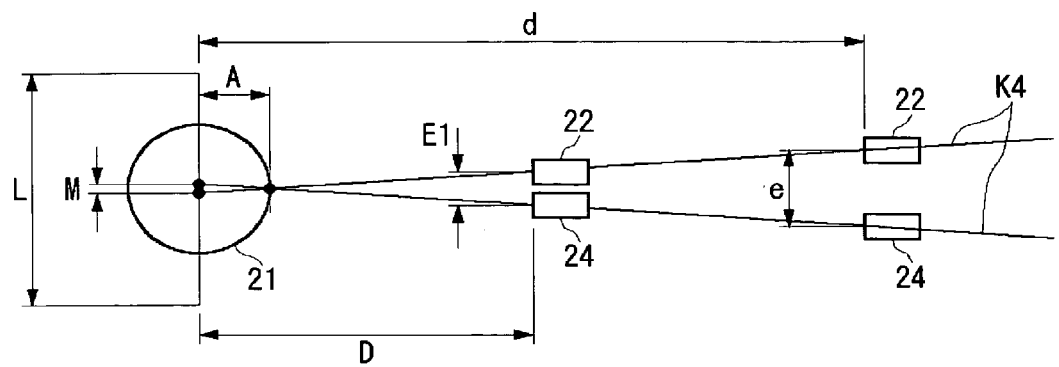
FIG. 74 shows a relationship among camera parameters necessary for setting the parallax of a 3D image within an appropriate parallax range.
Figure 75:
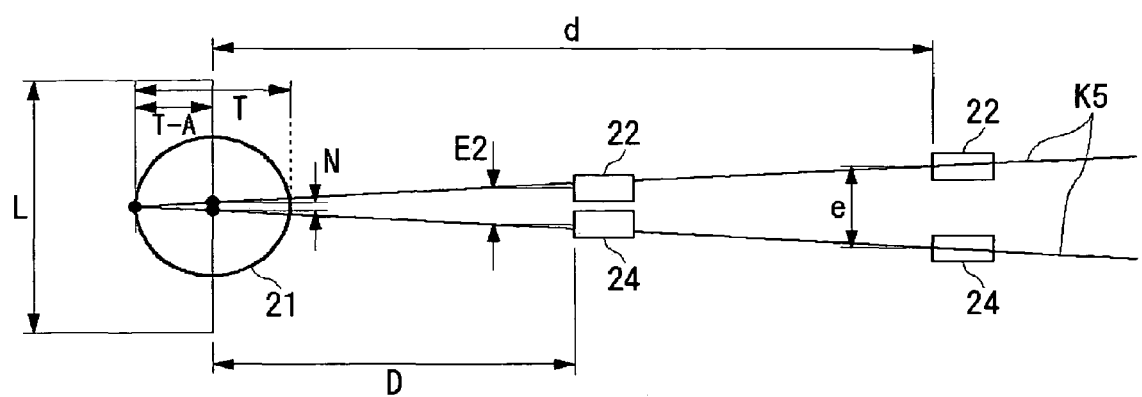
FIG. 75 shows a relationship among camera parameters necessary for setting the parallax of a 3D image within an appropriate parallax range.

This indicates that in FIG. 74 and FIG. 75 the interval of two cameras placed on the two optical axes K4 connecting the two cameras 22 and 24 placed at the position of viewing distance d at an interval of the distance e between eyes with the nearest-position point of an object or on the two optical axes K5 connecting the above-mentioned two cameras 22 and 24 with the farthest-position point thereof is the upper limit of the camera interval Ec. In other words, the two cameras 22 and 24 is preferably placed in such a manner that they are held between the optical axes of the narrower of the interval of the two optical axes K4 in FIG. 74 and the interval of the two optical axes K5 in FIG. 75.

Although the correction is made here by the camera interval only without changing the optical axis intersection distance, the optical axis intersection distance may be changed and the position of the object may be changed, or both the camera interval and optical axis intersection distance may be changed.

Correction is needed also when a depth map is utilized. If the depth map values denote the dislocation amounts at the points in the number of pixels and the initial values, or generally the values described in the original data, are in a state realizing an optimum stereoscopic vision, then it is preferably that the above-mentioned processing will not be performed when there occurs a necessity for enlarging the range of depth map values by an appropriate parallax processing, and the above-mentioned processing is performed only when there occurs a necessity for reducing the range of depth map values, that is, when there occurs a necessity for making the parallax smaller.

Where the parallax of the initial value is set on the small side, the maximum permissible value may be stored in a header area of the image or the like and an appropriate parallax processing may be performed such that the parallax is set below the maximum permissible value. In these cases, hardware information is necessary for appropriate distance, but a higher-performance processing than the previously described one, which does not rely on hardware information, can be realized. The above-mentioned processing can be used not only when the parallax is automatically set but also when it is set manually.

Moreover, the limits of parallax that give a sense of discomfort to the viewers vary with images. Generally speaking, images with less changes in pattern or color and with conspicuous edges tend to cause more cross talk if the parallax given is large. Images with a large difference in brightness between both sides of the edges tend to cause a highly visible cross talk when parallax given is strong. That is, when there is less of high-frequency components in the images to be three-dimensionally displayed, namely, parallax images or viewpoint images, the user tends to have a sense of discomfort when he/she see them. Therefore, it is preferable that images be subjected to a frequency analysis by such technique as Fourier transform, and correction be added to the appropriate parallaxes according to the distribution of frequency components obtained by the analysis. In other words, correction that makes the parallax larger than the appropriate parallax is added to the images which have more of high-frequency components.

Moreover, images with less movement tend to cause a highly visible cross talk. Generally speaking, the type of a file is often identified as moving pictures or still pictures by checking the extension of a filename. When determined to be moving images, the state of motion may be detected by a known motion detection technique, such as motion vector method, and correction may be added to the appropriate parallax amount according to the status. That is, to images with less motion, correction is added in such a manner that the parallax becomes smaller than the original parallax. On the other hand, to images with much motion, no correction is added. Alternatively, to emphasize motion, correction may be added such that the parallax becomes larger than the original parallax. It is to be noted that the correction of appropriate parallaxes is only one example, and correction can be made in any case as long as the parallax is within a predetermined parallax range. Moreover, the depth map may be corrected, and an amount of synthesis position dislocation of parallax images may be corrected as well.

Moreover, these analysis results may be recorded in the header area of a file, and a three-dimensional image processing apparatus may read the header and use it for the subsequent display of three-dimensional images.

Moreover, the distribution of amount or motion of high-frequency components may be ranked according to actual stereoscopic vision by the producer or user of images. Or, ranking by stereoscopic vision may be made by a plurality of evaluators and the average values may be used, and the technique used for the ranking does not matter here.

Moreover, it is not necessary that the appropriate parallaxes be preserved strictly. And it is not necessary to calculate the camera parameters at all times, but they may be calculated at fixed time intervals or at every scene change or in the like manner. It may prove effective particularly with apparatuses whose processing capacity is low. For example, when the camera parameters are calculated at fixed time intervals and three-dimensional images are to be generated from three-dimensional data, the parallax control unit 114 in the first three-dimensional image processing apparatus 100 may instruct re-calculation of camera parameters to the camera placement determining unit 132 at fixed periods using an internal timer. The internal timer may use the reference frequency of CPU, which performs arithmetic of the three-dimensional image processing apparatus 100, or a timer for exclusive use may be provided separately.

Figure 76:
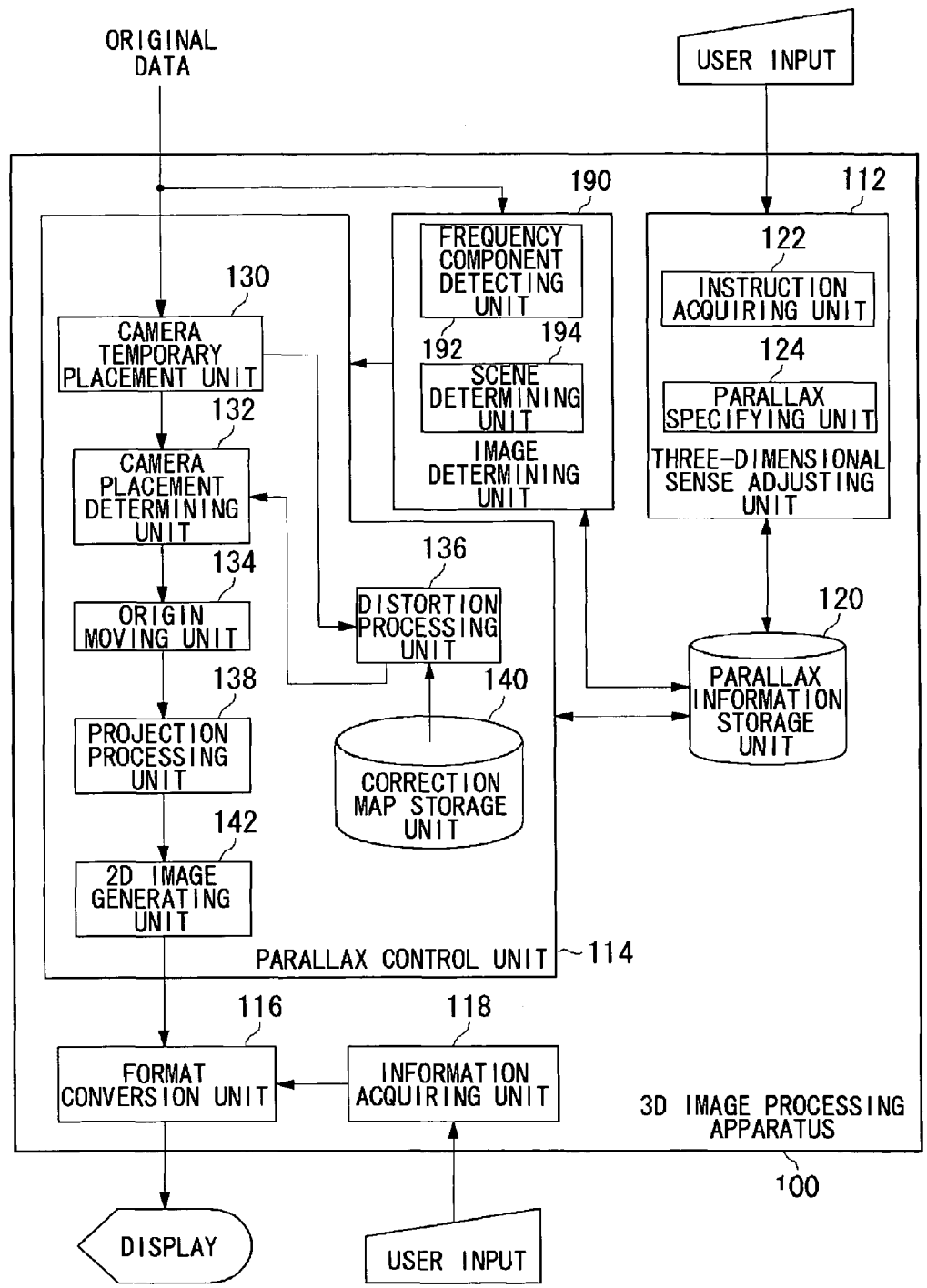
FIG. 76 shows a structure of a fifth three-dimensional image processing apparatus.

FIG. 76 shows a structure of a fifth three-dimensional image processing apparatus 100 that realizes calculating the appropriate parallaxes according to the state of images. Here, an image determining unit 190 is newly added to the first three-dimensional image processing apparatus 100 shown in FIG. 11. Other than that, the structure and operation are the same, and so the differences will be explained mainly. This image determining unit 190 includes a frequency component detecting unit 192, which acquires the amount of high-frequency components by analyzing the frequency components of an image and notifies a parallax control unit 114 of parallaxes appropriate for the image, and a scene determining unit 194, which detects scene change, if the original data are moving images, or detects the movement within an image and notifies the parallax control unit 114 of the camera parameter calculation timing. The detection of scene change may be done by a known technique.

When the original data are moving images, constant processing of adjusting the appropriate parallax by the amount of high-frequency components of the images will increase the processing load on the frequency component detecting unit 192. There is concern that the use of an arithmetic processing unit matching the processing load might raise the cost of the three-dimensional image processing apparatus 100. Since it is not necessary that the appropriate parallax be observed strictly all the time as mentioned earlier, the processing load of the image determining unit 190 can be reduced by employing an structure wherein the frequency components of images when the images change greatly, such as at scene change, are analyzed on the basis of the results of detection by the scene determining unit 194.

Figure 77:
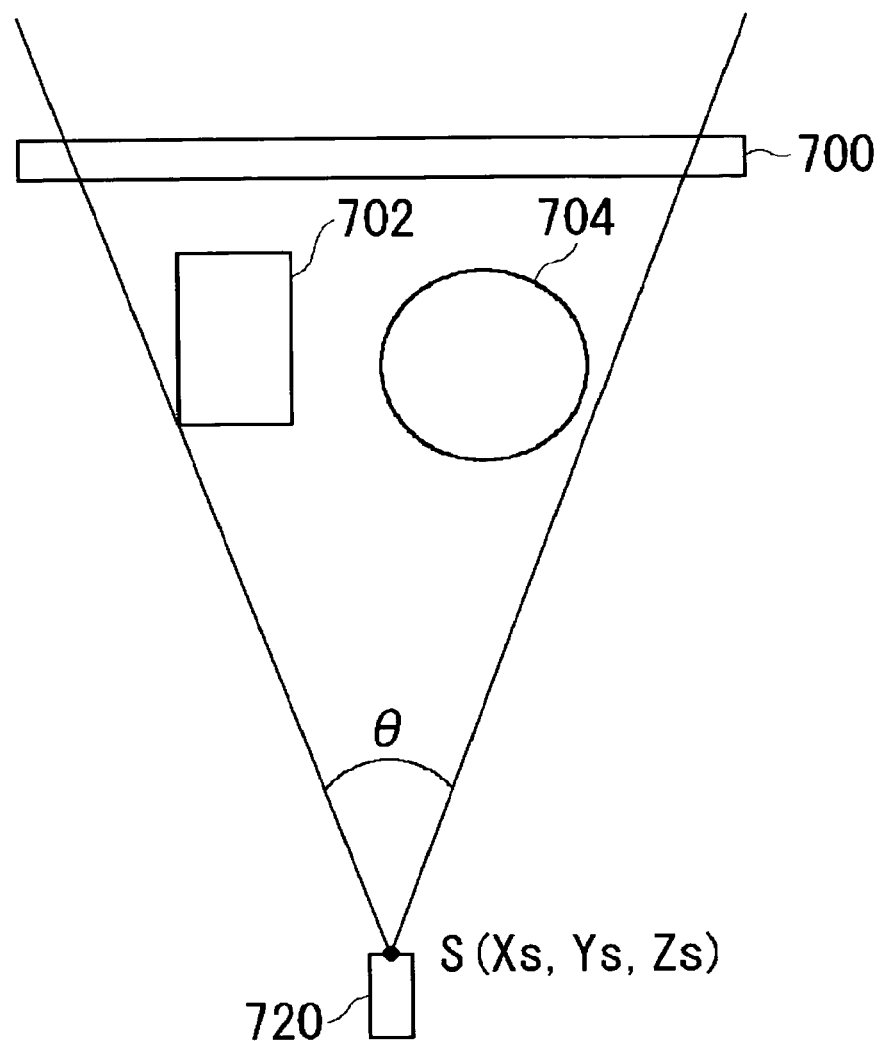
FIG. 77 shows a relationship among a temporary camera position to be set by a producer of three-dimensional data, an angle of view and first to third objects.

When a plurality of virtual cameras are placed in a three-dimensional space and parallax images corresponding to the respective virtual cameras are to be generated, areas without the presence of object information may sometimes occur within those parallax images. Hereinbelow, the principle of the occurrence of areas without the presence of object information within parallax images and the technique to eliminate it will be explained using an example of generating three-dimensional images from three-dimensional data. FIG. 77 shows a relationship between a temporary camera position S (Xs,Ys, Zs) to be set by a producer of three-dimensional data, an angle of view $\theta$, and first to third objects 700, 702 and 704.

The temporary camera position S (Xs,Ys, Zs) will serve as the center of virtual cameras (hereinafter referred to as center position S of cameras also) when generating the respective parallax images based on a plurality of virtual cameras. The first object 700 is equal to the background. Here, the producer sets the angle of view $\theta$ and the center position S of cameras in such a manner that the second and third objects 702 and 704 are placed within the angle of view $\theta$ and at the same time there is object information present in the angle of view $\theta$ by the first object 700, which is the background image.

Figure 78:
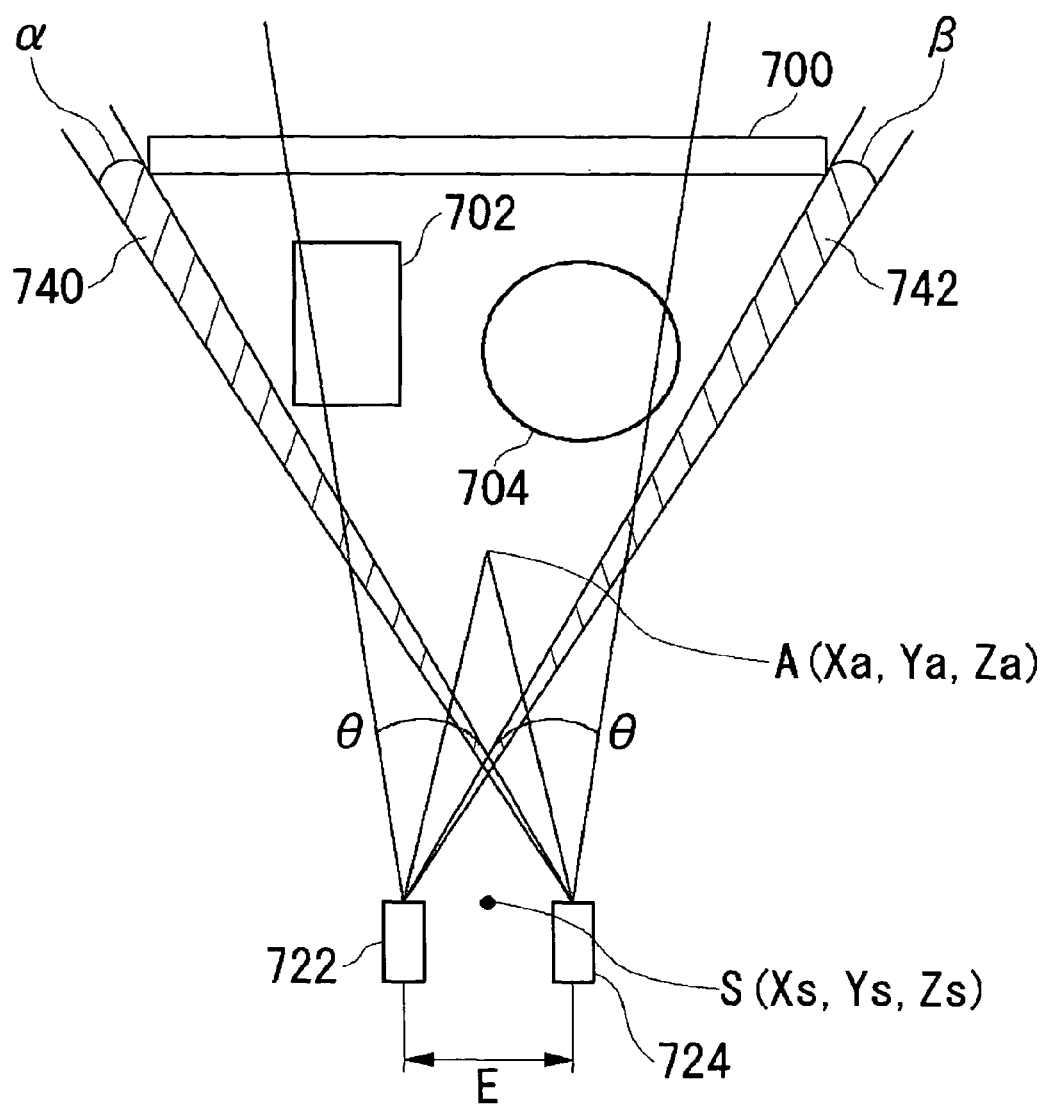
FIG. 78 shows a state in which two virtual cameras are placed based on virtual camera positions determined in FIG. 77.

Next, by a predetermined program, the parameters of the two virtual cameras 722 and 724, more specifically the camera positions and their respective optical axes, are determined so that a desired parallax may be obtained as shown in FIG. 78 and further the optical axis intersecting position A (Xa, Ya, Xa), which is reference for the nearer-position and farther-position, may be obtained. At this time, when the angle of view $\theta$ is equal to the previously determined value, first and second object zero areas 740 and 742, where there is no object information present as shown in this Figure, will occur in the camera positions of those two virtual cameras 722 and 724, depending, for instance, on the size of the first object 700, which is a background image.

Figure 79:
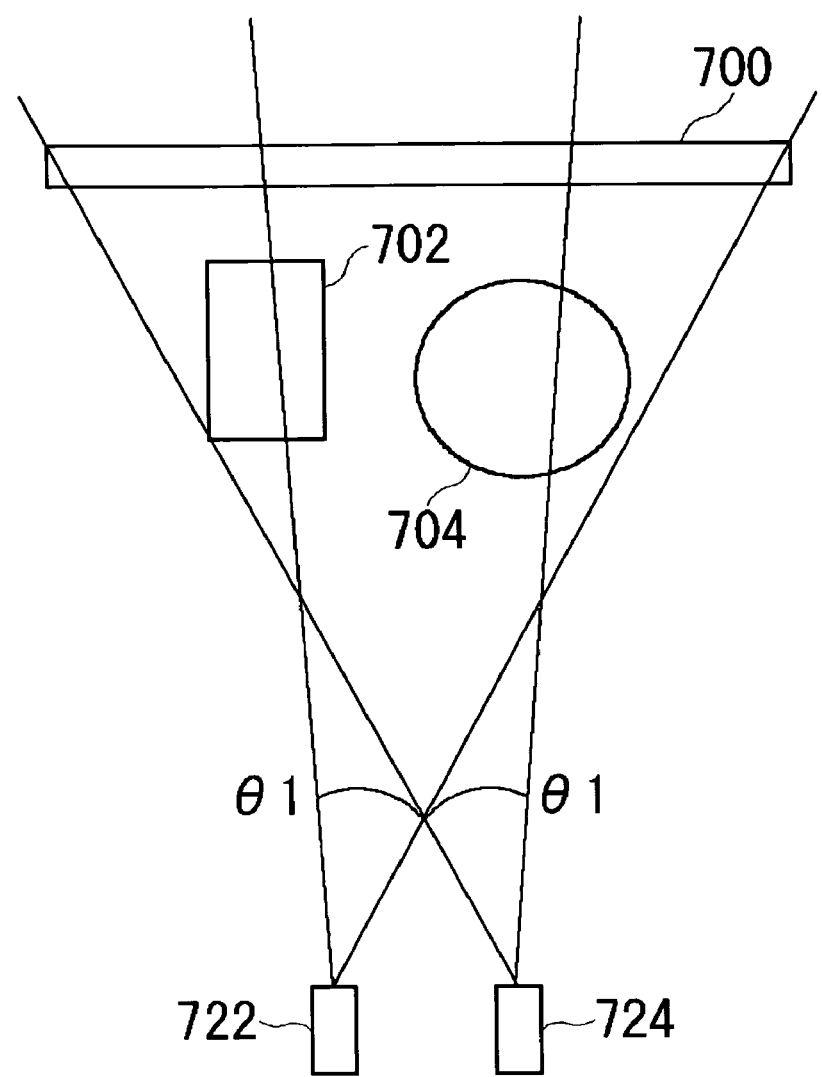
FIG. 79 shows a state in which a camera placement is so adjusted that area with no object information will not be produced.

The first object zero area 740 is $\alpha$, in angle, and the second object zero area 742 is $\beta$, and there is no object information in these angle ranges. Accordingly, as shown in FIG. 79, the angle of view $\theta$ may be adjusted in such a way as to eliminate these $\alpha$ and $\beta$. That is, the larger of the values of $\alpha$ and $\beta$ is subtracted from the angle of view $\theta$. At this time, the angle of view $\theta$ is reduced from both the left and right sides by the value to be subtracted so as not to change the direction of optical axis, so that the new angle of view $\theta 1$ will be defined by $\theta 1 = \theta 1 - 2 \times \alpha$ or $\theta 1 - 2 \times \beta$. However, since there are cases where $\alpha$ and $\beta$ cannot be known instantly from the parallax image, the angle of view $\theta$ may be adjusted little by little and, at each adjustment, check may be made to see whether there has occurred any region without the presence of object information within the parallax image. Whether or not there is any region without the presence of object information may, in practice, be checked by seeing whether there are any data to be inputted in the pixels of the display screen. Adjustment may be made not only to cause the presence of object information in all the pixels by the adjustment of the angle of view $\theta$ only, but also the camera interval E or the optical axis intersecting position A may be changed.

Figure 80:
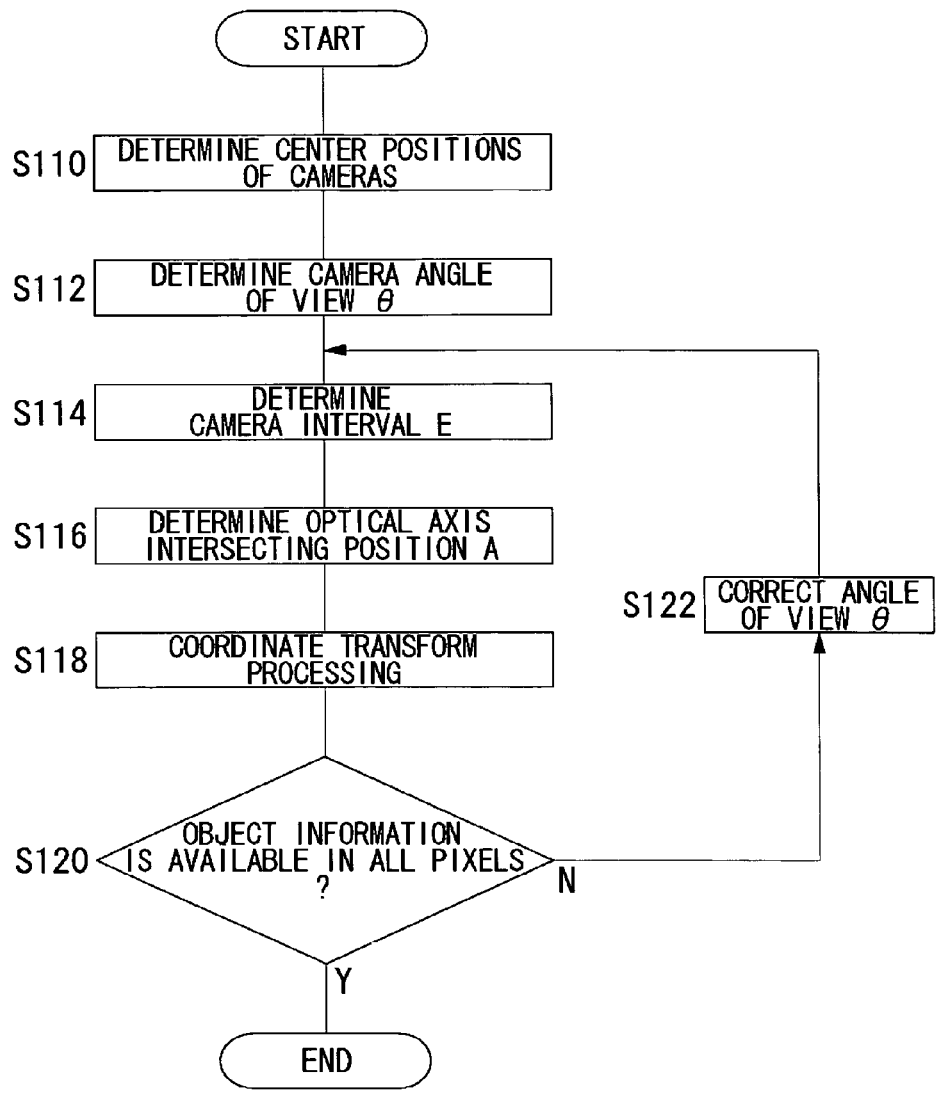
FIG. 80 is a flowchart showing a processing for the adjustment of angle of view.

FIG. 80 is a flowchart showing a processing for the adjustment of the angle of view. This processing for the adjustment of the angle of view can be realized by a first three-dimensional image display apparatus 100 shown in FIG. 11. Firstly, when original data, from which a three-dimensional image is generated, are inputted to the three-dimensional image display apparatus 100, a camera temporary placement unit 130 determines a center positions S of cameras (S110). Next, based on the center position S of cameras, a camera placement determining unit 132 determines the camera angle of view $\theta$ (S112), determines the camera interval E (S114) and determines the optical axis intersecting position A of virtual cameras (S116). Moreover, the camera placement determining unit 132 performs a coordinate transformation processing to the original data, based on the camera interval E and the optical axis intersecting position A, (S118) and determines whether there is object information present in all the pixels of the display screen or not (S120).

Where there are any pixels without object information (N of S120), correction is made to narrow the angle of view θ a little (S122), a return is made to the processing of S114, and from then on, the processings of S114 to S120 are continued until object information is present in all the pixels. Nevertheless, where adjustment is to be made to have object information present in all the pixels by the correction of the angle of view θ only, the processings to determine the camera interval E in S114 and the optical axis intersecting position A in S116 will be skipped. Where object information is present in all the pixels (Y of S120), the processing for the adjustment of the angle of view is completed.

The above embodiment has been explained mainly in regard to three-dimensional images to be generated from the three-dimensional data. The following explanation will concern a technique for expressing three-dimensional images from actually shot images. The difference between the case originating from three-dimensional data and the case originating from actually shot images lies in the absence of the concept of the depth T of a basic representation space in the case originating from actually shot images. This can be rephrased as the depth range T capable of appropriate parallax display.

As shown in FIG. 17 and FIG. 18, there are six kinds of parameters necessary for camera setting to generate three-dimensional images, namely, the camera interval E, the optical axis intersecting distance A, the angle of view θ, the distance S from the front projection plane 30, which is the front plane of a basic representation space, to the camera placement place, namely, the viewpoint plane 208, the distance D of the optical axis intersection plane 210 from the viewpoint plane 208, and the depth range T. And the following relations hold between these parameters:

$$E=2(S+A)\tan(/2) \cdot (SM+SN+TN)/(LT)$$

$$A=STM/(SM+SN+TN)$$

$$D=S+N$$

Therefore, by specifying three of the six kinds of parameters, E, A, θ, S, D and T, the rest of the parameters can be calculated. While which of the parameters to specify is generally up to free choice, E, A and D have been calculated by specifying θ, S and T in the previously described embodiment. Automatic change of θ or S may change the enlargement ratio, thus there is concern that the expression intended by a programmer or photographer might not be possible. Therefore, it is often undesirable to determine them automatically. As for T, too, it is desirable to determine it beforehand because it can also be considered a parameter limiting the expressing range. And with three-dimensional data, the trouble of changing any of the parameters is about the same. With actual photography, however, the situation differs. Depending on the structure of cameras, the cost greatly varies and the operability also changes. It is therefore desirable that the parameters to be specified be changed according to the usage.

Figure 81:
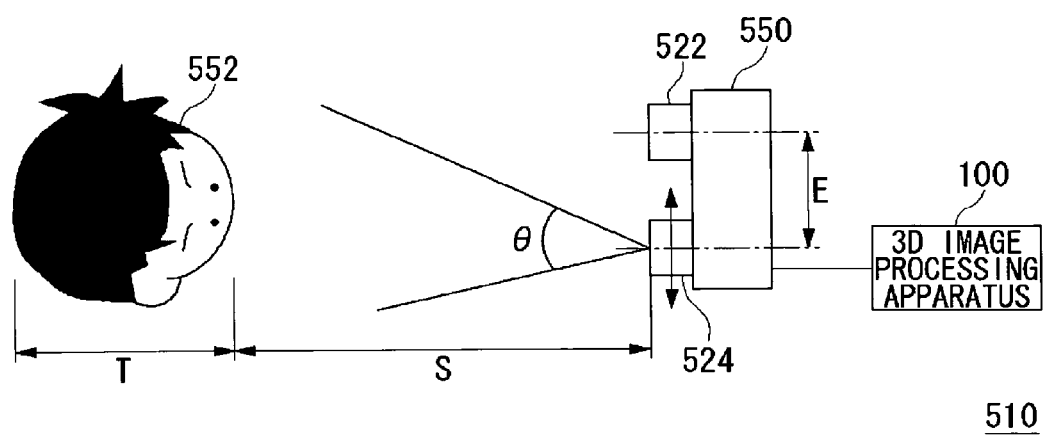
FIG. 81 shows a relationship between a three-dimensional photography apparatus, which takes stereoscopic photographs in an entertainment facility or photo studio, and an object.

FIG. 81 shows a relationship between a three-dimensional photography apparatus 510, which is used to take stereoscopic photographs in an entertainment facility or photo studio, and an object 552. The three-dimensional photography apparatus 510 is structured such that it includes a camera 550 and a three-dimensional image processing apparatus 100. Here, the photographic environment is fixed. That is, the positions of the camera 550 and the object 552 are predetermined, and the parameters θ, S and T are determined. In this shooting system, the example shown in FIG. 18 is replaced by an actual camera 550, and two parallax images, which serve as reference points for a three-dimensional image, can be shot only by this single camera 550, which is provided with two lenses 522 and 524.

Figure 82:
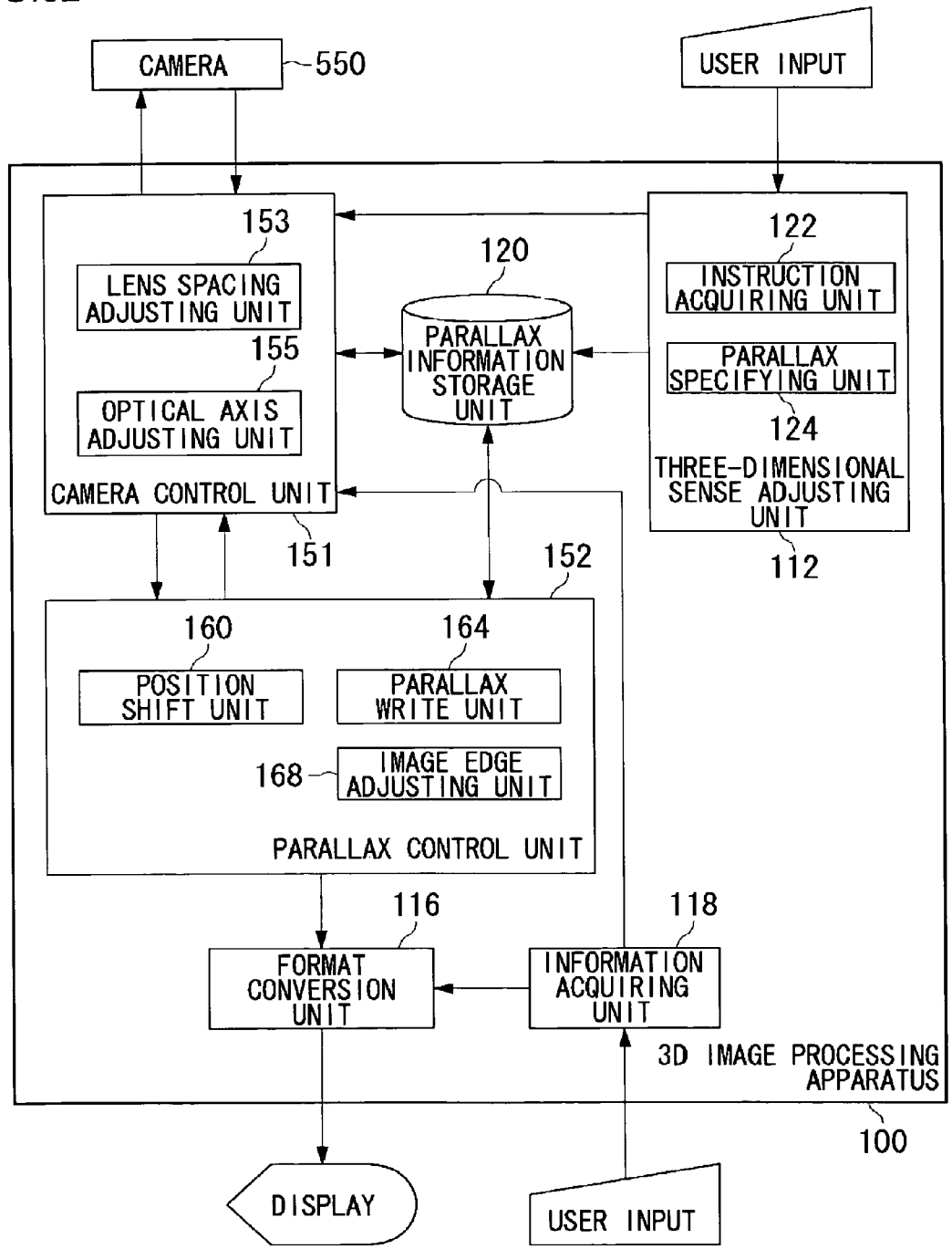
FIG. 82 shows a structure of a sixth three-dimensional image processing apparatus.

FIG. 82 shows a structure of a sixth three-dimensional image processing apparatus 100 which carries out this processing. This three-dimensional image processing apparatus 100 has a camera control unit 151 replacing the parallax detecting unit 150 in the three-dimensional image processing apparatus 100 shown in FIG. 12. The camera control unit 151 includes a lens spacing adjusting unit 153 and an optical axis adjusting unit 155.

The lens spacing adjusting unit 153 adjusts the camera interval E, or more precisely the lens spacing E, by adjusting the positions of the two lenses 522 and 524. The optical axis adjusting unit 155 adjusts D by changing the respective optical axis directions of the two lenses 522 and 524. For the subject 552, appropriate parallax information of a three-dimensional image display apparatus kept at home or the like is inputted via a portable recording medium such as a memory or card or a means of communication such as the Internet. An information acquiring unit 118 receives the input of the appropriate parallax and notifies it to a camera control unit 151. Upon receipt of the notification, the camera control unit 151 calculates E, A and D and adjusts the lenses 522 and 524, so that the camera 550 performs a shooting with appropriate parallax. This is accomplished because common processings by the three-dimensional display apparatus to display the object and the three-dimensional photography apparatus 510 are achieved by the library.

When it is desired that the object, in display, be positioned on the screen, it is preferable that D and A be determined and the object positioned at D be shot. In this case, the calculation of appropriate parallax may be done separately for the nearer-position and the farther-position, and one which makes E smaller may be selected. T may be made larger than the range occupied by the object. When there is a background, T shall be determined such that the background is included therein.

Moreover, it is not necessary that the appropriate parallax information be that checked by the three-dimensional image display apparatus possessed by the user, who is the object. For example, a favorite three-dimensional sense may be selected by a typical three-dimensional image display apparatus present at the site of shooting. This selection can be made by a three-dimensional sense adjusting unit 112. Or selection may simply be made from the items, such as "On-screen/Farther position/Nearer position" or "Three-dimensional sense: Large/Intermediate/Small", and predetermined camera parameters stored in correspondence thereto in the parallax information storage unit 120 may be used. Also, change of the optical axis intersecting position may be made by a mechanical structure, but it may also be realized by changing the range used as an image by using a high-definition CCD (Charge Coupled Device). For this processing, functions of the position shifting unit 160 may be used.

Figure 83:
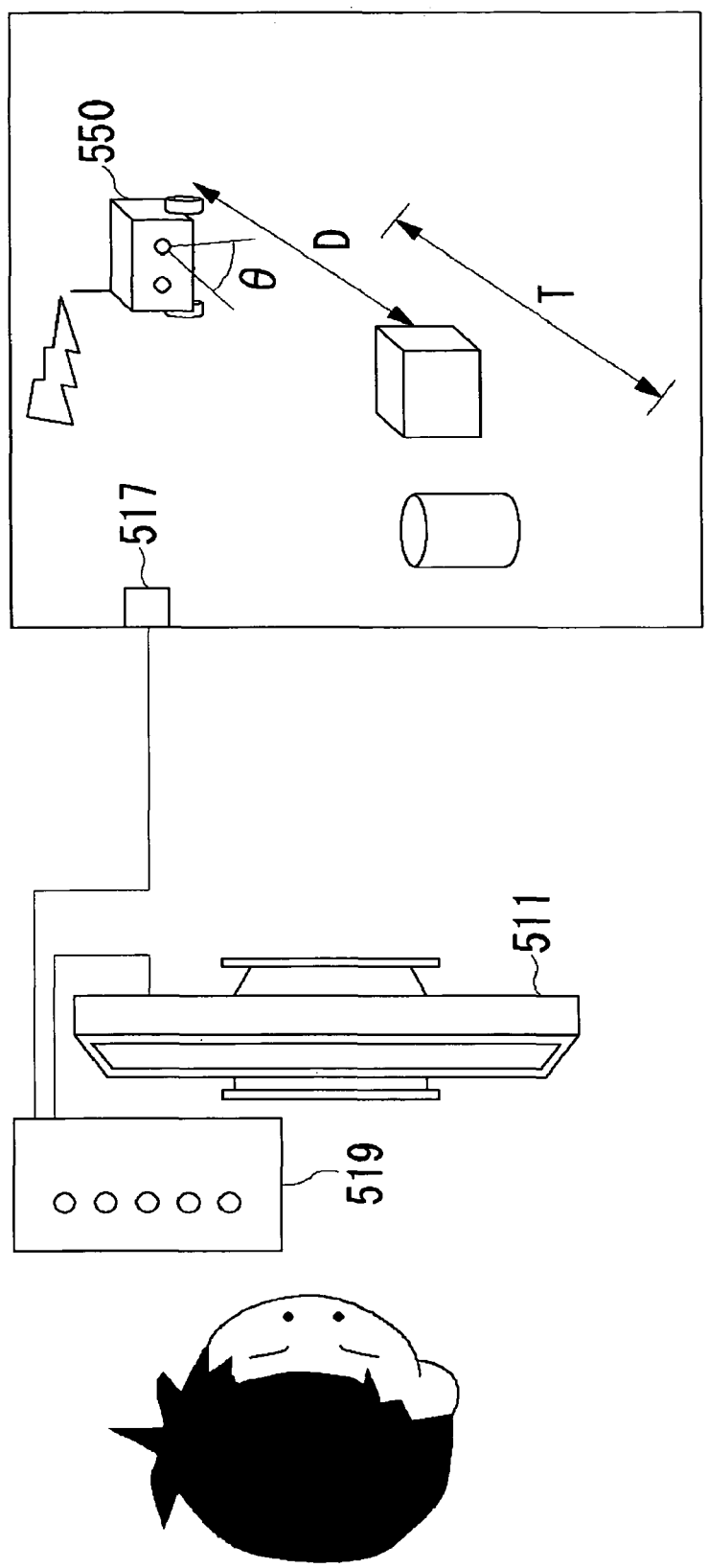
FIG. 83 is a drawing showing a state in which a camera is remotely operated and images being shot are viewed by a three-dimensional display apparatus.

FIG. 83 shows a state in which a movable camera 550 is placed in a place where humans cannot enter, the camera 550 is remotely operated by a remote operation using a controller 519 and images being shot are observed by a three-dimensional display apparatus 511. The three-dimensional display apparatus 100 structured in FIG. 82 is incorporated into the three-dimensional display apparatus 511.

The camera has a mechanism in which the lens interval E can be automatically adjusted. This camera also has an optical zoom or electronic zoom function by which to determine θ. However, this zooming operation changes a parallax amount. In general, the farther the shooting takes place the angle formed by optical axes among viewpoints at the time of display becomes smaller, so that the parallax becomes small with the lens interval E and the stereographic effect thereof is poor. Thus, the camera setting such as lens interval E and zooming amount needs be properly changed. Here, in such a case as this, the camera setting is automatically controlled so as to considerably reduce the cumbersome setting for camera. It is noted that the camera setting may be adjusted by using the controller 519.

An operator first operates the optical zoom or electronic zoom using the controller 519 so as to determine θ. Next, the camera 550 is moved so as to display an object desired to be shot in the center of the three-dimensional display apparatus 511. The camera 550 focuses on an object by an auto-focus mechanism and, at the same time, acquires a distance. In the initial state, suppose that this distance is D. In other words, the camera 550 is so set automatically that the object is seen in a position in the vicinity of a display screen. The range of T can be manually changed, and the operator specifies the distribution of an object, whose rear-or-front positional relationship is desired to be grasped beforehand, in the depth direction. In this manner, θ, D and T are determined. Thereby, E, A and S are determined by the above-indicated three relational expressions, so that the camera 550 is properly auto-adjusted. In the case of this example, S is determined later. Thus, the range of T is uncertain until the final stage. For this reason, T may be set larger to some extent.

If the object is desired to be displayed in the edge of a screen, the object may be once displayed in the center and a predetermined button may be depressed so as to be able to fix the focal point and D and, thereafter, the direction of the camera 550 may be changed. If a structure is such that the focal point or D can be manually changed, the depth position of an object can be freely changed.

Figure 84:
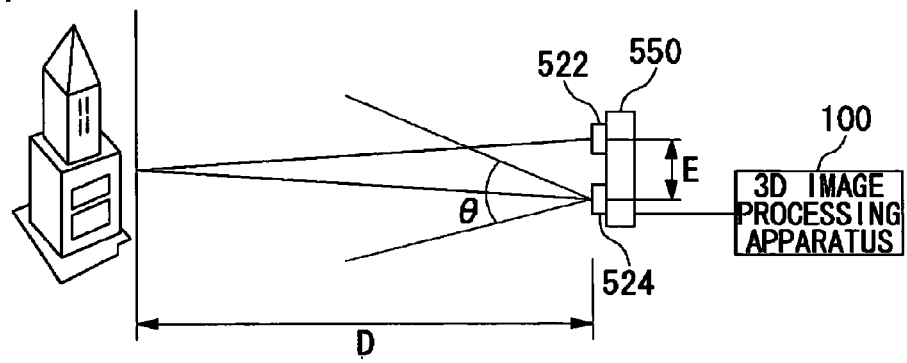
FIG. 84 shows an example of shooting by a three-dimensional photography apparatus equipped with a sixth three-dimensional image processing apparatus.

FIG. 84 shows an example of shooting by a three-dimensional photography apparatus 510. The three-dimensional photography apparatus 510 has the structure shown in FIG. 82. In this camera 550, the appropriate parallax of a three-dimensional display apparatus held beforehand by a photographer is inputted through a recording medium such as a portable memory or a means of communication such as the Internet. Assumed as the camera 550 here is a camera that has a simple structure and is available at comparatively low price. Here, camera interval E, optical axis intersection distance D and angle of view θ are fixed and A, S and T are determined by the above-indicated three relational expressions. Since the appropriate range of distances to the object can be calculated from these values, the distance to the object can be measured in real time and whether or the calculated distance is appropriate or not can be notified to the photographer via message, color of lamp or the like. The distance to the object may be acquired using the known techniques such as a distance measuring function by auto-focusing.

As described above, the combination as to which camera parameter is to be variable(s) or constants(s) is freely chosen, so that there are various modes in accordance with the usage. The mode, for the camera 550, conceivable other than the above-described includes a mode where the camera is attached to a microscope, a medical endoscope, a portable terminal or various equipment.

There are cases where, if the parallax is optimized for a particular three-dimensional display apparatus, stereovision may be difficult with other 3D display apparatuses. However, the apparatus' performance generally is to improve and it is considered to be a rare case that the parallax is too large for a 3D display apparatus purchased next time. Rather, making the adjustment as above is important to prevent a risk in which the stereovision becomes difficult, irrespective of the capability of the 3D display apparatus, due to lack of proper setting. It is assumed here that the 3D display apparatus is structured such that a three-dimensional image processing apparatus is provided therein to realize the stereovision.

The appropriate parallax obtained by the three-dimensional sense adjusting unit of the first to the sixth three-dimensional image processing apparatus 100 is the parameters, for a particular three-dimensional image processing apparatus 100, determined while the user is viewing three-dimensionally, so that the appropriate parallax is preserved, from then on, in that three-dimensional processing apparatus 100. Two factors, which are "image separability" inherent in the 3D display apparatus and "physiological limit" inherent in a viewer, are added to this operation of three-dimensional sense adjustment. The "image separability" is an objective factor that represents the capability to separate a plurality of viewpoint images. And the cross talk tends to be easily perceived in the 3D display apparatus, where this capability is low, even if almost no parallax is given, and if a number of viewers make adjustment, the range of the appropriate parallax becomes narrow averagely. Conversely, if the image separability is high, the cross talk is hardly perceived even with large parallax given, and the range of the appropriate parallax becomes wide averagely. The "physiological limit", on the other hand, is a subjective factor. For example, if the image separability is very high and the image is completely separated, the parallax range in which no sense of discomfort is felt differs depending on viewers. This appears as a variation in the appropriate parallax in the same three-dimensional processing apparatus 100.

Figure 85:
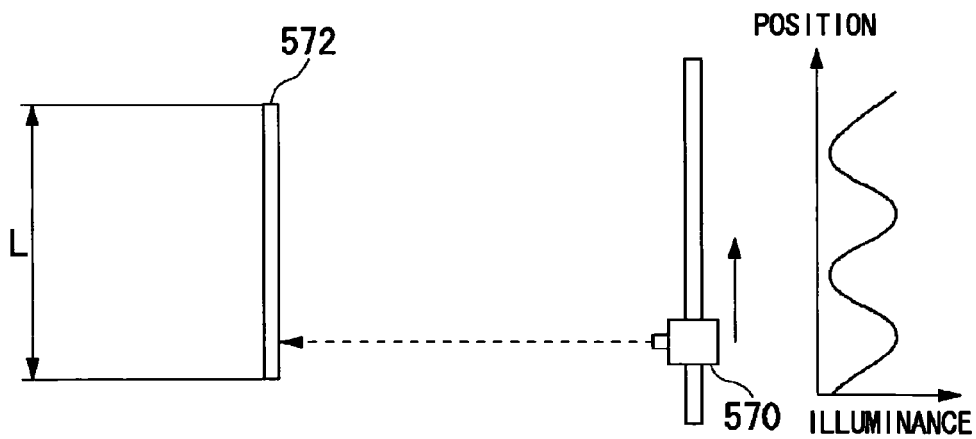
FIG. 85 shows how image separability is measured by an illuminometer.
Figure 86:
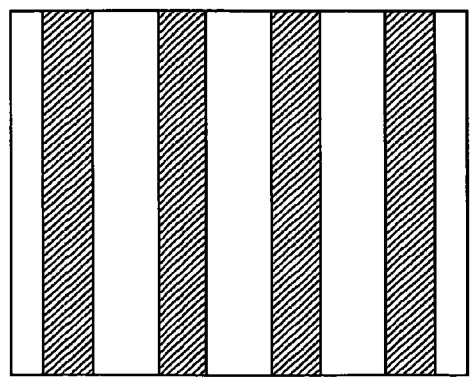
FIG. 86 shows a moiré image used to measure image separability.

The image separability is also called the degree of separation and it can be determined by a method in which the illuminance of a reference image 572 is measured while an illuminometer 570 moves in the horizontal direction as shown in FIG. 85. At that time, in the case of a two-eye type, all is displayed white on the left-eye image whereas all is displayed black on the right-eye image, for example. If an image is completely separated, the illuminance at a place that right eye sees is 0. In contrast thereto, the image separability can be obtained by measuring the degree of leakage of the white in the left-eye image. A graph at the far right of this Figure is an example of the measurement result. Since this measurement is almost equivalent to measuring the shading of moiré, the image separability can be measured if a moiré image is imported at a distance, where the moiré is viewed as in FIG. 86, and its contrasting density is analyzed.

In the spectacle-type three-dimensional apparatus and the like, the image separability can be measured by measuring the leaked light. In practice, the calculation may also be done in a manner such that the measured value, obtained when both left and right images are all in black, is taken into account as background. The image separability can be determined by an average value of ranking evaluation done by a number of viewers.

In this manner, criteria such as objective values can be set for the image the image separability of a 3D display apparatus. Hence, for example, if the rank of a 3D display apparatus 450 of FIG. 54 owned by a user and the user's appropriate parallax for the 3D display 450 are found, then the appropriate parallax can be converted to suit the rank of a different 3D display apparatus 440. In the 3D display apparatus, there are parameters, serving as characteristic values, such as screen size, pixel pitch and optimum observation distance. And the parameter information such as these is utilized for the conversion of the appropriate parallax.

Hereinbelow, examples of the conversion of appropriate parallax will be explained, in order, for each parameter. Using FIG. 87 and FIG. 88. It is assumed here that the appropriate parallax is retained in N/L and M/L where M is nearer-position limit parallax, N is farther-position limit parallax and L is the screen size. By expressing in ratio values in this manner, the difference in the pixel pitch between 3D apparatuses can be ignored. Thus, for the sake of simplicity, explanation will be made on the assumption that the pixel pitch is equal in the Figures used in the following.

Figure 87:
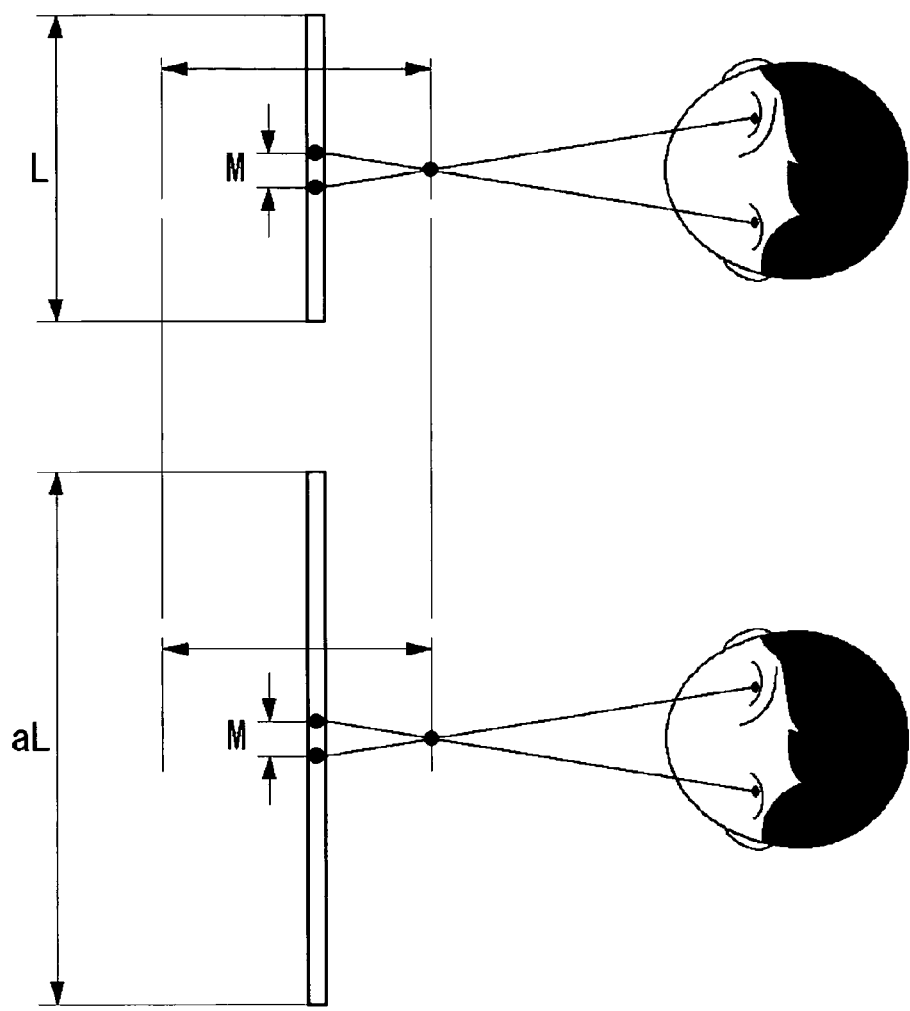
FIG. 87 shows an example of the conversion of appropriate parallax.

Firstly, the conversion to be done when the screen sizes differ will be explained. It is preferable that a processing be performed in such manner that the absolute value of parallax remains the same irrespectively of the screen size, as shown in FIG. 87. In other words, the range of stereoscopic expression is made identical in the front and back direction. Suppose that the screen size becomes a times as in a state shown in the lower side of the Figure from the upper side of the Figure. Then, N/L is converted to N/(aL) whereas M/L is converted to M/(aL), so that appropriate parallax is realized even when the screen sizes differ. This Figure shows an example of the nearest position.

Figure 88:
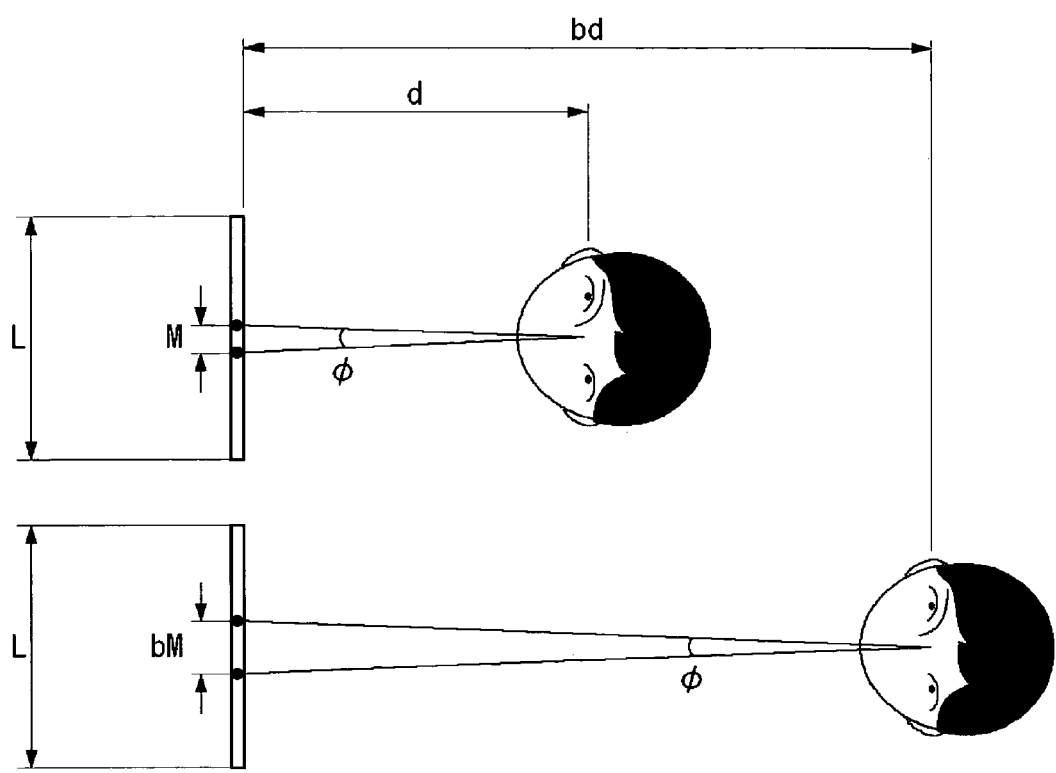
FIG. 88 is a drawing showing another example of the conversion of approximate parallax.

Next, the conversion to be done when the observation distances differ will be explained. As shown in FIG. 88, it is preferable that if the optimum observation distance d becomes b times, the absolute value of parallax shall also become b times. That is, the angle formed with eyes is kept constant. Thus, N/L is converted to bN/L and M/L is converted to bM/L, so that the optimum parallax is realized even when the optimum observation distances differ. This Figure shows an example of the nearest position.

Finally, explanation will be made as to taking into account the factor of image separabiility. Here, a rank r of image separability is assumed to be an integer greater than or equal to 0 and if the separability is so bad that no parallax can be given, then it will be 0. And let the image separability of a first 3D display be r0 and let the image separability of a second 3D display apparatus be r1, then N/L is converted to cN/l and M/L is converted to cM/L with c=r1/r0. Thereby, appropriate parallax is realized even if the 3D display apparatuses have different image separabilities. It is noted that the equation used here to derive c is a mere example and other equations may be used to derive c.

When all of the above procedures are done, N/L is converted to bcN/(aL) and M/L is converted to bcM/(aL) eventually. It is to be noted that this conversion can be applied to parallax either in the horizontal direction or the vertical direction. The above conversion for optimum parallax can be realized in the structures shown in FIG. 52, FIG. 53 and FIG. 54.

Moreover, the front face and the back face of the basic representation space may be determined using a Z buffer. In the Z buffer, a depth map of objects seen from a camera is obtained using a hidden-surface processing. The minimum value and the maximum value by which to remove this Z value may be used as positions of forefront surface and farthest back face. As a processing, a processing to acquire a Z value from a virtual camera position will be added. Since the final resolution is not required in this processing, the processing time will be reduced if the number of pixels is reduced. With this technique, the hidden part is ignored, so that the range of appropriate parallax can be effectively utilized. Even in a case where there are a plurality of objects, it will be easily handled.

Moreover, the parallax control unit 114 may perform control in such a manner that if parameters, on camera placement, to be set to generate parallax images are changed in the event of generating three-dimensional images by three-dimensional data, the camera parameters fall within threshold values provided beforehand for the variation of the parameters. Moreover, in a case when moving images of three-dimensional images are generated from two-dimensional moving images to which depth information are given, the parallax control unit 114 may perform control so that a variation, caused by progression of the two-dimensional moving images, in a maximum value or minimum value of depth contained in the depth information falls within threshold values provided beforehand. Those threshold values used in the control may be stored in the parallax information storage unit 120.

There are cases where when a basic representation space is determined from objects existing within the angle of view in the event of generating three-dimensional images from three-dimensional data, the size of the basic representation space changes drastically due to a rapid movement of an object or frame-in and frame-out and therefore the parameters on the camera placement change greatly. If this variation is larger than the predetermined threshold value, the variation may be permitted with the threshold values as the limit. When the three-dimensional image is to be generated from the two-dimensional image to which the depth information is given, the similar inconvenience may be conceivable in the course of determining the maximum value or minimum value of a parallax amount from the maximum value or minimum value of depth. Threshold values may be proved for this variation, too.

According to the embodiments, there are the following effects:

1. The three-dimensional images which are likely to be suited to the human physiology can be generated or displayed.
2. Even if an image to be displayed is changed, a three-dimensional image suitable for a user can be generated or displayed.
3. The stereoscopic effect for 3D display can be adjusted by a simple operation.
4. The burden on the programmer can be lightened in creating contents or application capable of proper 3D display.
5. The trouble of a user who tries to optimize can be alleviated.
6. The adjustment of a stereoscopic effect or head tracking information which is not normally considered for an object for plug-and-play function can be easily realized, and the same thing is applied to an apparatus where the plug-and-play cannot be done in principle, such as in a case of parallax barrier to be attached later.

As has been described above, the present embodiments can be utilized for method and apparatus for processing three-dimensional images, and so forth.

Although the present invention has been described by way of exemplary embodiments, it should be understood that many changes and substitutions may further be made by those skilled in the art without departing from the scope of the present invention which is defined by the appended claims.

What is claimed is:

1. A three-dimensional image processing apparatus comprising:
   a parallax control unit configured to adjust parallax between or among a plurality of viewpoint images for displaying a three-dimensional image to be perceived by one or more users; and
   a map storage unit having a pre-stored adjusting map to be referred to by the parallax control unit in adjusting the parallax, wherein
   the adjusting map includes parallax adjusting amounts based on which,
   the parallax control unit adjusts the parallax between or among the plurality of viewpoint images to become smaller at a peripheral region of the three-dimensional image or adjusts the parallax between or among the plurality of viewpoint images so that an object at the peripheral region of the three-dimensional image is seen by the one or more users to be relatively distant.

2. The apparatus according to claim 1, further comprising a receiving unit configured to receive an appropriate parallax amount that depends on a user's preference, wherein
   the parallax control unit processes the plurality of viewpoint images to adjust the parallax based on the received appropriate parallax amount before the three-dimensional image is displayed.

3. The apparatus according to claim 1, further comprising a receiving unit configured to receive a user's instruction with respect to the three-dimensional image to be displayed based on the plurality of viewpoint images, wherein
   the parallax control unit adjusts a positional relationship between or among the plurality of viewpoint images according to the user's instruction to adjust the parallax between or among the plurality of viewpoint images, and
   the apparatus further comprises a writing unit which writes information regarding the adjusted positional relationship into a recording area.

4. The apparatus according to claim 1, further comprising:
   an indicating unit configured to indicate an adjustable range of the parallax between or among the plurality of viewpoint images; and
   a receiving unit configured to receive a user's instruction with respect to a parallax amount within the adjustable range, wherein
   the parallax control unit adjusts the parallax in accordance with the parallax amount.

5. The apparatus according to claim 1, wherein the parallax control unit processes at least one of the plurality of viewpoint images to adjust the parallax between or among the plurality of viewpoint images.

6. The apparatus according to claim 1, wherein the parallax control unit distorts the three-dimensional image to be displayed to adjust the parallax between or among the plurality of viewpoint images.

7. A three-dimensional image processing method comprising the steps of:
   pre-storing adjusting amounts;
   receiving a plurality of viewpoint images for displaying a three-dimensional image to be perceived by one or more users; and
   adjusting a parallax between or among the received plurality of viewpoint images based on the adjusting amounts, wherein
   the adjusting step adjusts the parallax between or among the plurality of viewpoint images to become smaller at a peripheral region of the three-dimensional image or adjusts the parallax between or among the plurality of viewpoint images so that an object at the peripheral region of the three-dimensional image is seen by the one or more users to be relatively distant, in accordance with the adjusting amounts.

8. The three-dimensional image processing method according to claim 7, further comprising the steps of:
   receiving an appropriate parallax amount that depends on a user's preference; and
   processing the plurality of viewpoint images to adjust the parallax based on the received appropriate parallax amount before a three-dimensional image is displayed.

9. The three-dimensional image processing method according to claim 7, further comprising the steps of:
   receiving a user's instruction with respect to the three-dimensional mage to be displayed based on the plurality of viewpoint images;
   adjusting a positional relationship between or among the plurality of viewpoint images according to the user's instruction to adjust the parallax between or among the plurality of viewpoint images; and
   writing information regarding the adjusted positional relationship into a recording area.

10. The three-dimensional image processing method according to claim 7, further comprising the steps of:
    indicating an adjustable range of the parallax between or among the plurality of viewpoint images;
    receiving a user's instruction with respect to a parallax amount within the adjustable range; and
    adjusting the parallax in accordance with the parallax amount.

11. A non-transitory tangible computer-readable medium having a program, when executed, controlling a computer to perform the steps of:
    pre-storing adjusting amounts;
    receiving a plurality of viewpoint images for displaying a three-dimensional image to be perceived by one or more users; and
    adjusting a parallax between or among the received plurality of viewpoint images based on the adjusting amounts, wherein
    the adjusting step adjusts the parallax between or among the plurality of viewpoint images to become smaller at a peripheral region of the three-dimensional image or adjusts the parallax between or among the plurality of viewpoint images so that an object at the peripheral region of the three-dimensional image is seen by the one or more users to be relatively distant, in accordance with the adjusting amounts.

* * * * *